US009930287B2

(12) United States Patent
Missig et al.

(10) Patent No.: US 9,930,287 B2
(45) Date of Patent: Mar. 27, 2018

(54) VIRTUAL NOTICEBOARD USER INTERACTION

(71) Applicant: Apple Inc., Cupertino, CA (US)

(72) Inventors: Julian Missig, Redwood City, CA (US); Matthew Brown, San Francisco, CA (US); May-Li Khoe, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 14/861,759

(22) Filed: Sep. 22, 2015

(65) Prior Publication Data

US 2016/0344972 A1 Nov. 24, 2016

Related U.S. Application Data

(60) Provisional application No. 62/165,806, filed on May 22, 2015.

(51) Int. Cl.
*H04N 11/00* (2006.01)
*H04N 5/77* (2006.01)
(Continued)

(52) U.S. Cl.
CPC ............. *H04N 5/772* (2013.01); *G06F 3/016* (2013.01); *G06F 3/017* (2013.01); *G06F 3/0482* (2013.01);
(Continued)

(58) Field of Classification Search
USPC ..................................................... 348/14.09
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Maria El-Zoobi
(74) *Attorney, Agent, or Firm* — Morrison and Foerster LLP

(57) ABSTRACT

In some embodiments, a device captures video data of a person in front of a display while a user interface that is associated with a noticeboard is displayed on the display, after capturing the video data, in accordance with a determination that one or more object-identification criteria are met, identifies an object in the video data that is associated with the person in front of the display, in response to identifying the object in the video data, stores an image of the object in the video data, and after storing the image of the object, in accordance with a determination that object addition criteria have been met, adds the image of the object to the noticeboard. In some embodiments, the object-identification criteria include a criterion that is met when, in the video data, a predefined spatial relationship exists between the object and the person.

81 Claims, 48 Drawing Sheets

(51) Int. Cl.

| | |
|---|---|
| *G06F 3/01* | (2006.01) |
| *G06F 3/0482* | (2013.01) |
| *G06F 3/0486* | (2013.01) |
| *G06F 3/0488* | (2013.01) |
| *G06F 3/0484* | (2013.01) |
| *H04N 7/14* | (2006.01) |
| *G11B 27/031* | (2006.01) |
| *H04N 9/82* | (2006.01) |

(52) U.S. Cl.
CPC .......... *G06F 3/0486* (2013.01); *G06F 3/0488* (2013.01); *G06F 3/04842* (2013.01); *G11B 27/031* (2013.01); *H04N 7/141* (2013.01); *H04N 9/8205* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2006/0197753 | A1 | 9/2006 | Hotelling |
| 2013/0044959 | A1* | 2/2013 | Mitchell ................ G06Q 30/02 382/217 |
| 2015/0256665 | A1* | 9/2015 | Pera .................... H04L 12/2803 455/420 |
| 2016/0182856 | A1* | 6/2016 | Child .................... H04N 7/141 348/14.16 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

VIRTUAL NOTICEBOARD USER INTERACTION

CROSS-REFERENCE TO RELATED APPLICATIONS

This application is related to and claims the benefit of U.S. Provisional Application Ser. No. 62/165,806 filed May 22, 2015, entitled "Virtual Noticeboard User Interaction", the entire disclosure of which is herein incorporated by reference in its entirety for all purposes.

FIELD OF THE DISCLOSURE

This relates generally to electronic devices that display a virtual noticeboard, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

These interactions often consist of capture, by the electronic device, of video data of a user who is interacting with the device, such as during a video chat interaction. Enhancing these interactions improves the user's experience with the device and decreases user interaction time, which is particularly important where input devices are battery-operated.

SUMMARY OF THE DISCLOSURE

The embodiments described in this disclosure are directed to one or more devices that optionally identify objects in video data, and add images of those objects to one or more noticeboards, and one or more operations related to the above that the devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
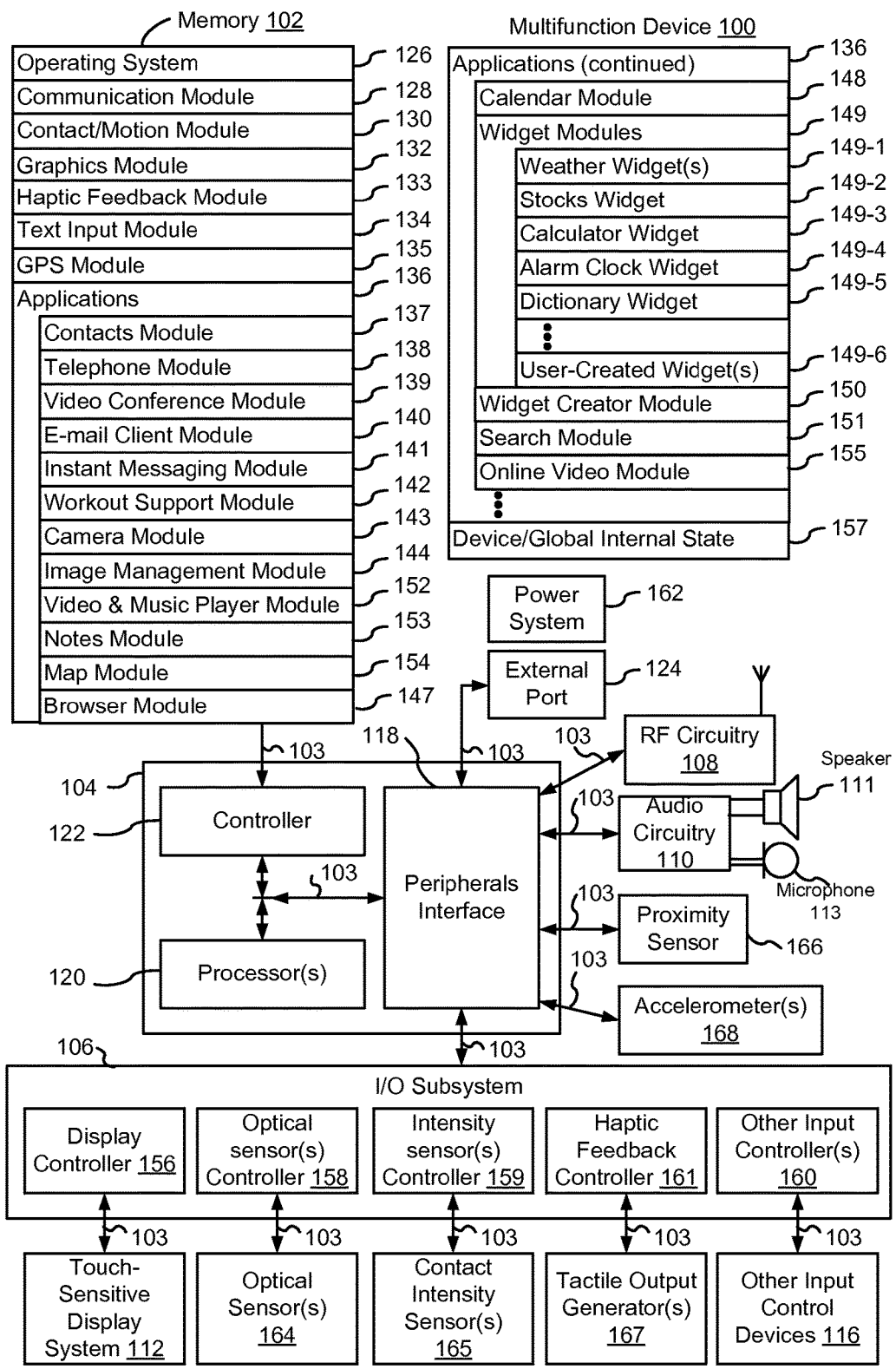
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

EXEMPLARY DEVICES

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
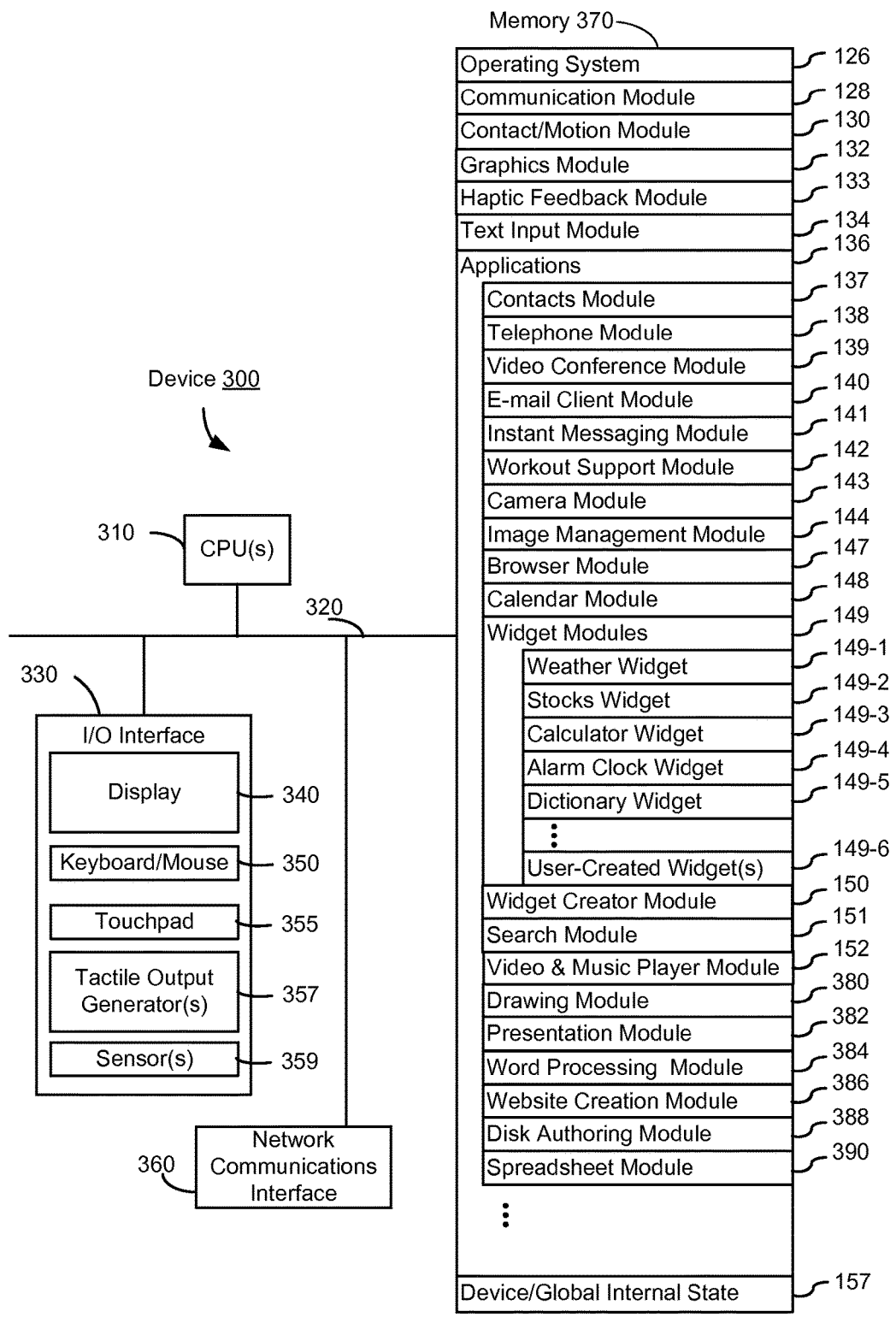
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);
telephone module 138;
video conferencing module 139;
e-mail client module 140;
instant messaging (IM) module 141;

workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154;
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, a "menu button" is implemented using a touchpad. In some other embodiments, the menu button is a physical push button or other physical input control device instead of a touchpad.

Figure 1B:
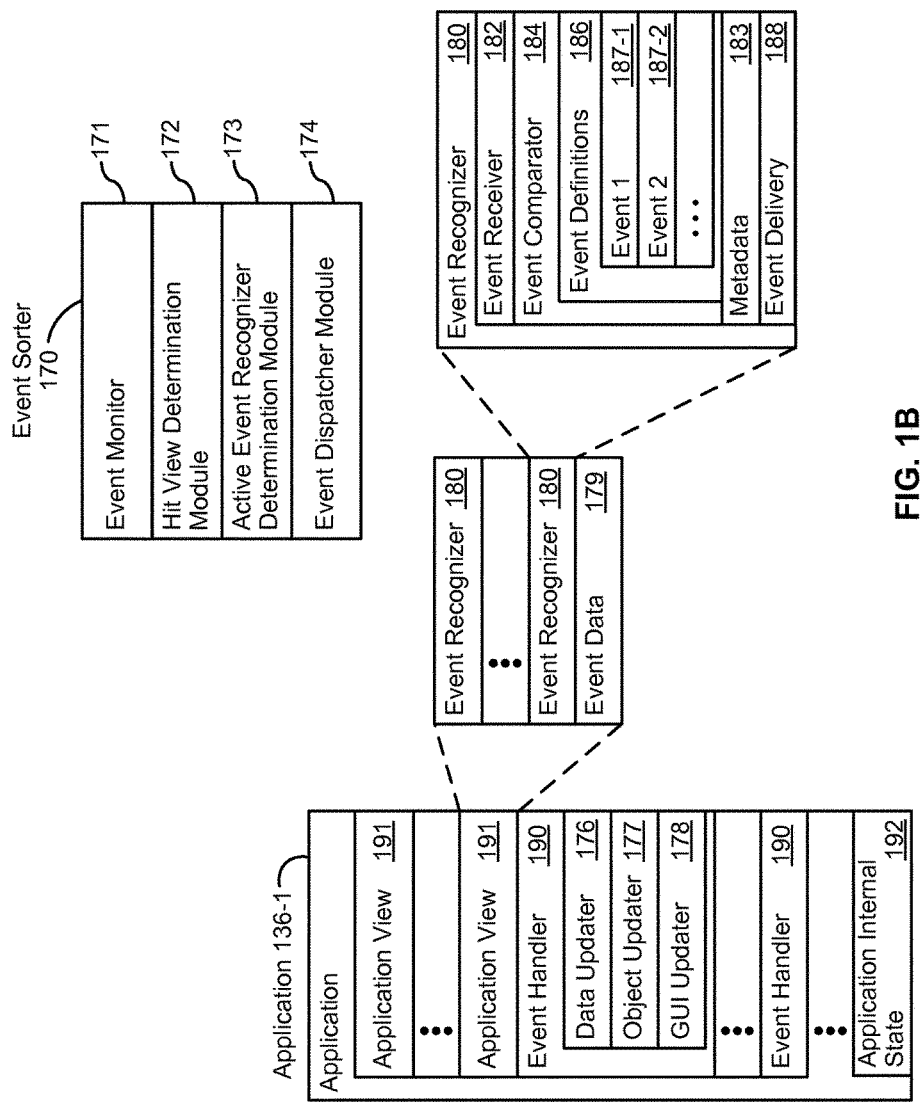
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
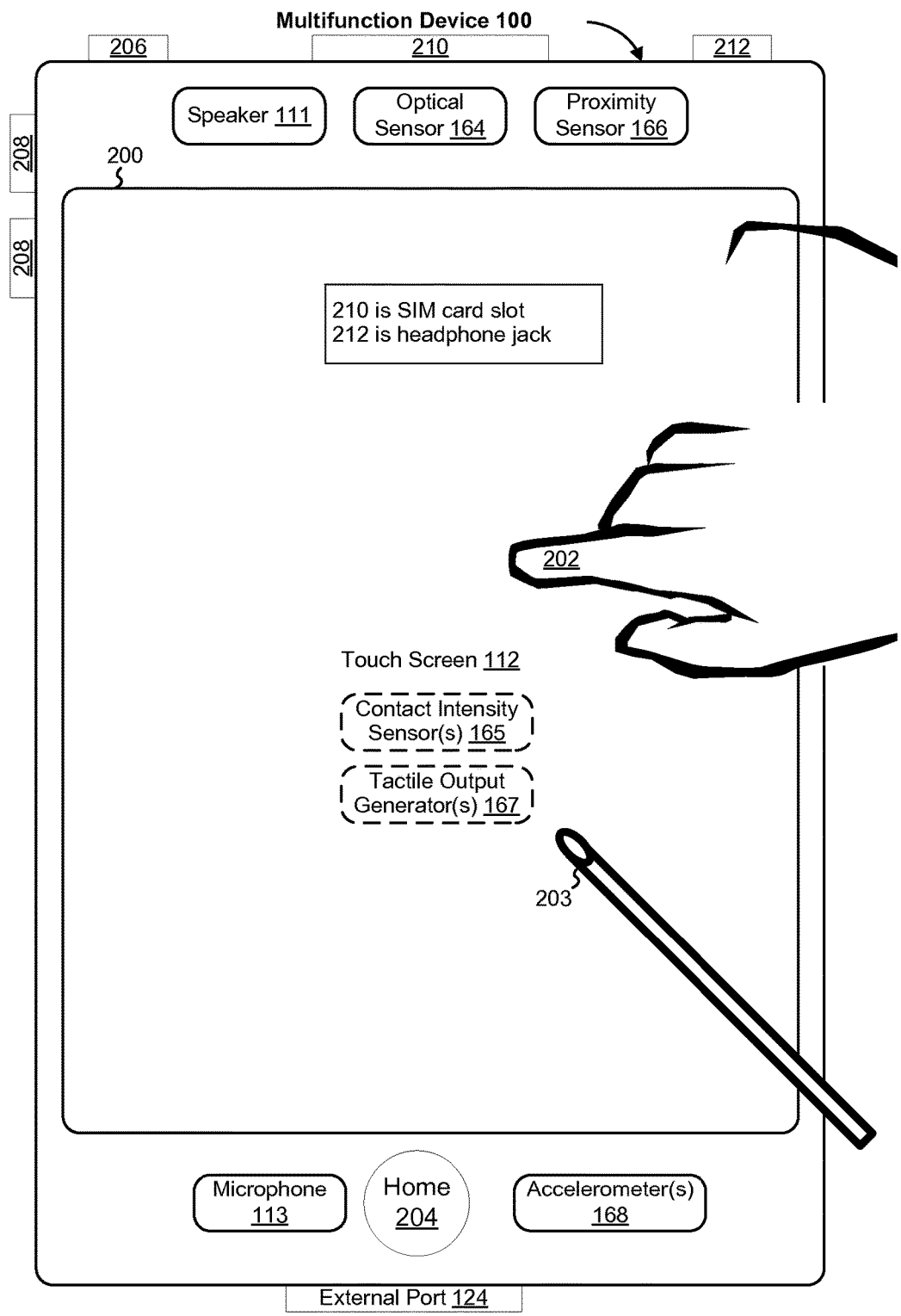
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
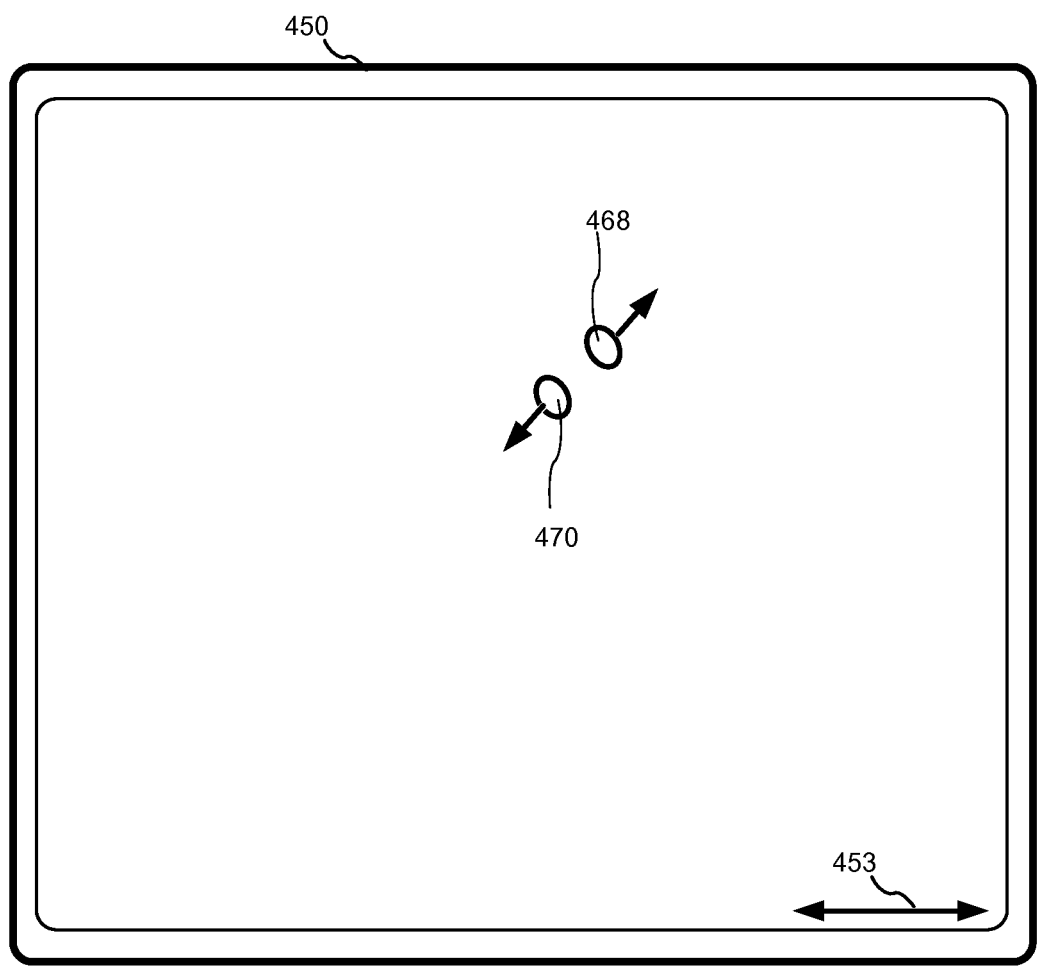
FIG. 4 illustrates an exemplary user interface for a multifunction device with a touch-sensitive surface that is separate from the display in accordance with some embodiments of the disclosure.
Figure 4:
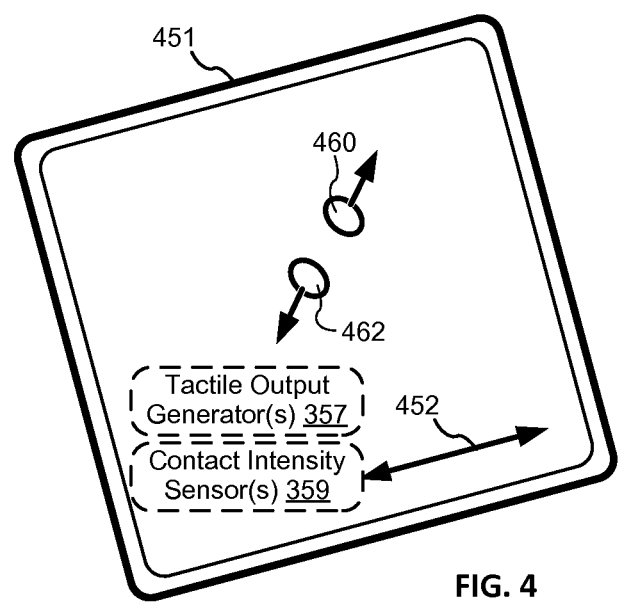

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
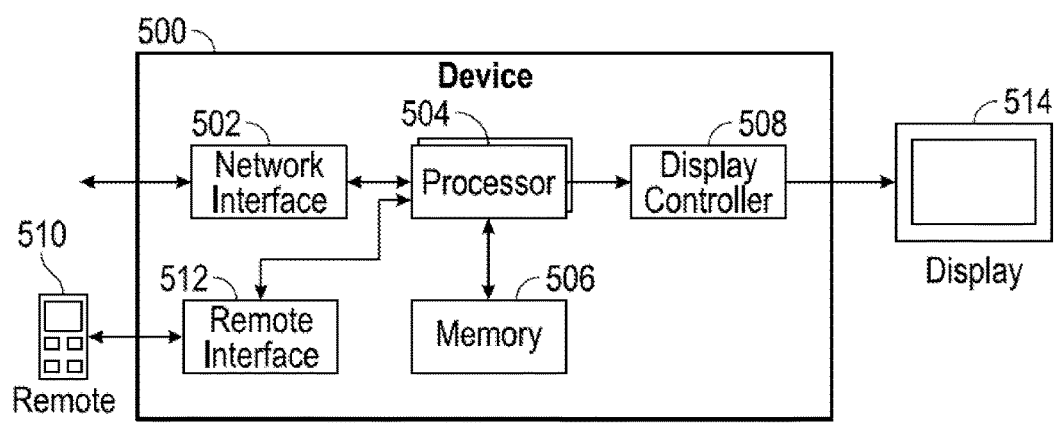
FIGS. 5A-5B illustrate block diagrams of an exemplary architecture for the device, and an exemplary configuration for the device, according to some embodiments of the disclosure of the disclosure.

FIG. 5A illustrates a block diagram of an exemplary architecture for the device 500 according to some embodiments of the disclosure. In the embodiment of FIG. 5A, media content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 500. Further, input to device 500 is optionally provided by remote 510 via remote interface 512, which is optionally a wireless or a wired connection. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
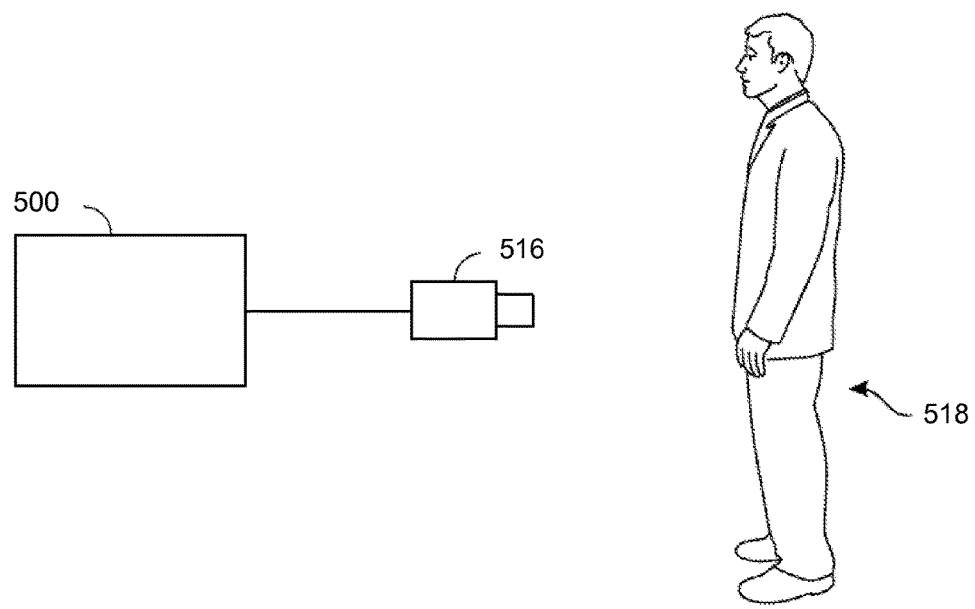

FIG. 5B illustrates an exemplary configuration for electronic device 500 when in use by person 518 according to embodiments of the disclosure. In some embodiments, electronic device 500 is optionally a device such as a set top box or other user interface generating device that is in communication with a remote control and a display device. Optionally, electronic device 500 is coupled to a camera 516. Camera 516 is optionally included in electronic device 500; in some embodiments, the camera is external to the electronic device, for example, in a display device to which the electronic device is coupled. In some embodiments, camera 516 optionally corresponds to any one of optical sensor(s) 164 in FIG. 1A and sensors 359 in FIG. 3. Camera 516 optionally includes any type of image sensor, such as a red-green-blue (RGB) image sensor, a depth image sensor, and an infrared (IR) image sensor. Electronic device 500 optionally receives sensed image data from camera 516. In the embodiment illustrated, a first person 518 is located in front of camera 516 such that the camera is able to capture an image of the first person. Exemplary interactions with electronic device 500 and camera 516 will be described below.

User Interfaces and Associated Processes

Virtual Noticeboard

Users interact with electronic devices in many different manners, including via camera(s) coupled to the electronic devices that capture video data of the users. In some circumstances, the users desire images of objects that are captured by the camera(s) to be stored by the electronic devices. For example, a user may hold an object (e.g., a photograph) up to the camera of an electronic device with the desire that the electronic device identify and store an image of the object. Sometimes, the electronic device adds the image of the object to a virtual noticeboard for current and/or future reference by the user. The embodiments described below provide ways in which electronic devices identify objects in video data, and add images of those objects to one or more noticeboards, thereby enhancing users' interactions with the electronic devices. Enhancing interactions with a device reduces the amount of time needed by a user to perform operations, and thus reduces the power usage of the device and increases battery life for battery-powered devices.

It is understood that people use devices. When a person uses a device, that person is optionally referred to as a user of the device.

Figure 6A:
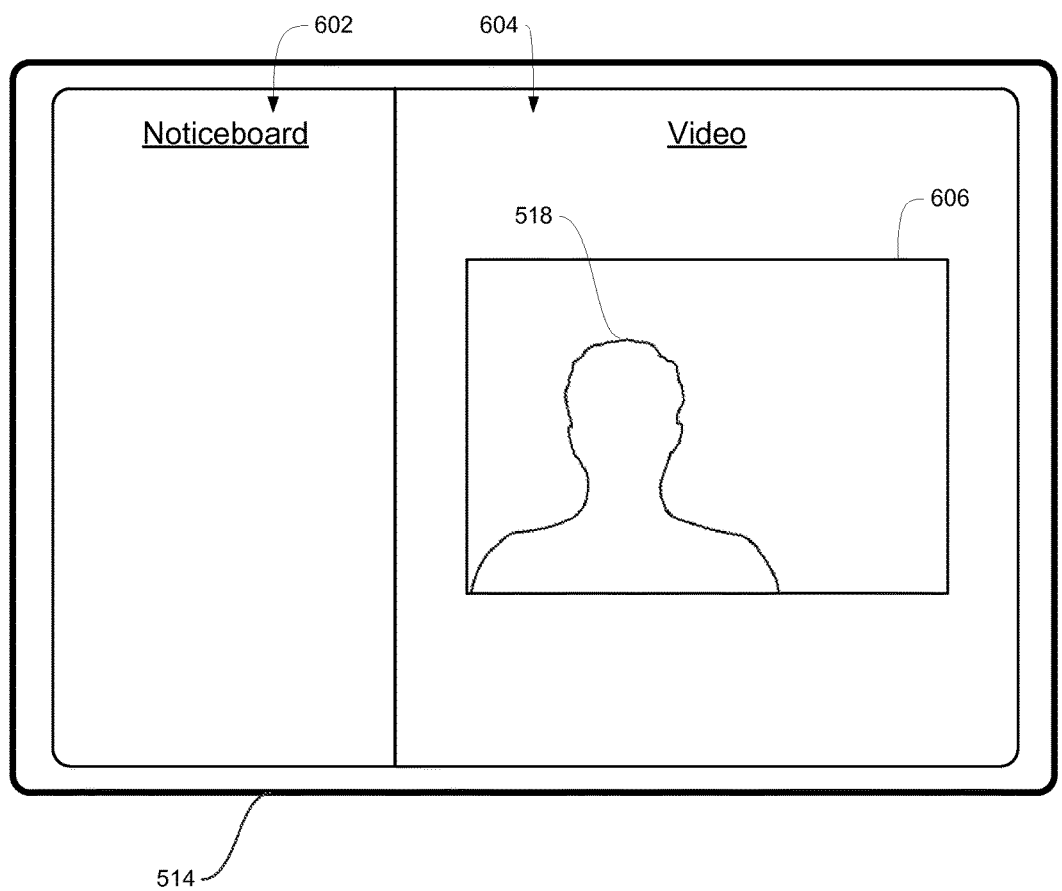
FIGS. 6A-6Z and 6AA-6GG illustrate exemplary ways in which electronic devices identify objects in video data, and add images of those objects to one or more noticeboards in accordance with some embodiments of the disclosure.
Figure 6B:
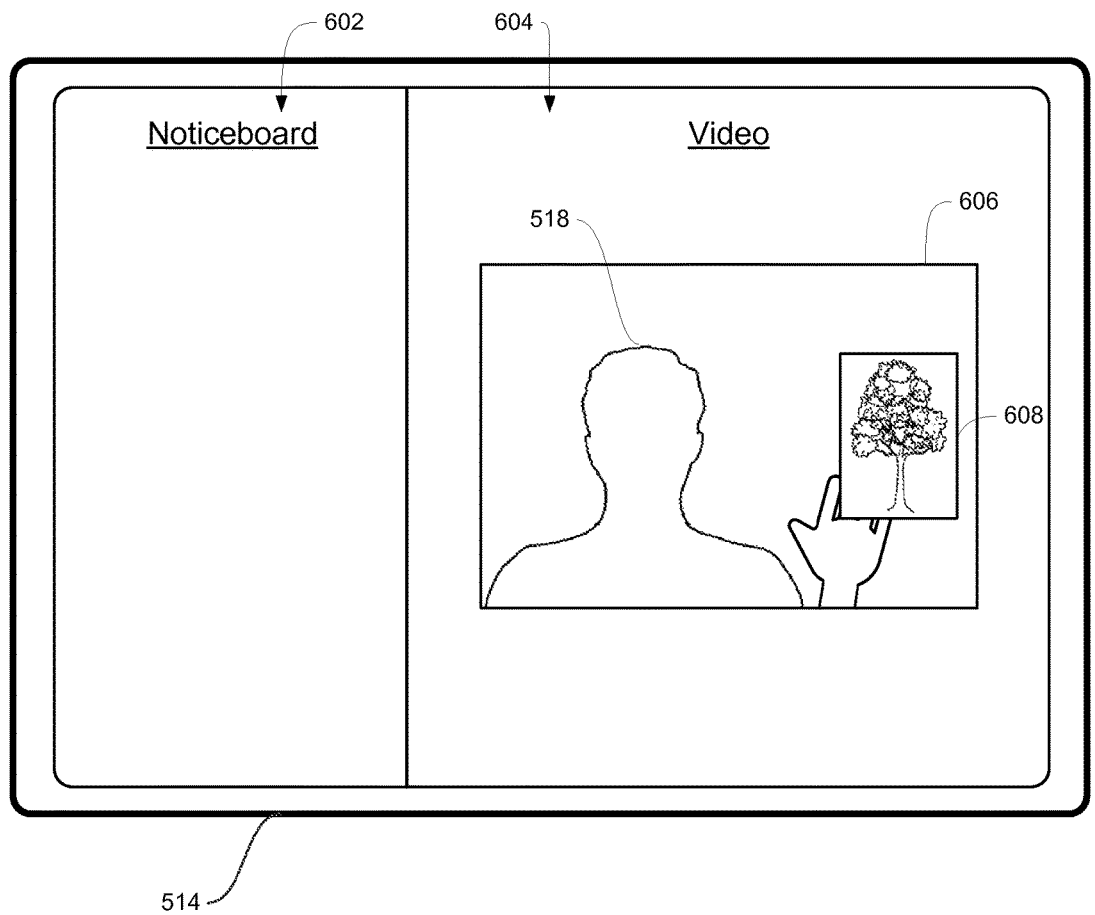
Figure 6C:
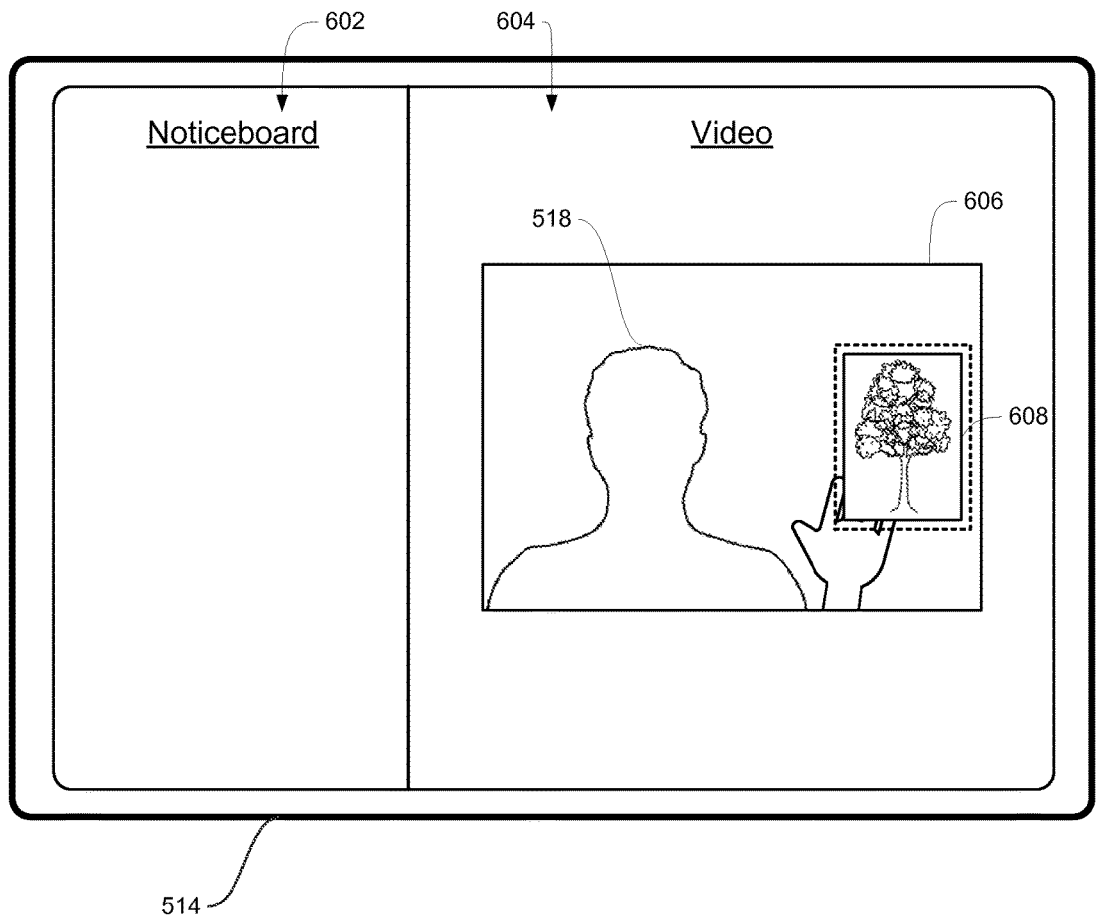
Figure 6D:
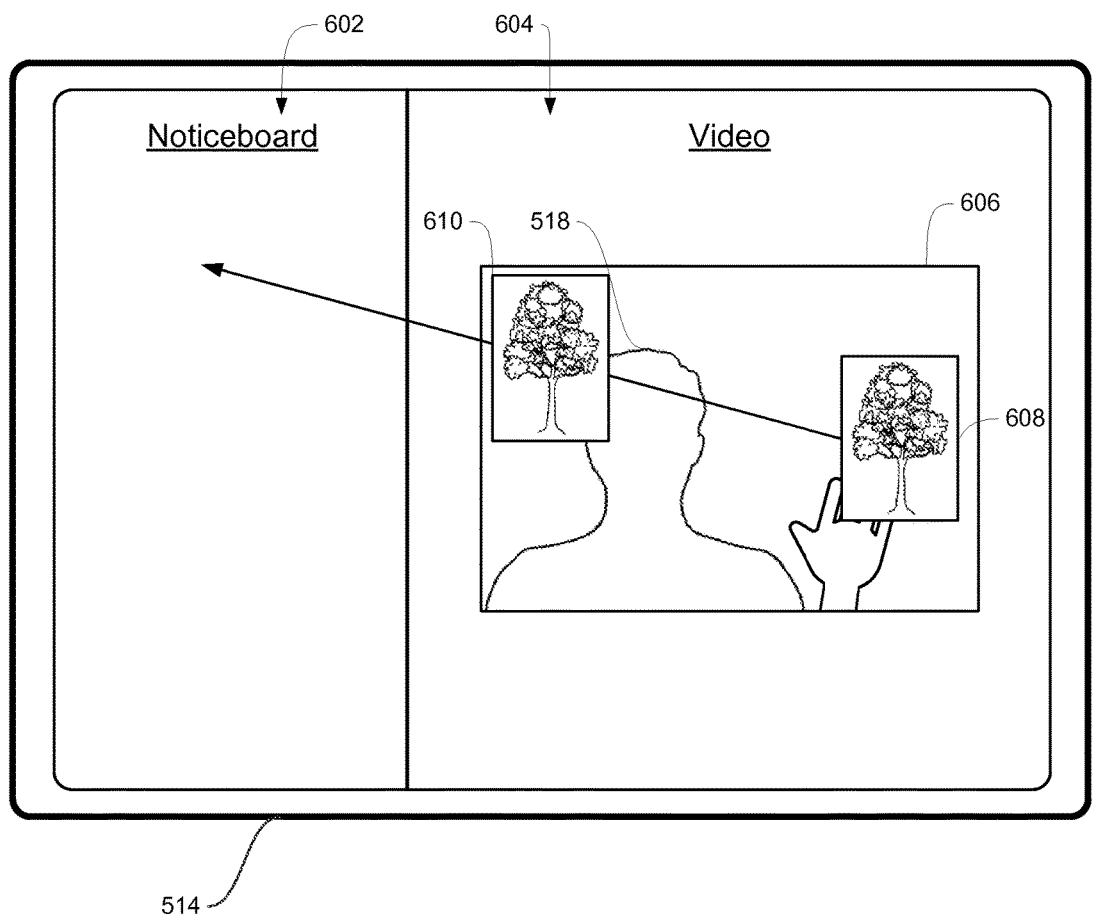
Figure 6E:
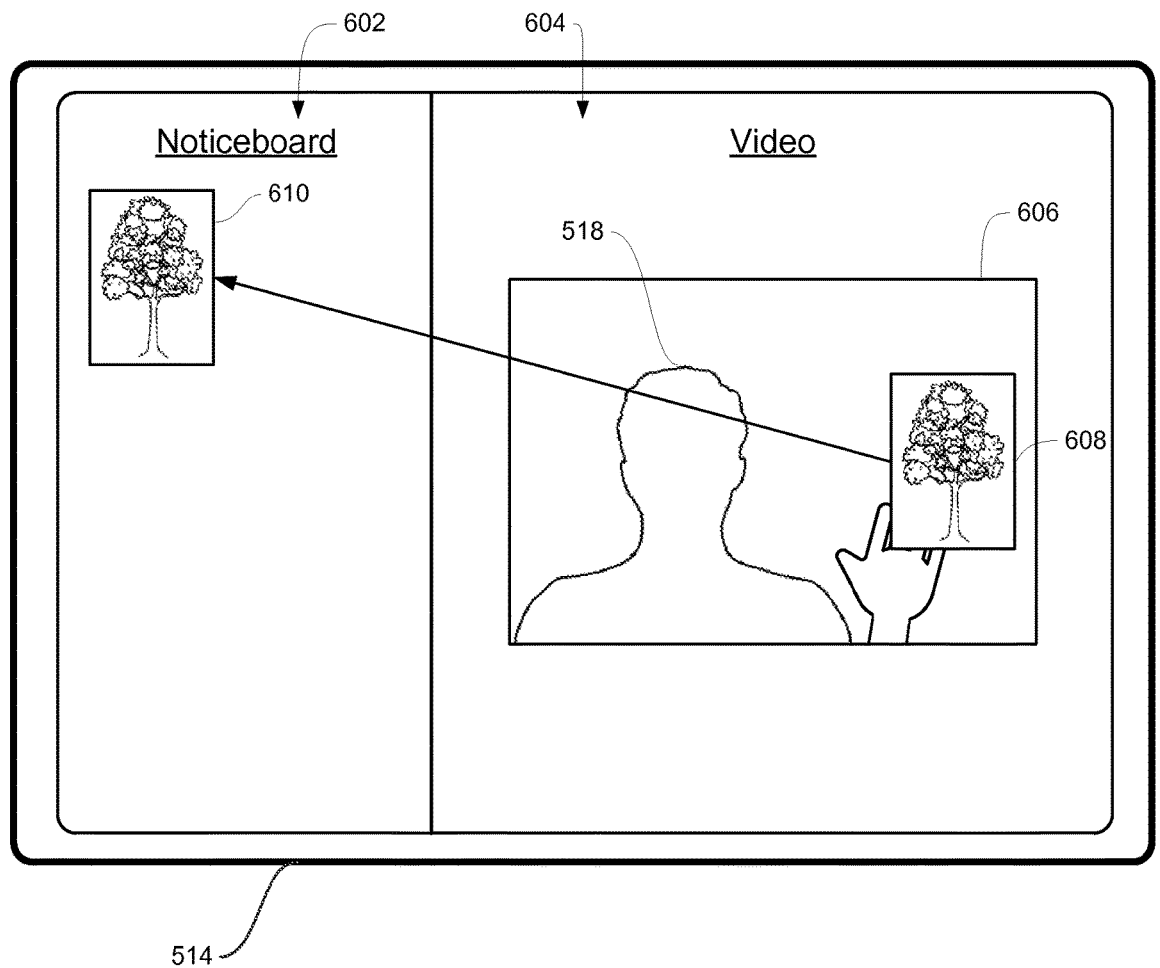
Figure 6F:
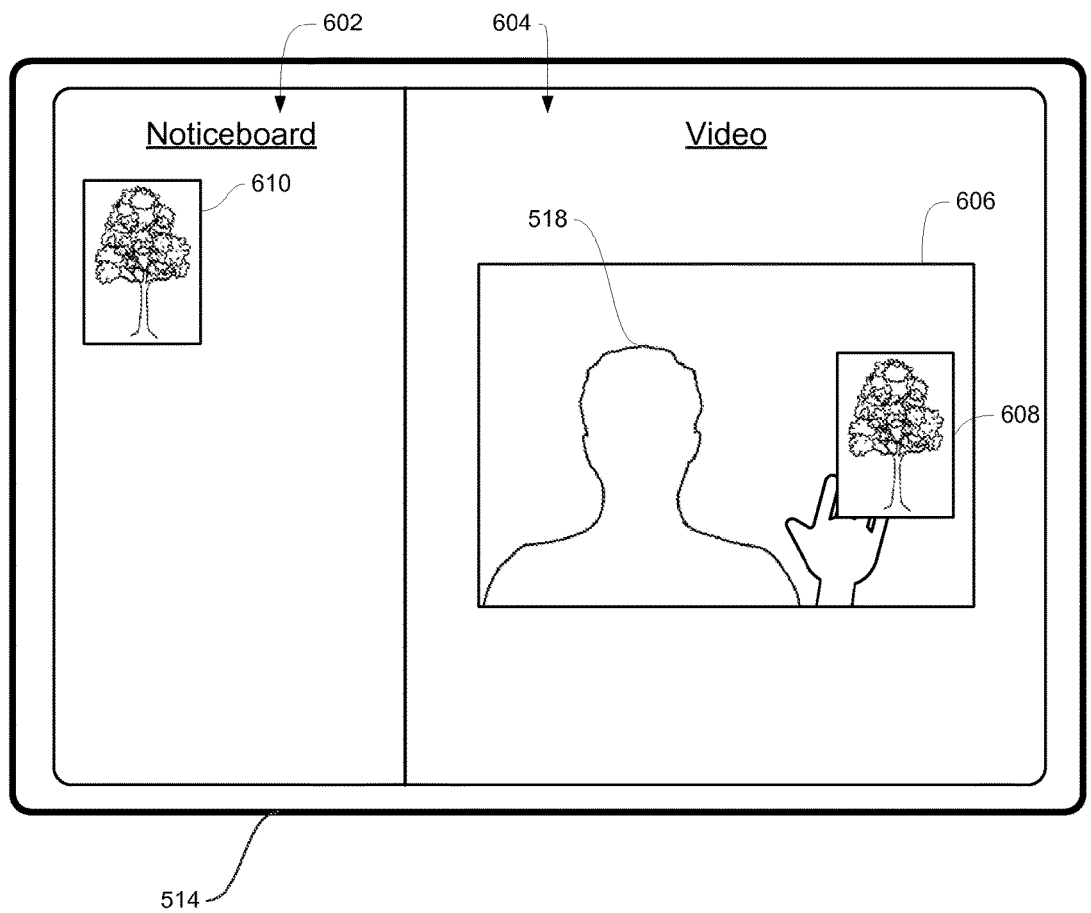
Figure 6G:
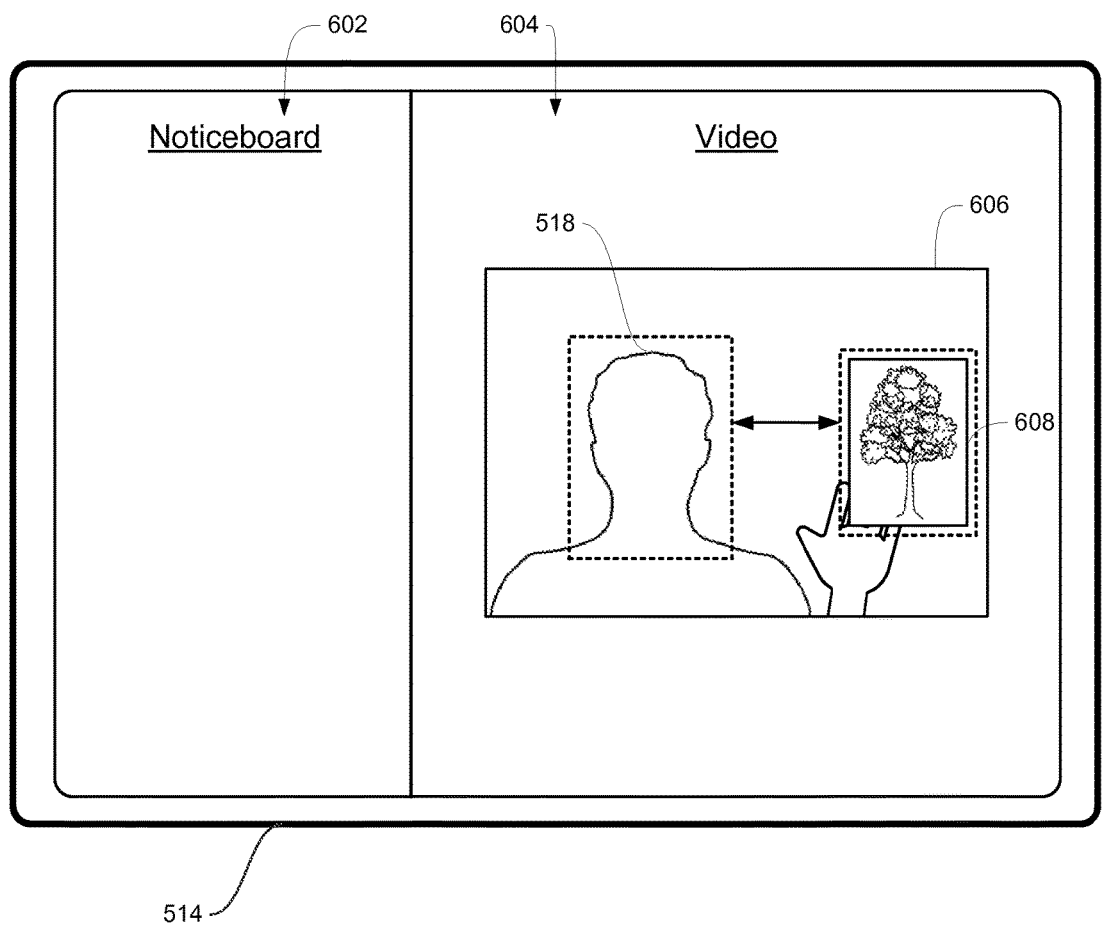
Figure 6H:
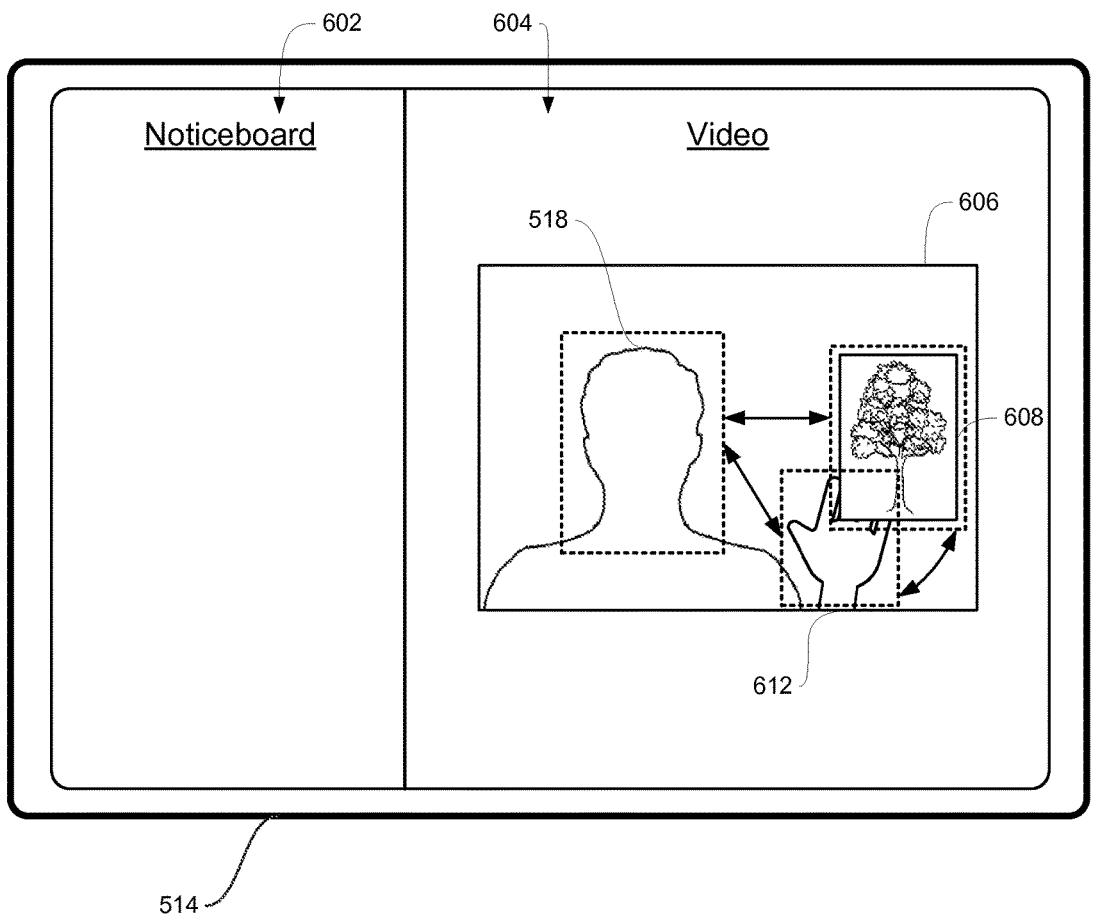
Figure 6I:
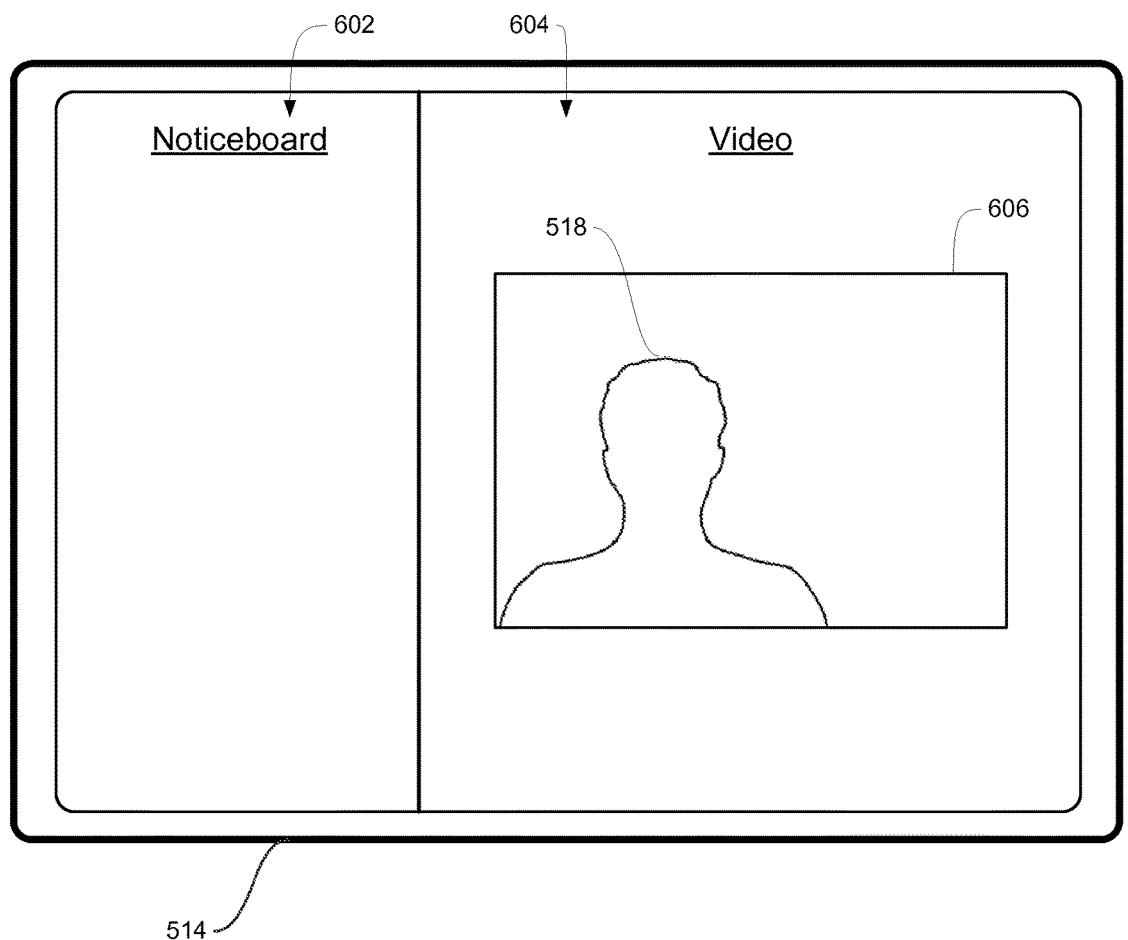
Figure 6J:
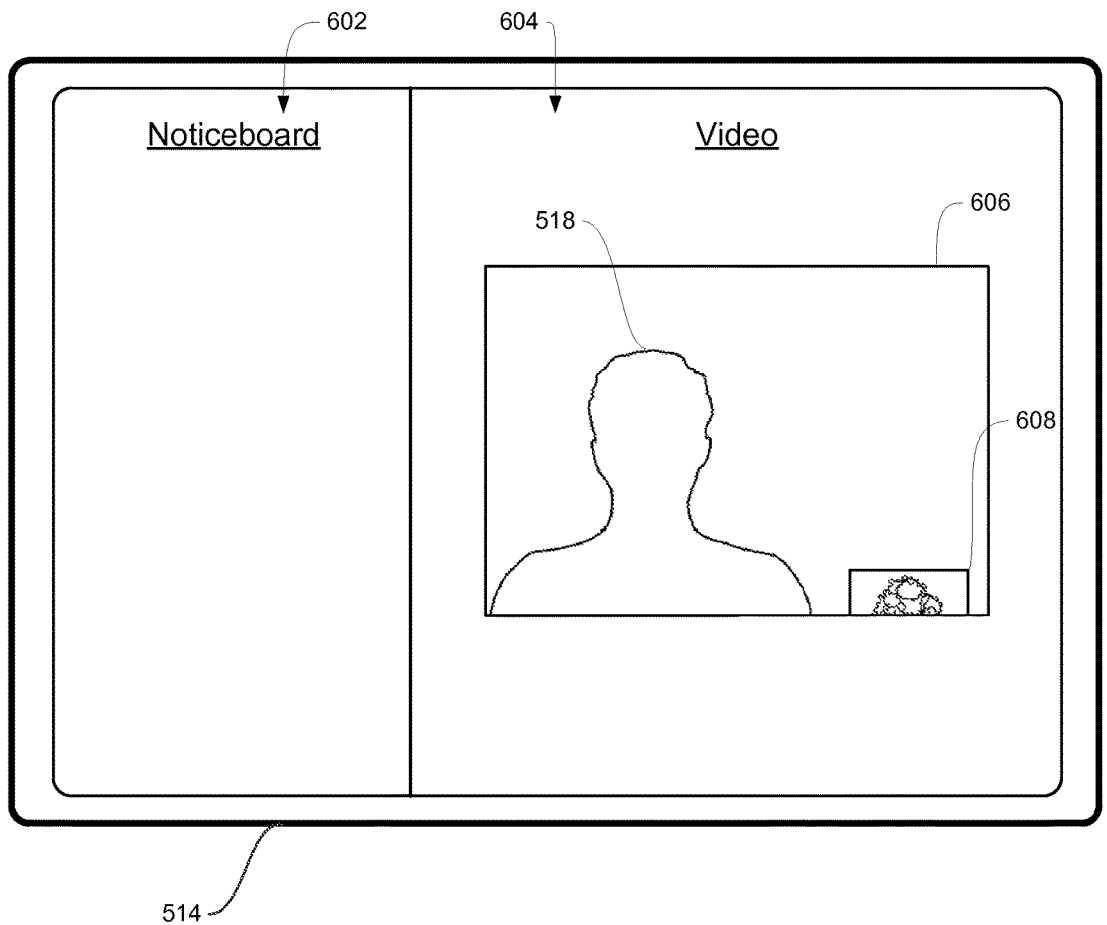
Figure 6K:
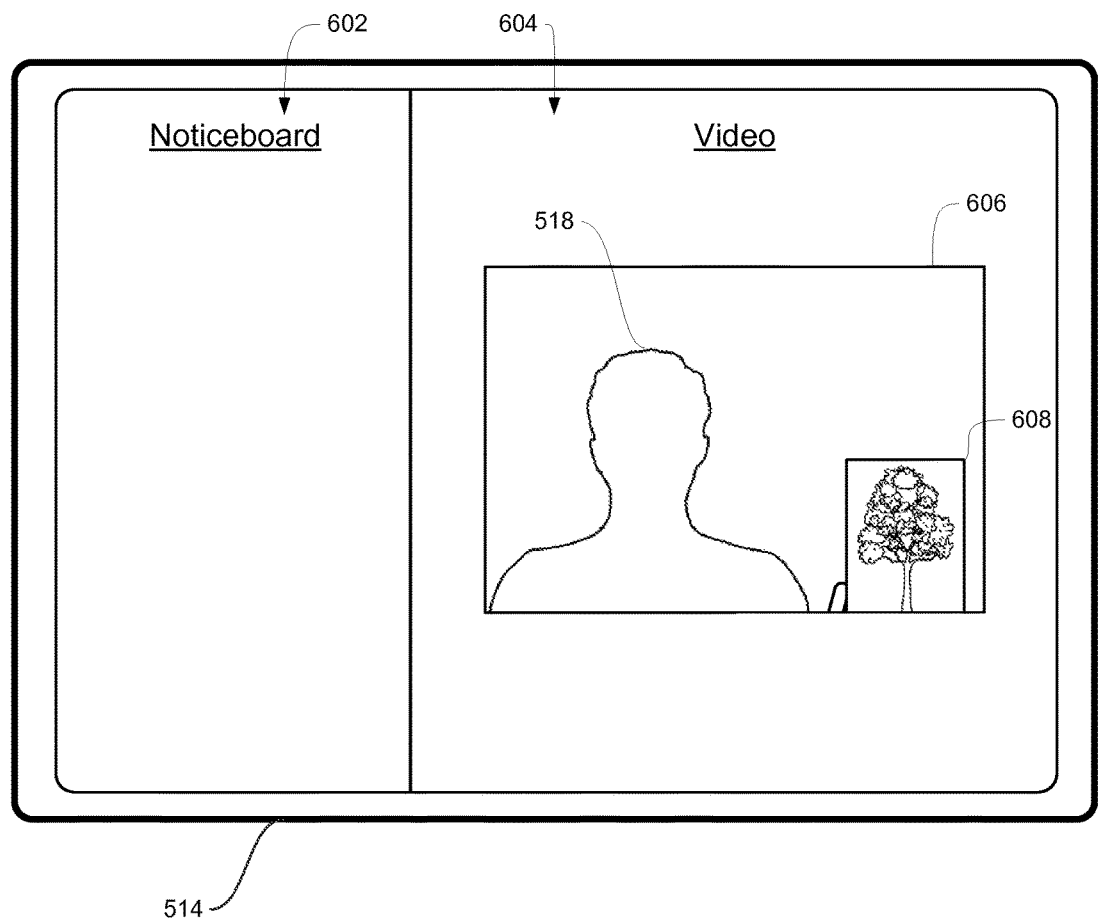
Figure 6L:
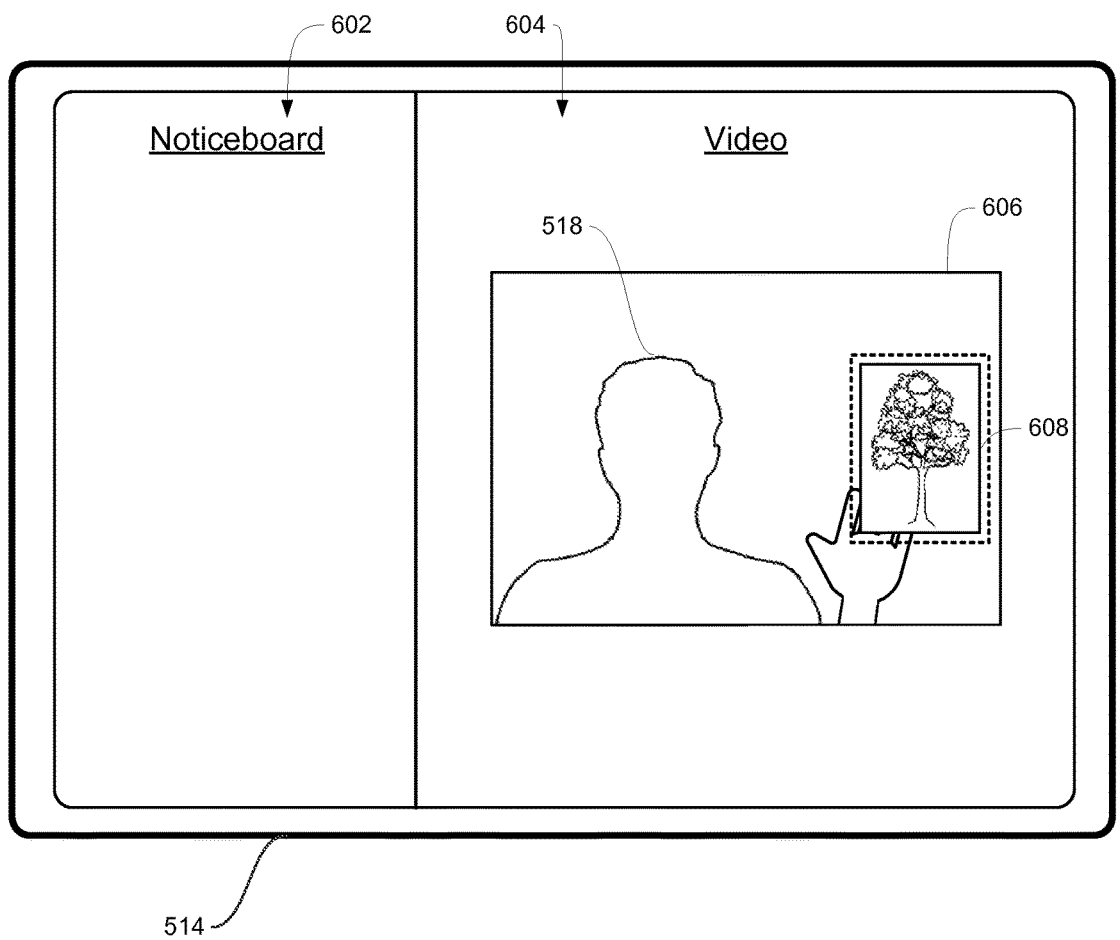
Figure 6M:
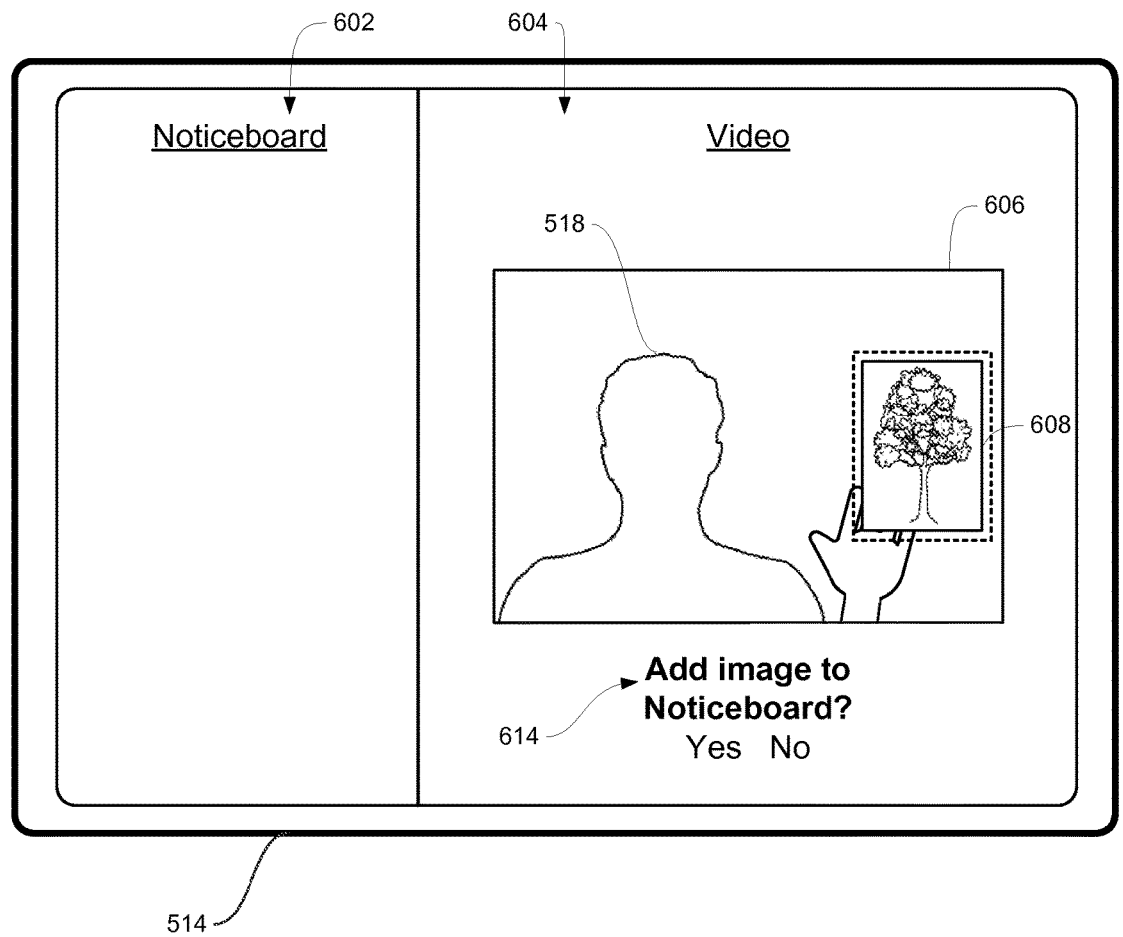
Figure 6N:
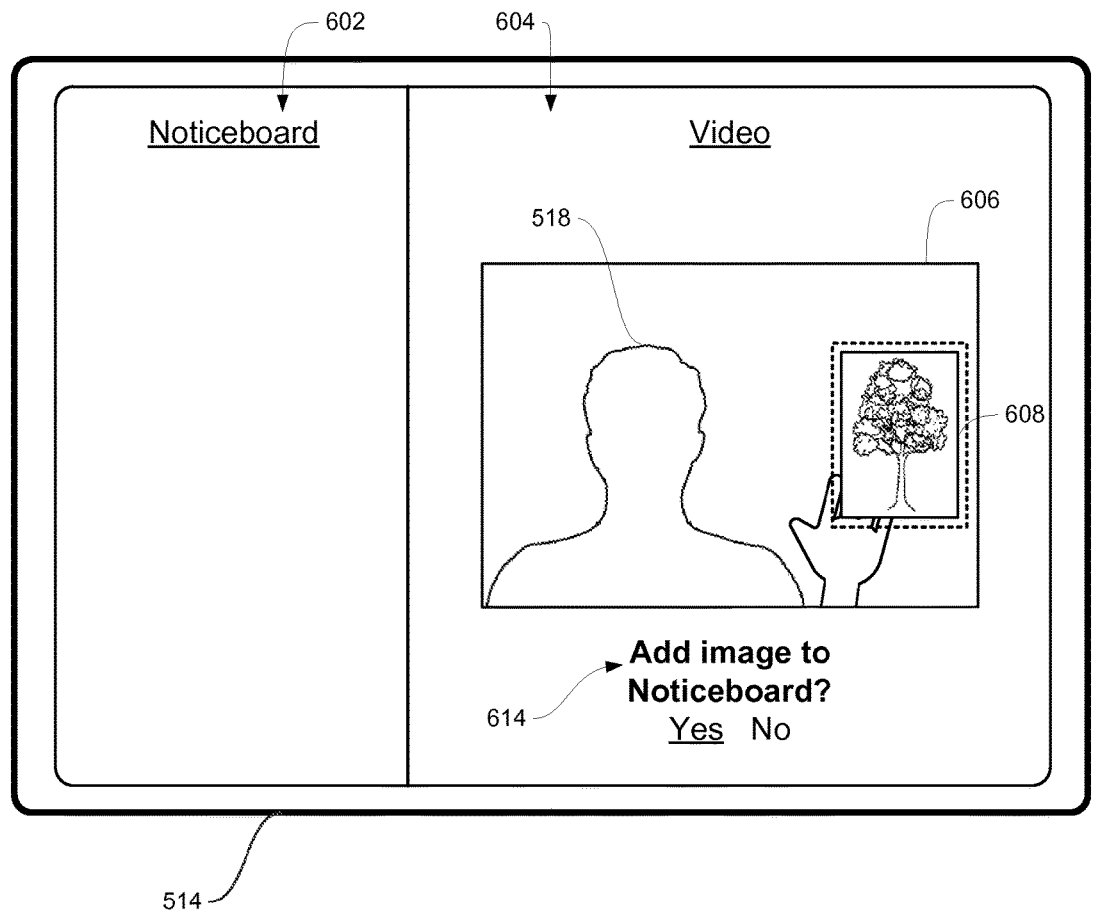
Figure 6O:
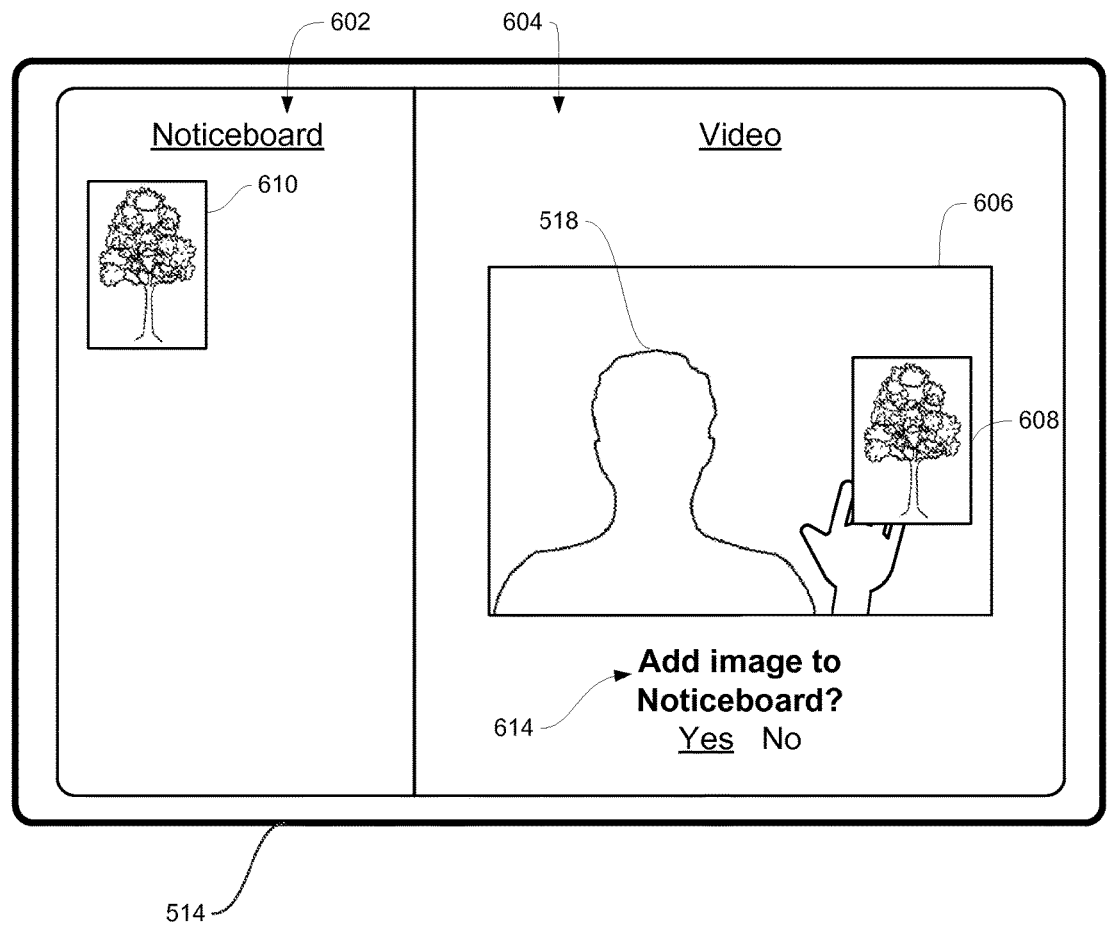
Figure 6P:
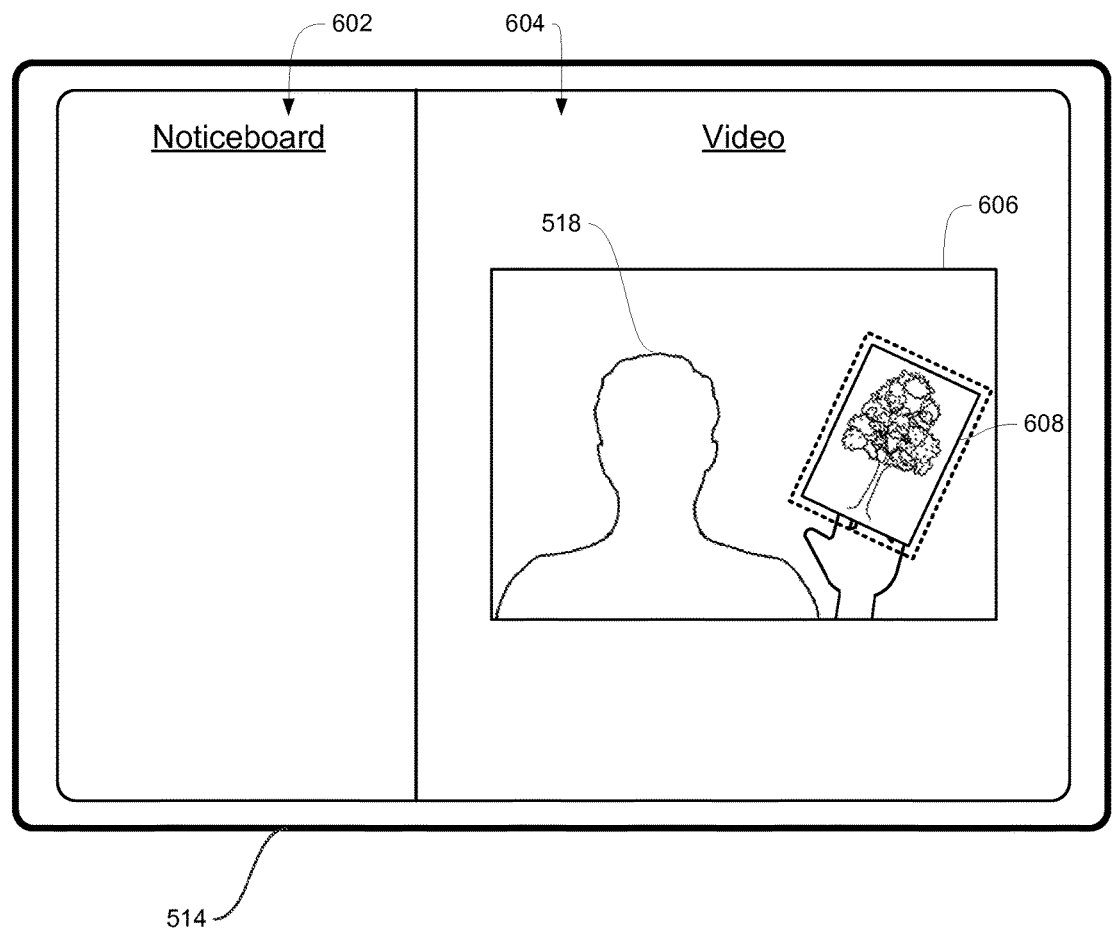
Figure 6Q:
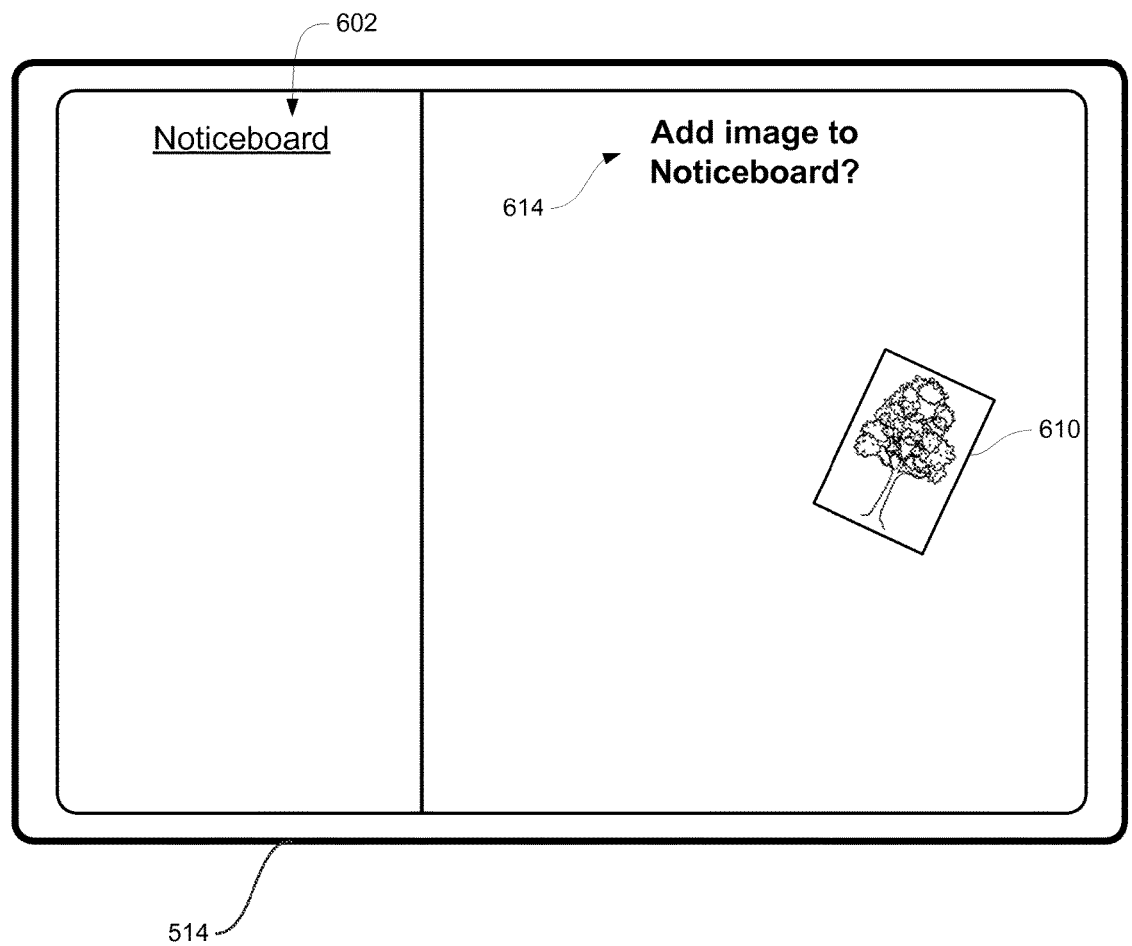
Figure 6R:
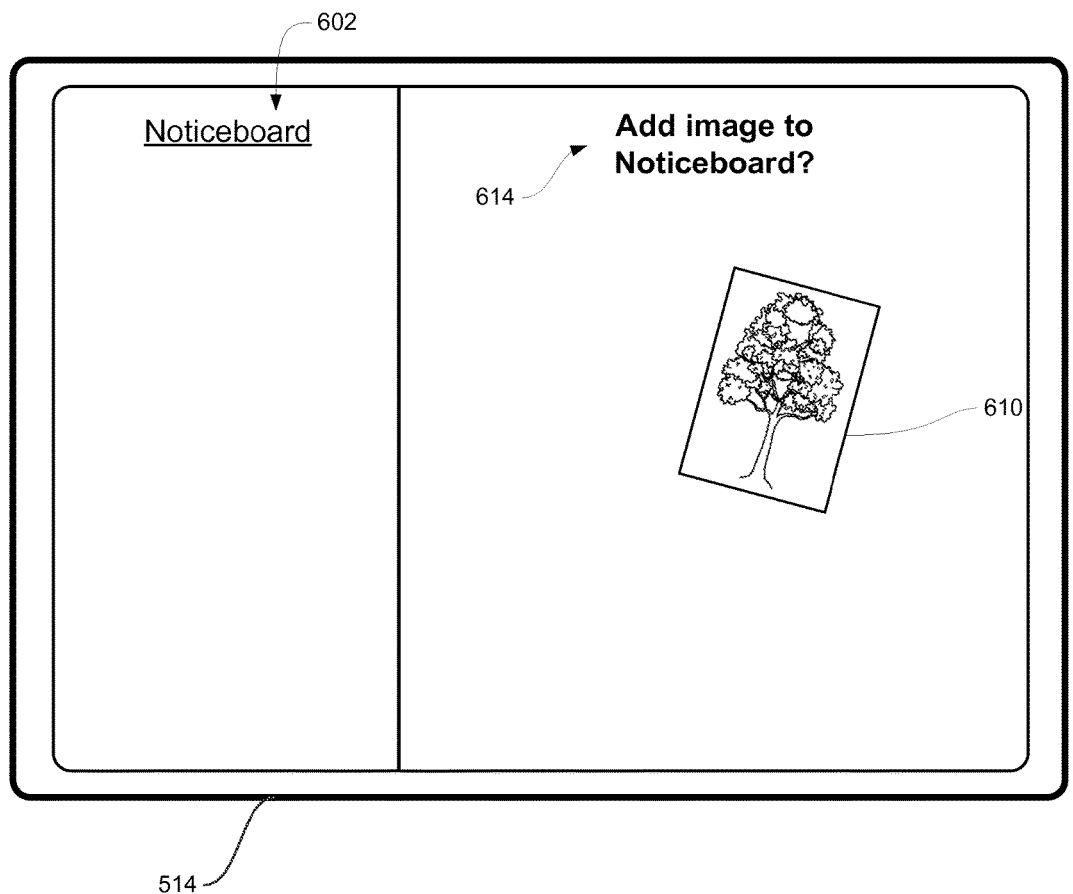
Figure 6S:
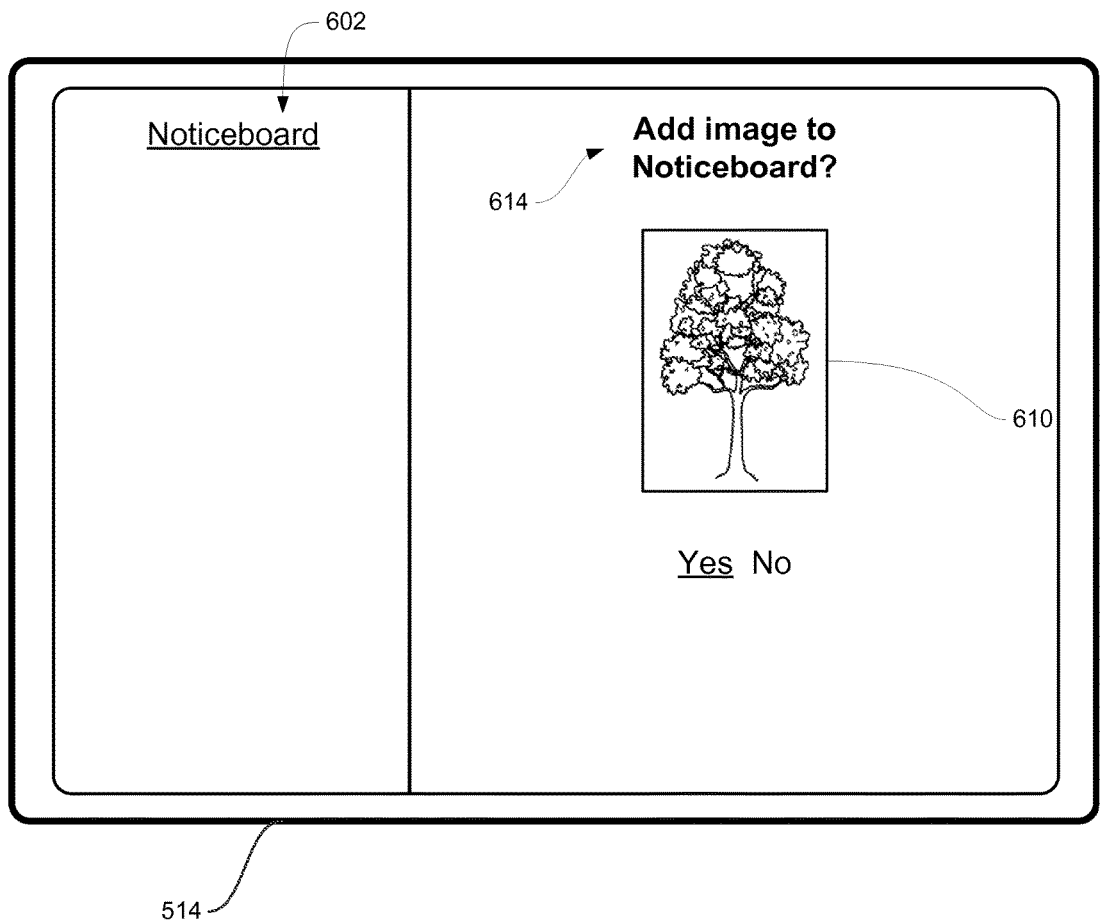
Figure 6T:
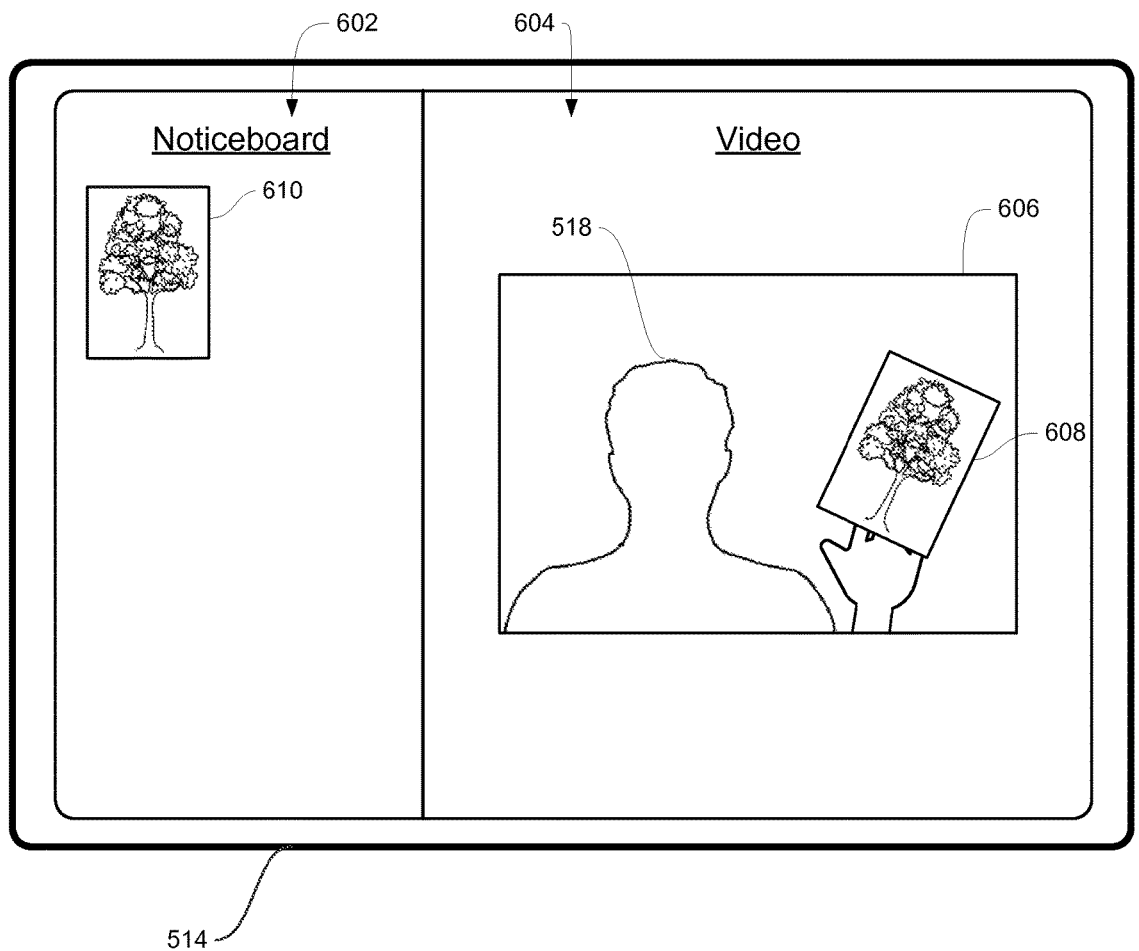
Figure 6U:
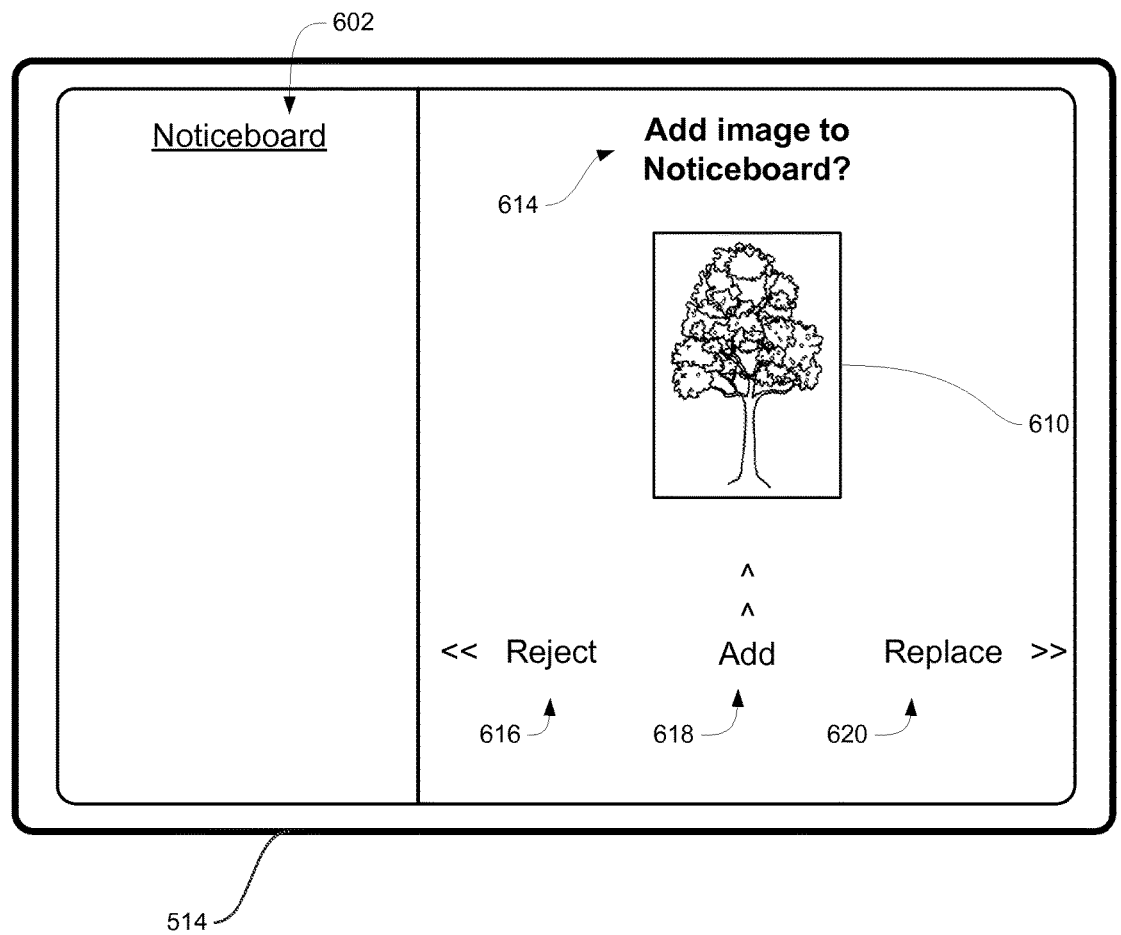
Figure 6V:
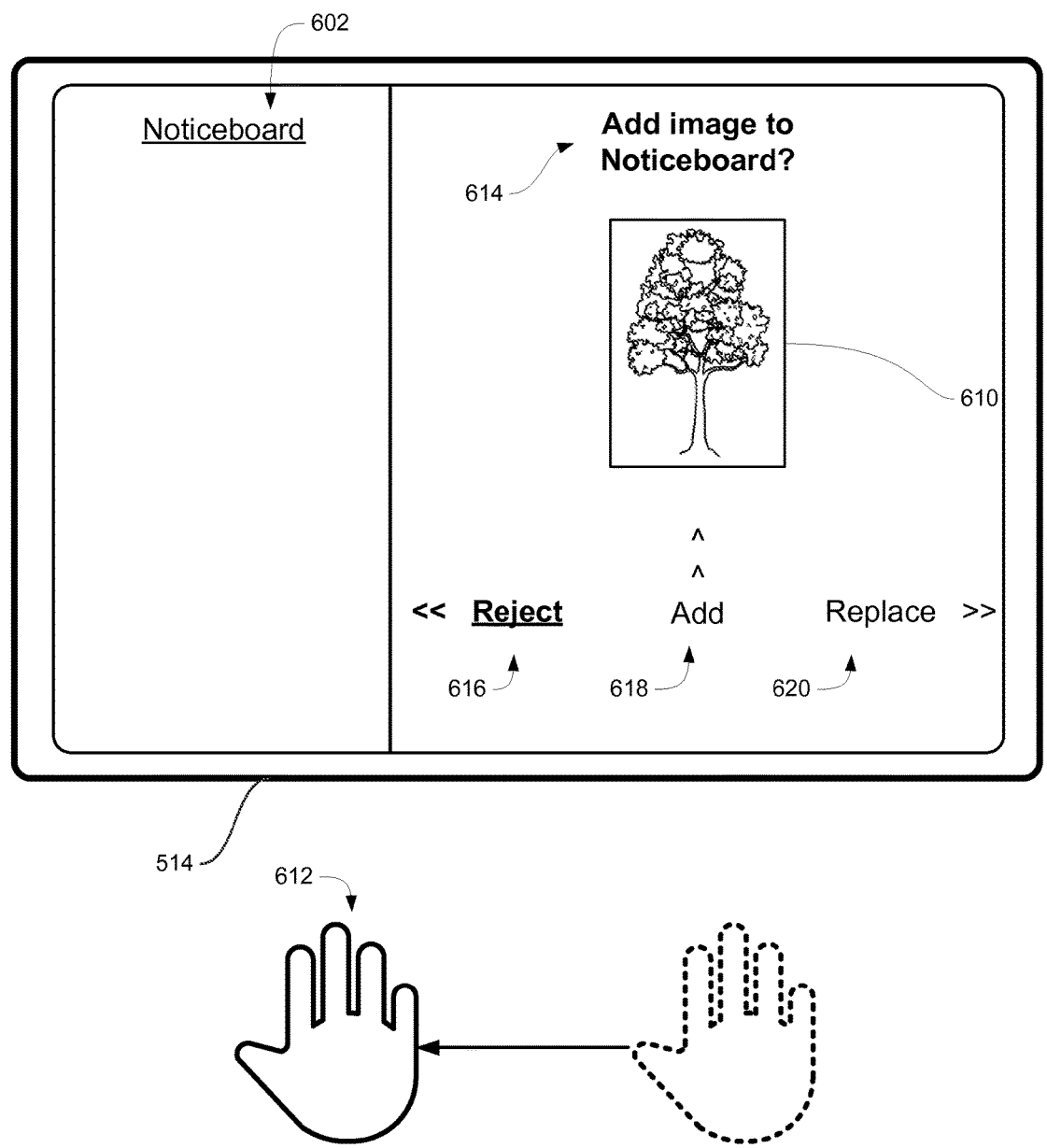
Figure 6W:
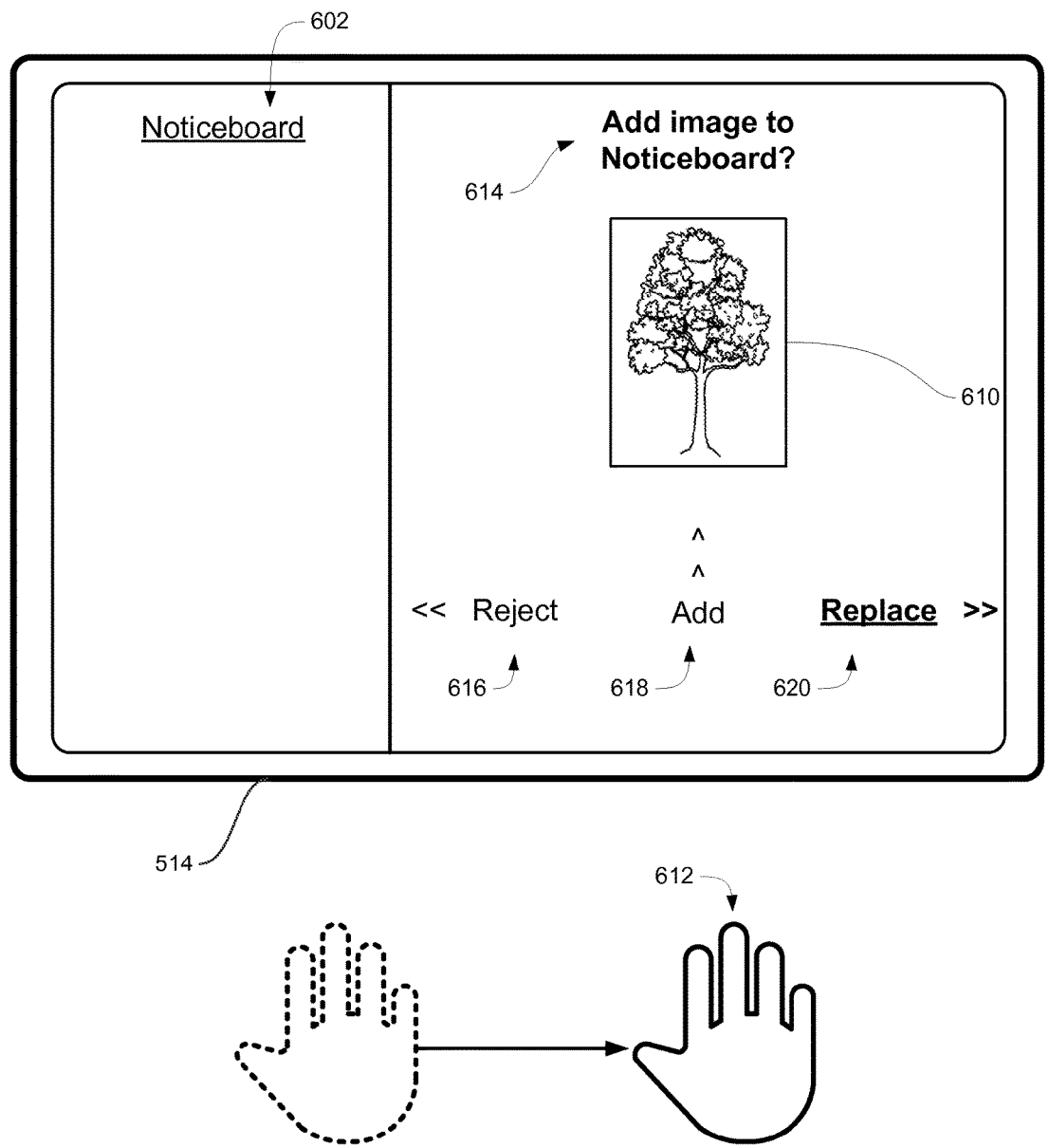
Figure 6X:
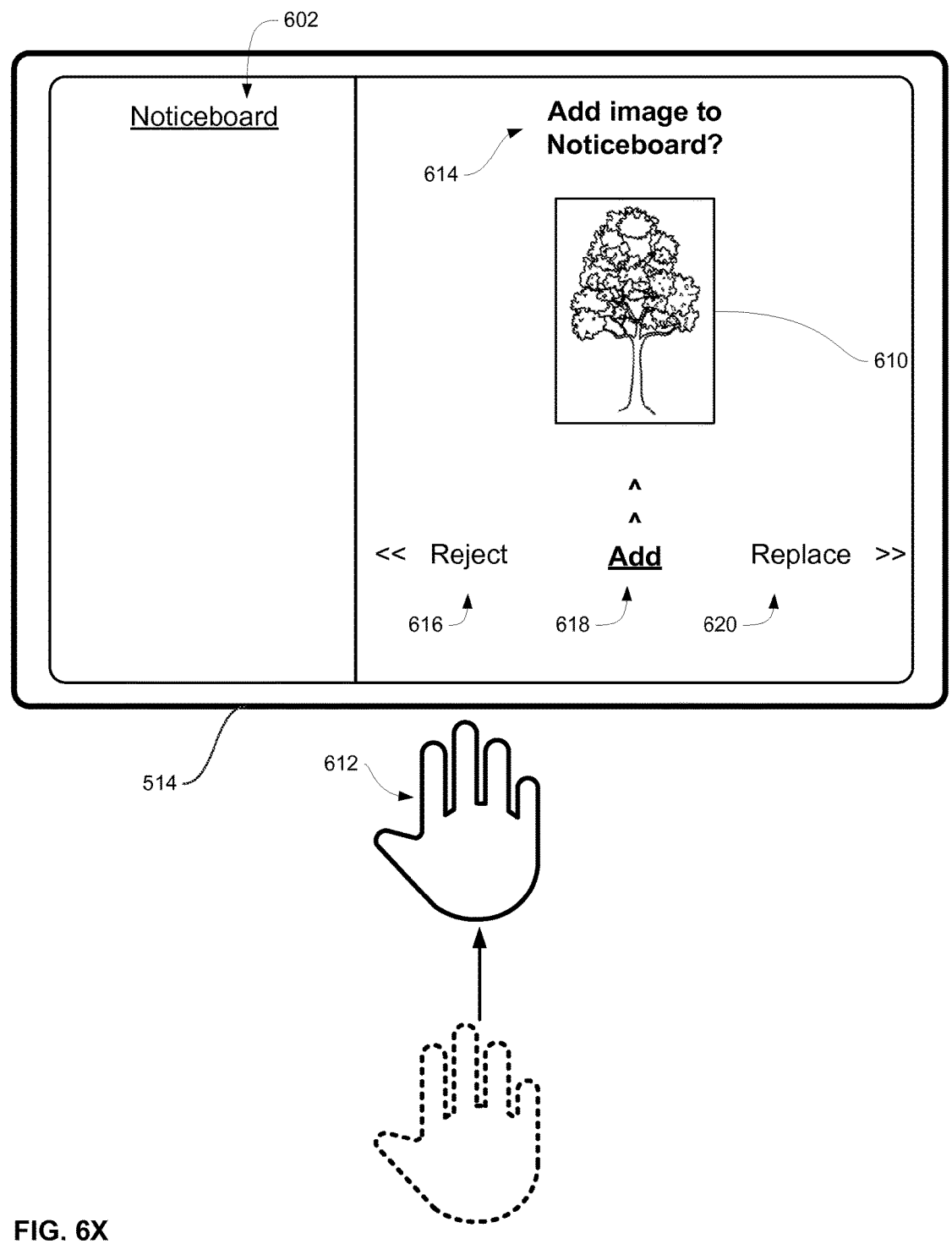
Figure 6Y:
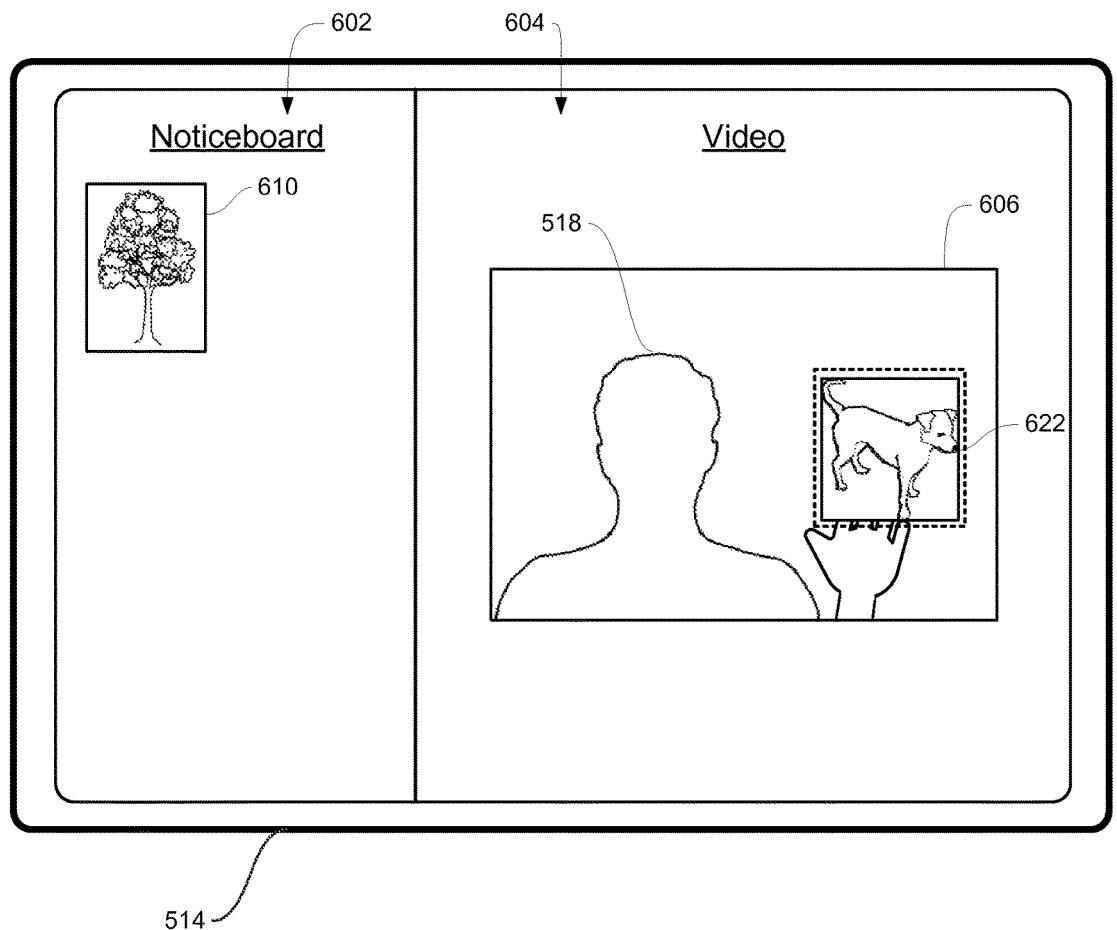
Figure 6Z:
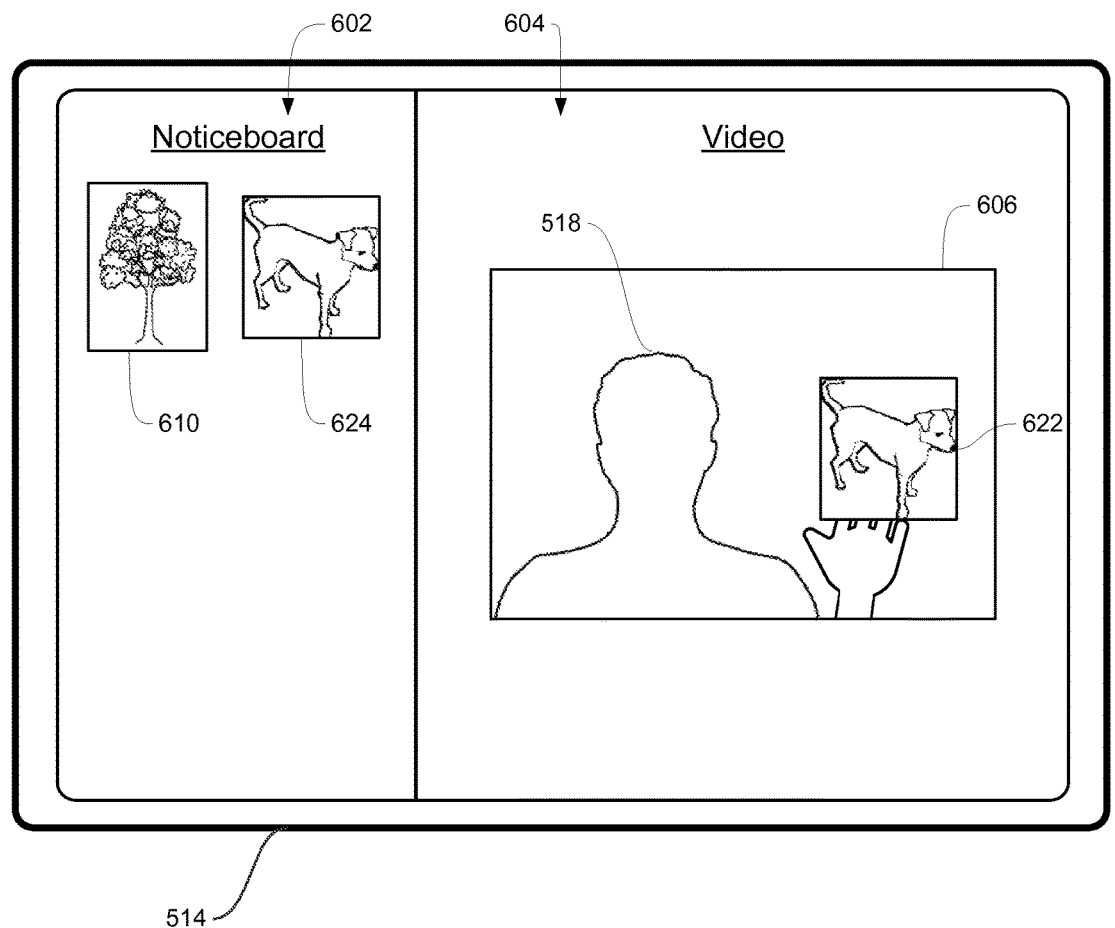
Figure 6A:
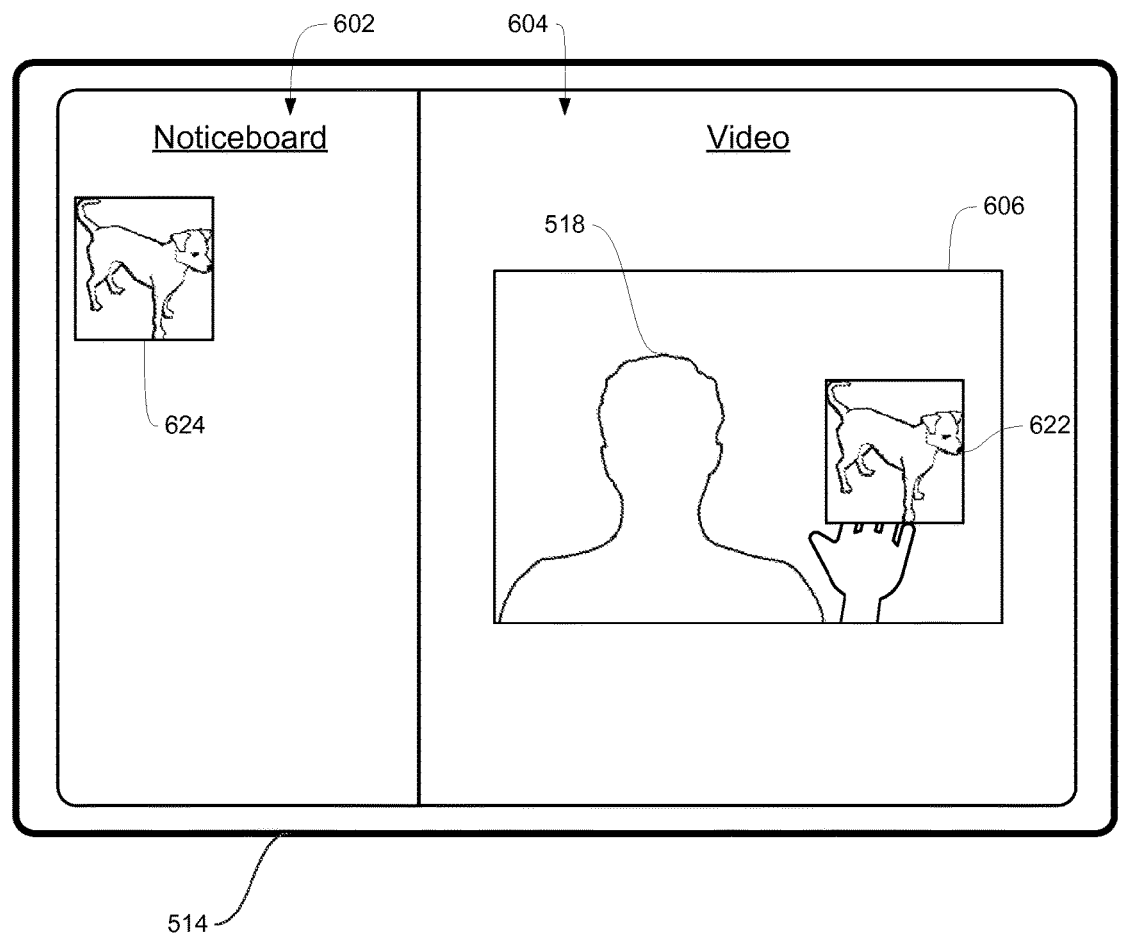
Figure 6B:
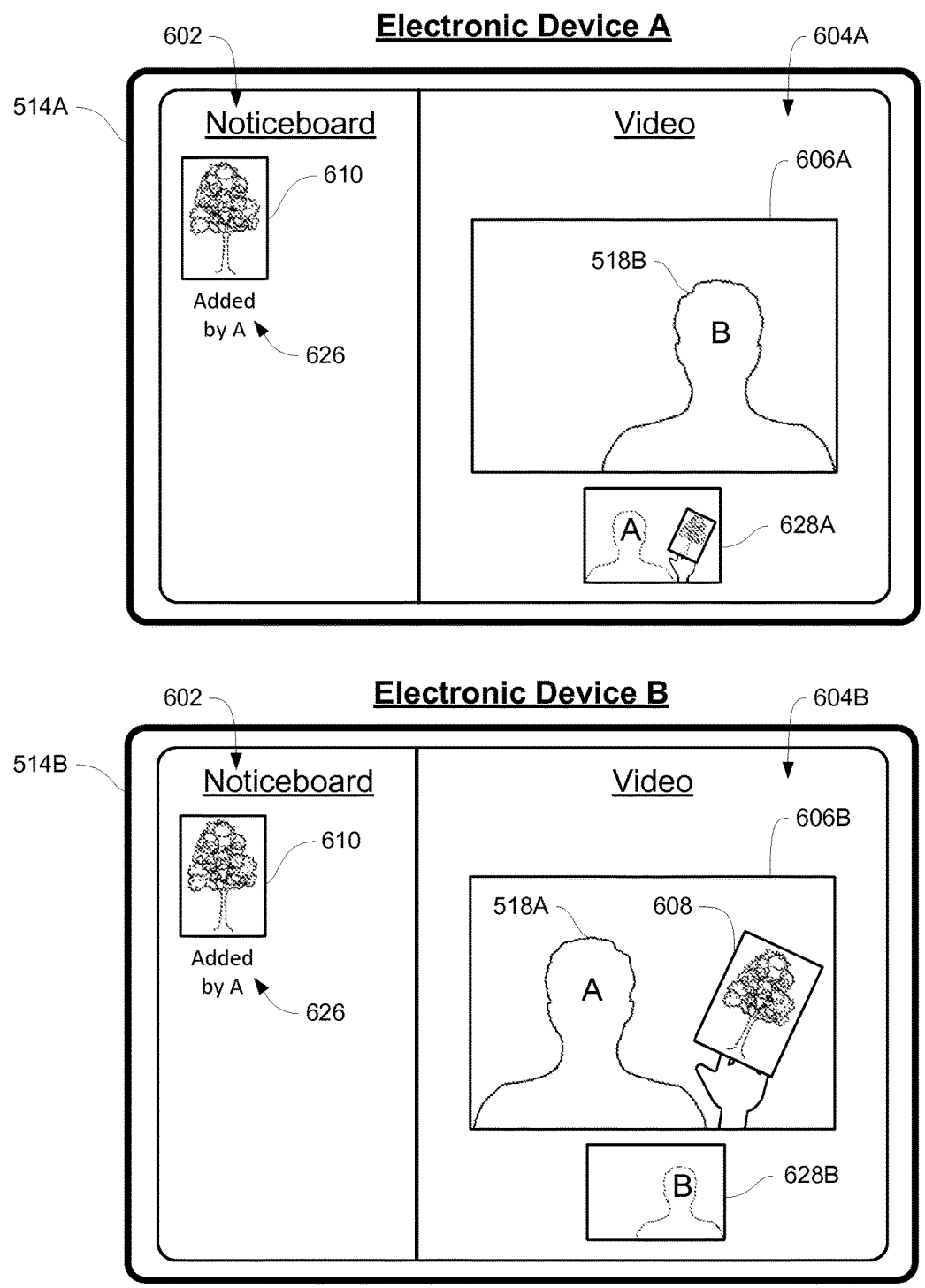
Figure 6C:
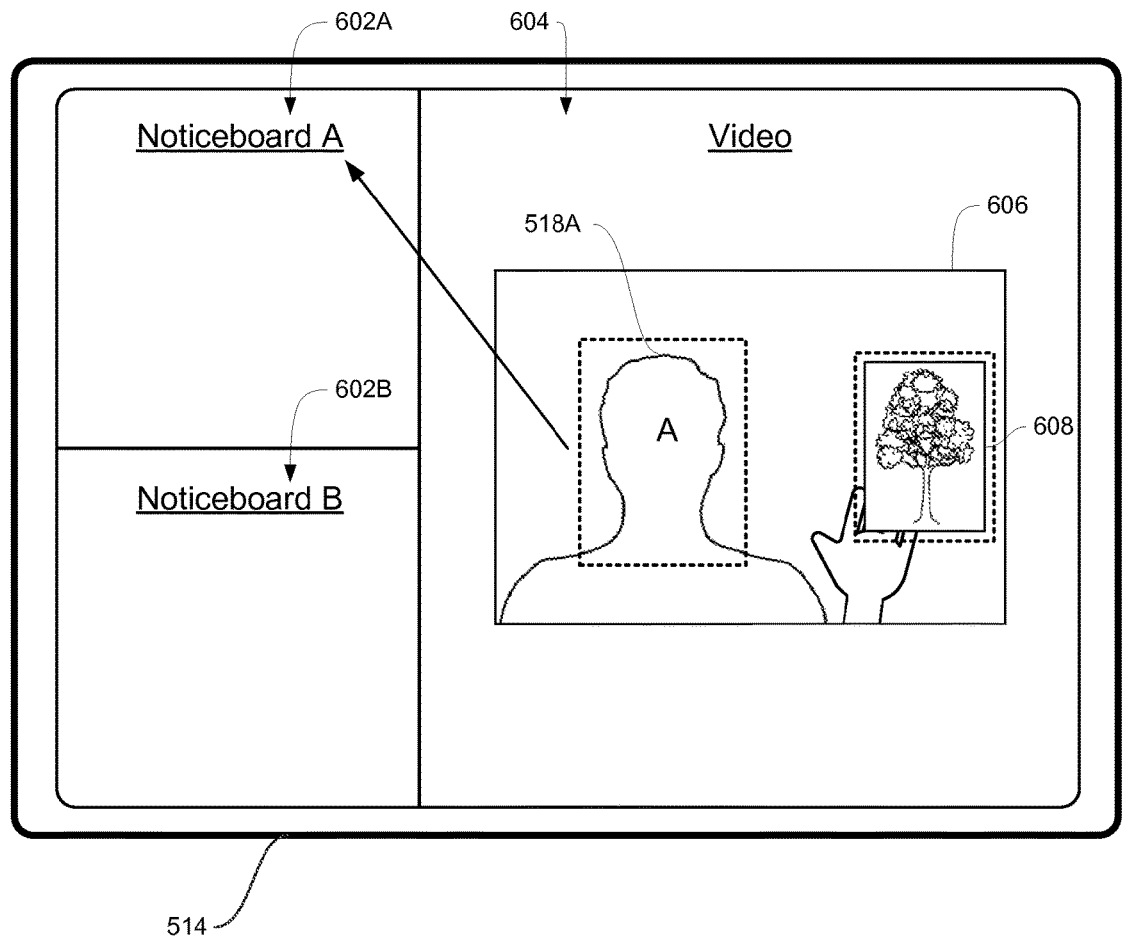
Figure 6D:
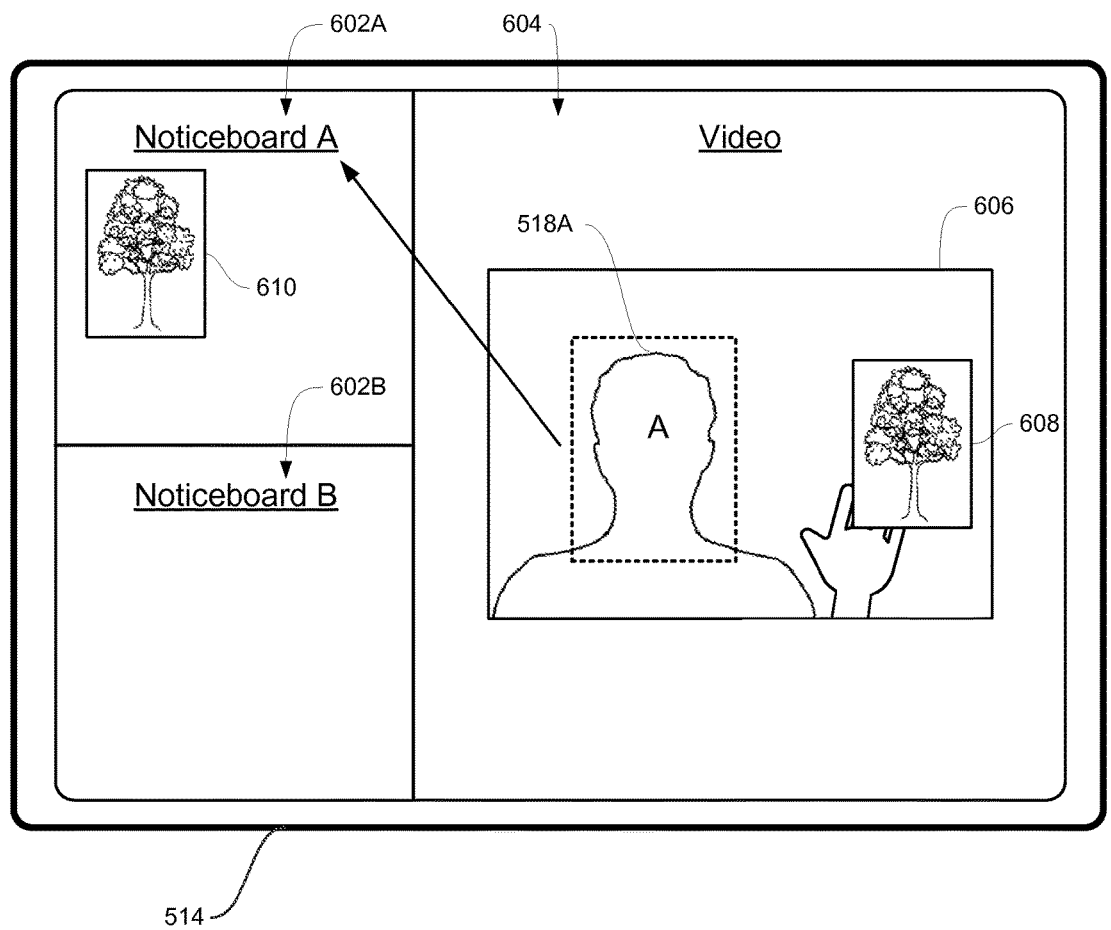
Figure 6E:
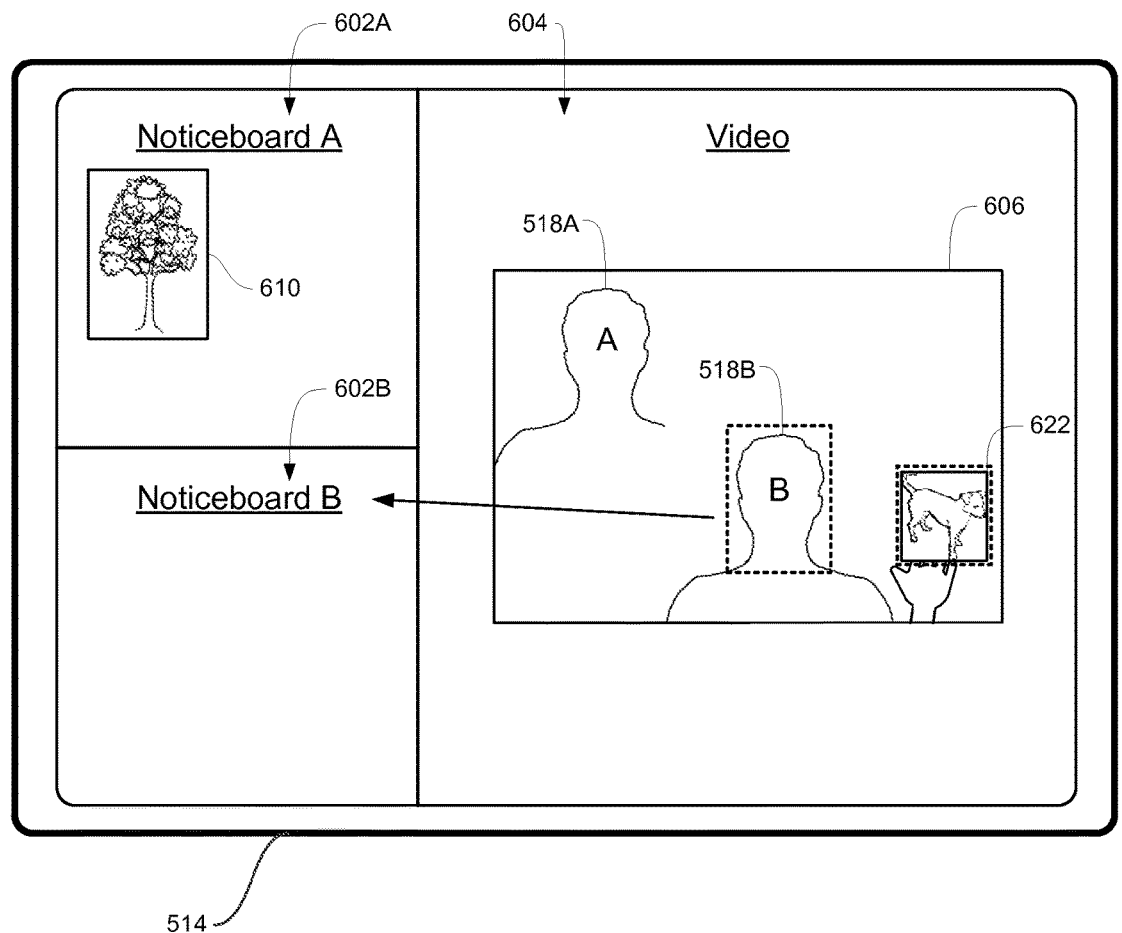
Figure 6F:
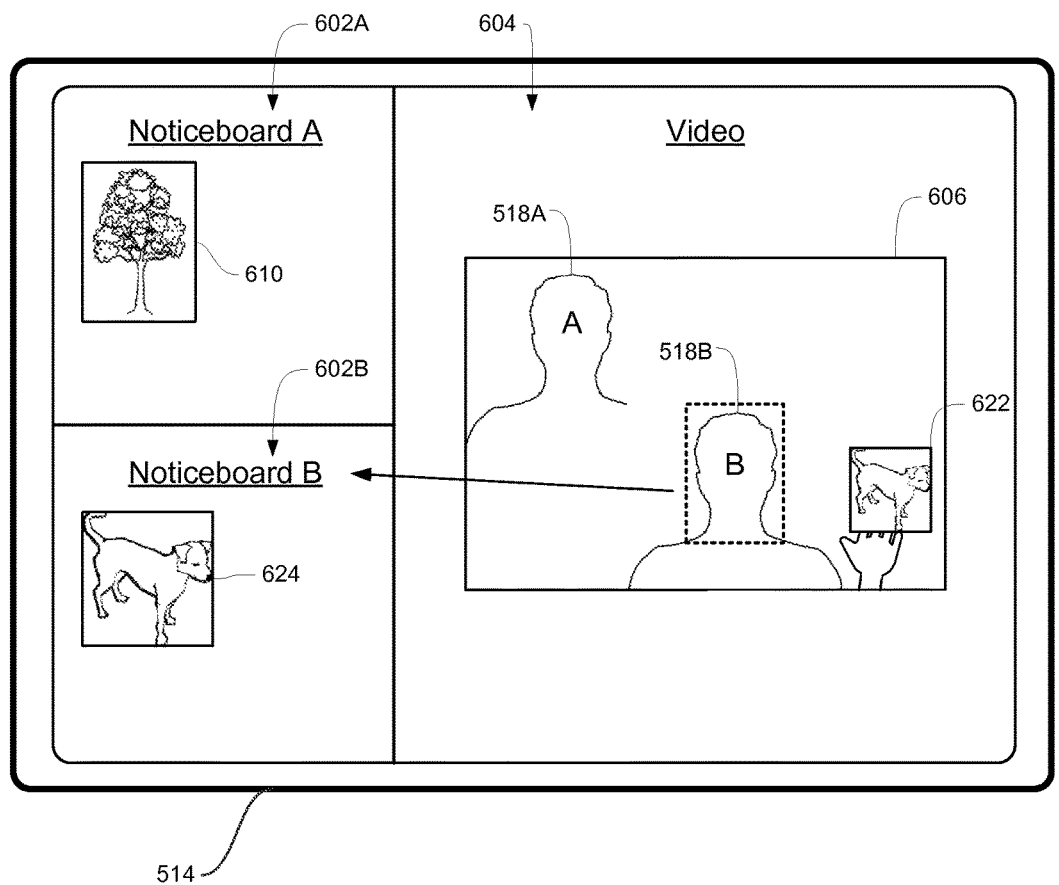
Figure 6G:
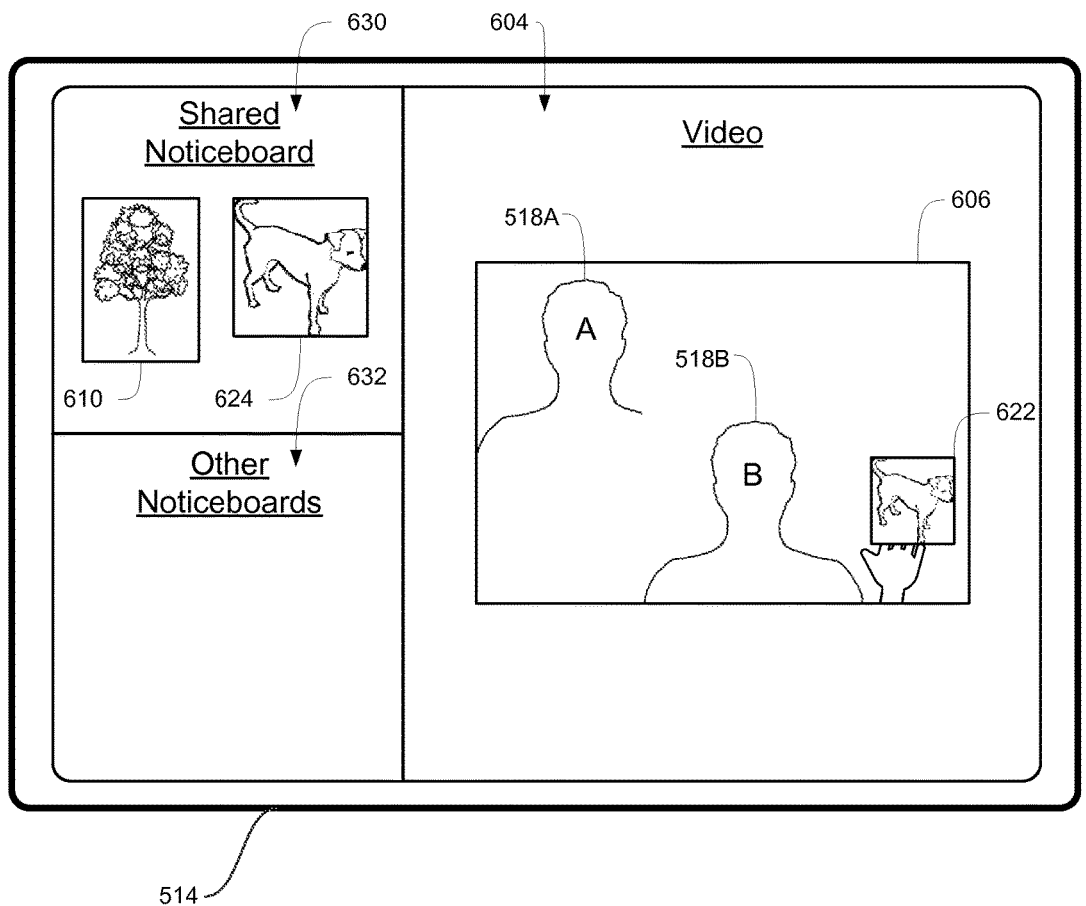
Figure 7A:
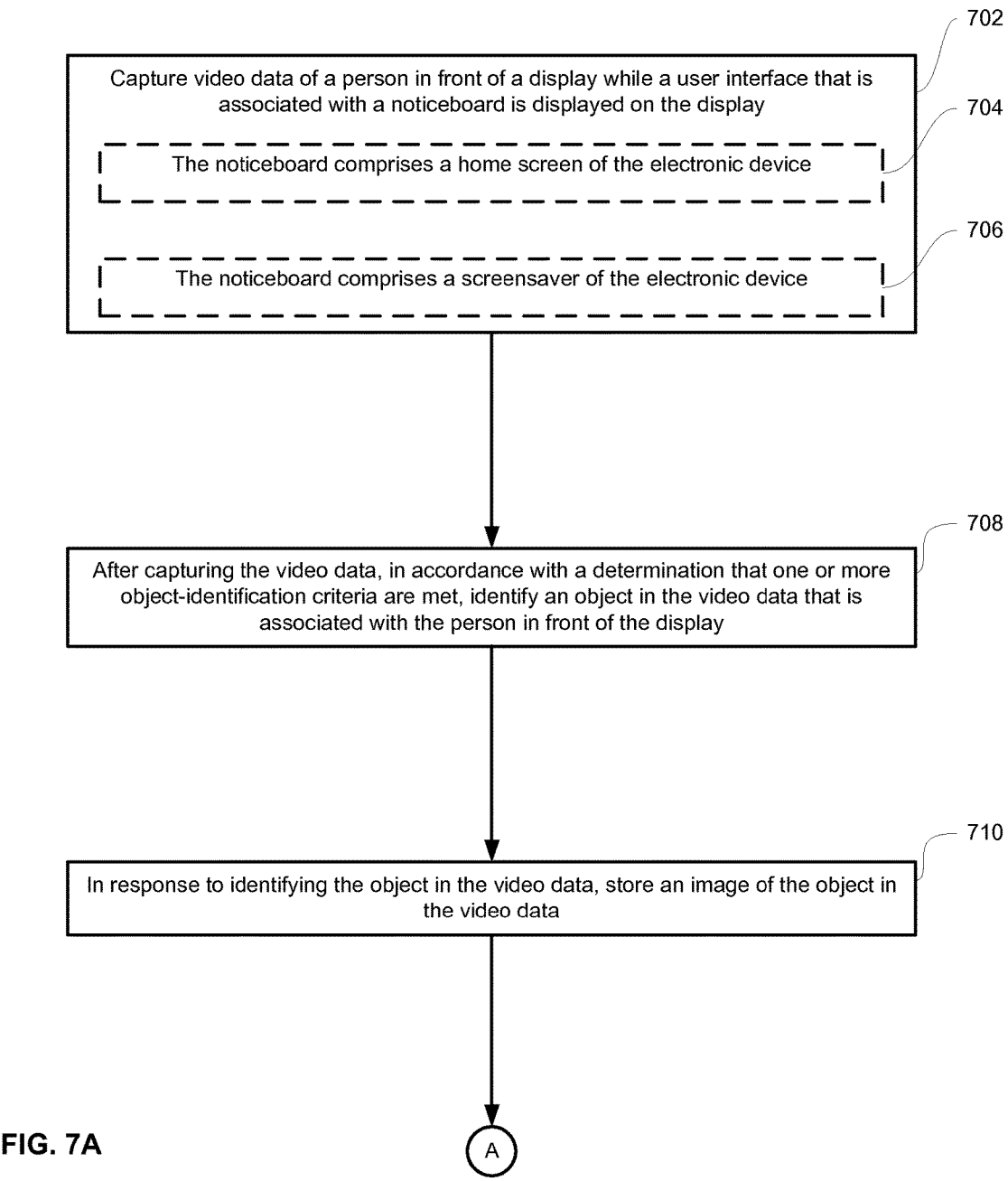
FIGS. 7A-7G are flow diagrams illustrating a method of identifying objects in video data, and adding images of those objects to one or more noticeboards in accordance with some embodiments of the disclosure.
Figure 7B:
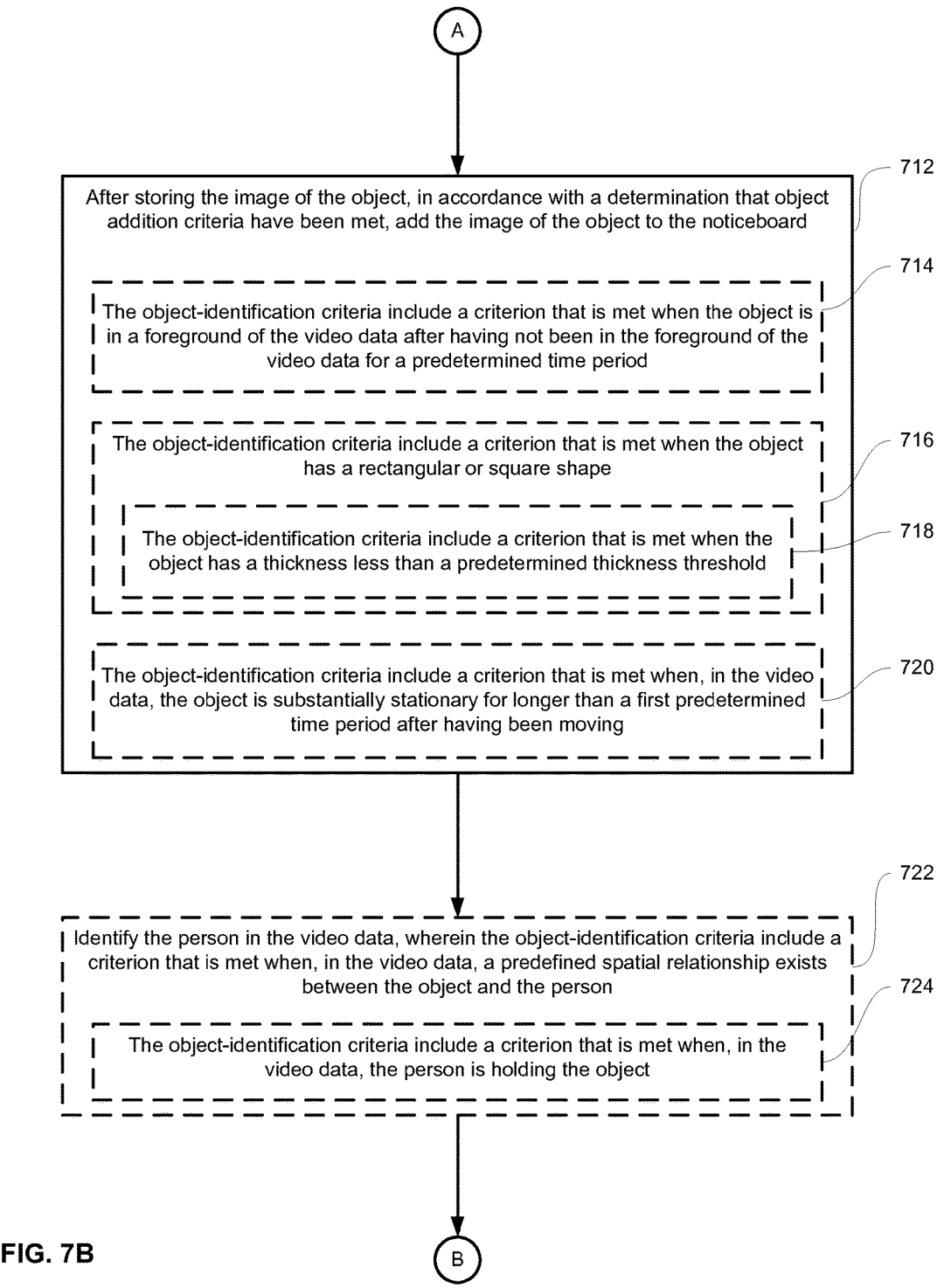
Figure 7C:
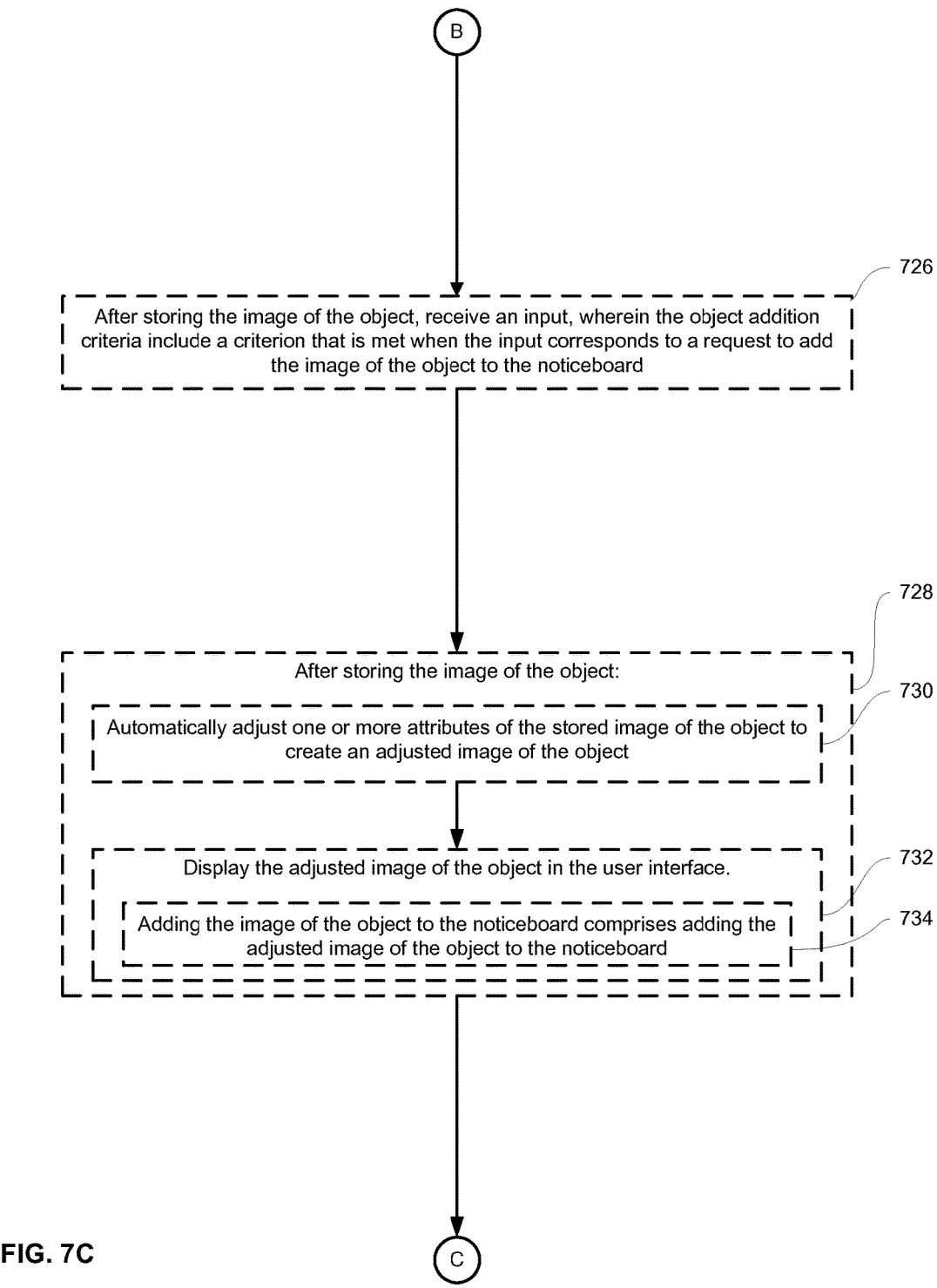
Figure 7D:
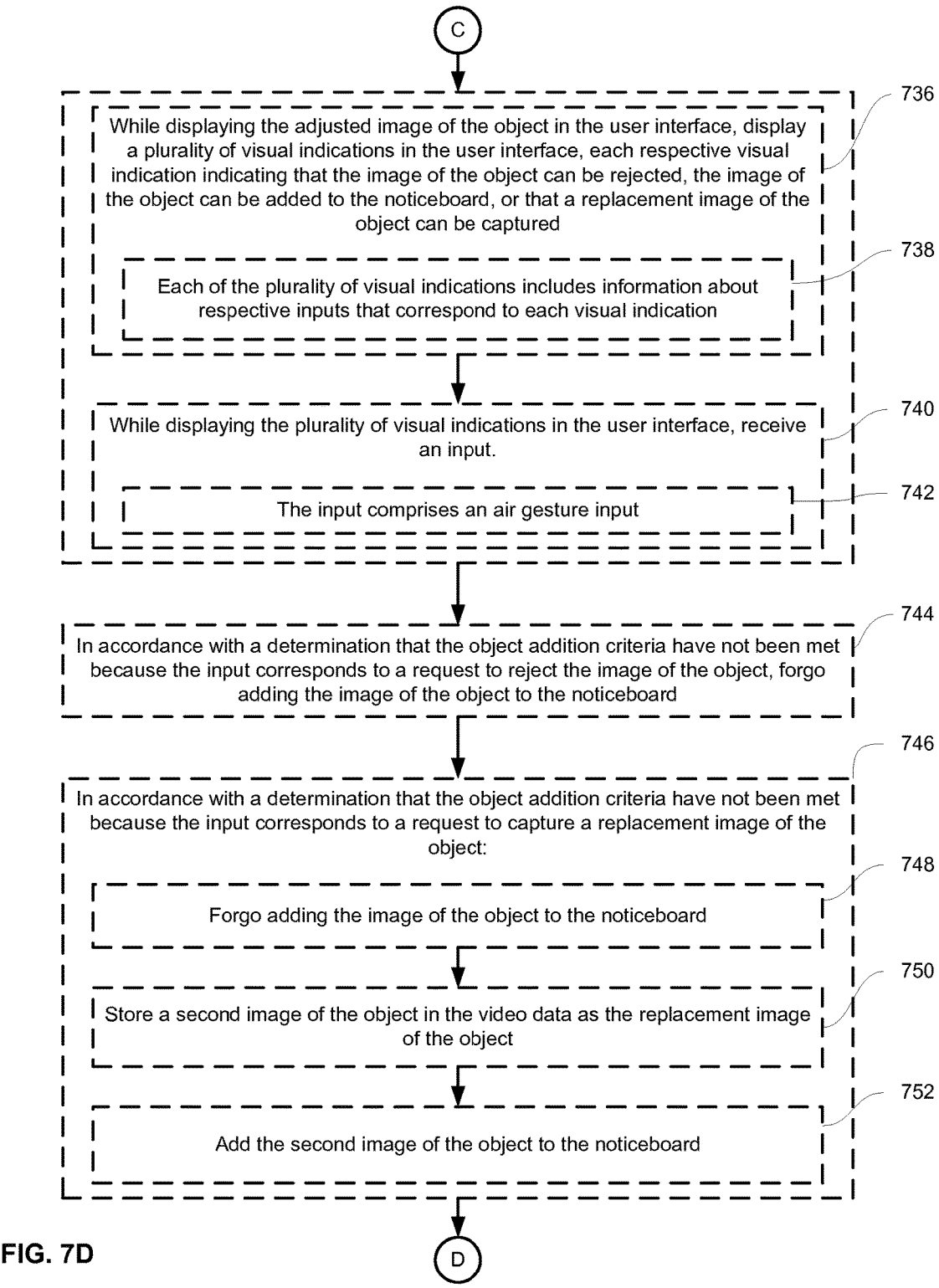
Figure 7E:
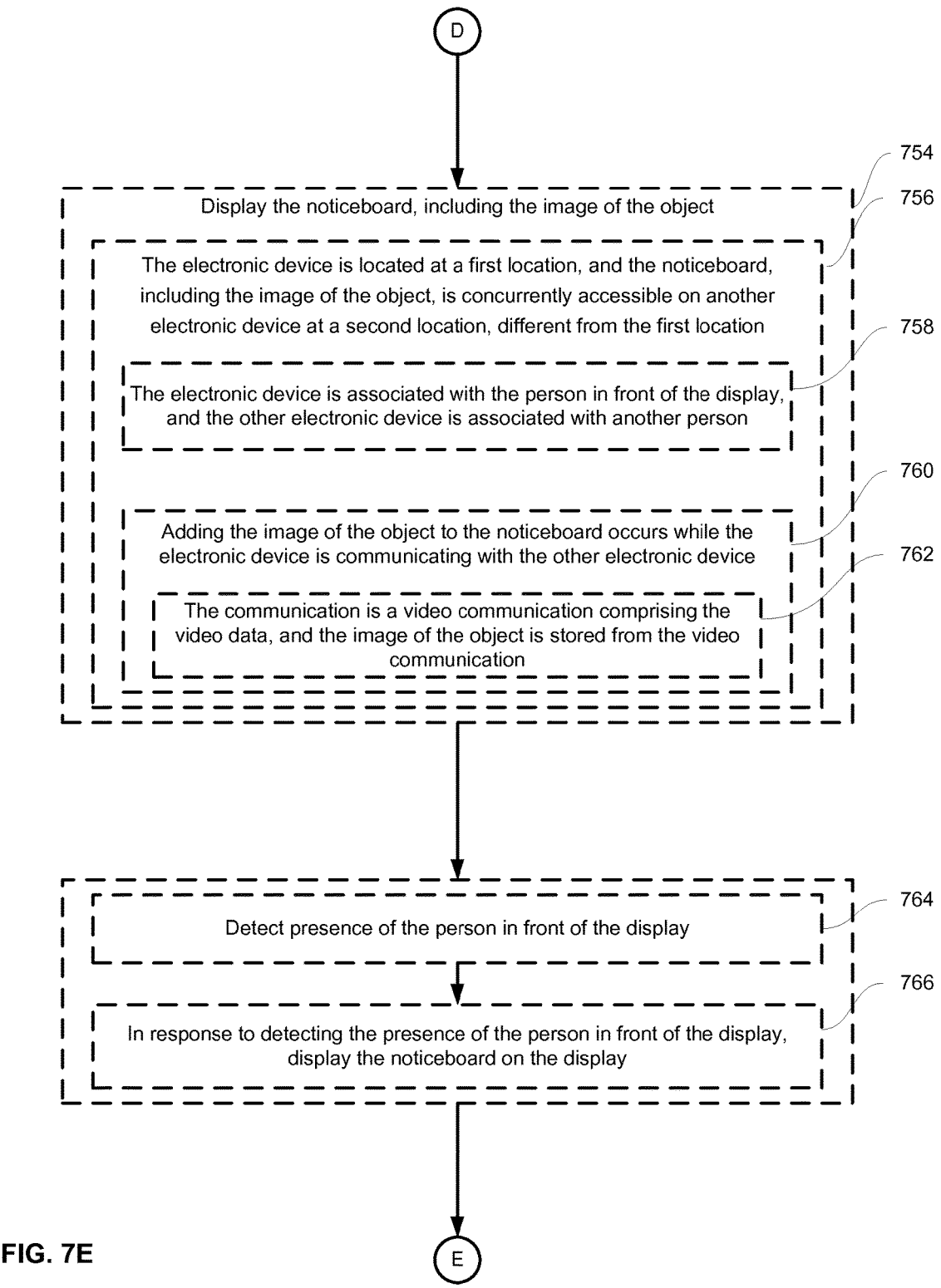
Figure 7F:
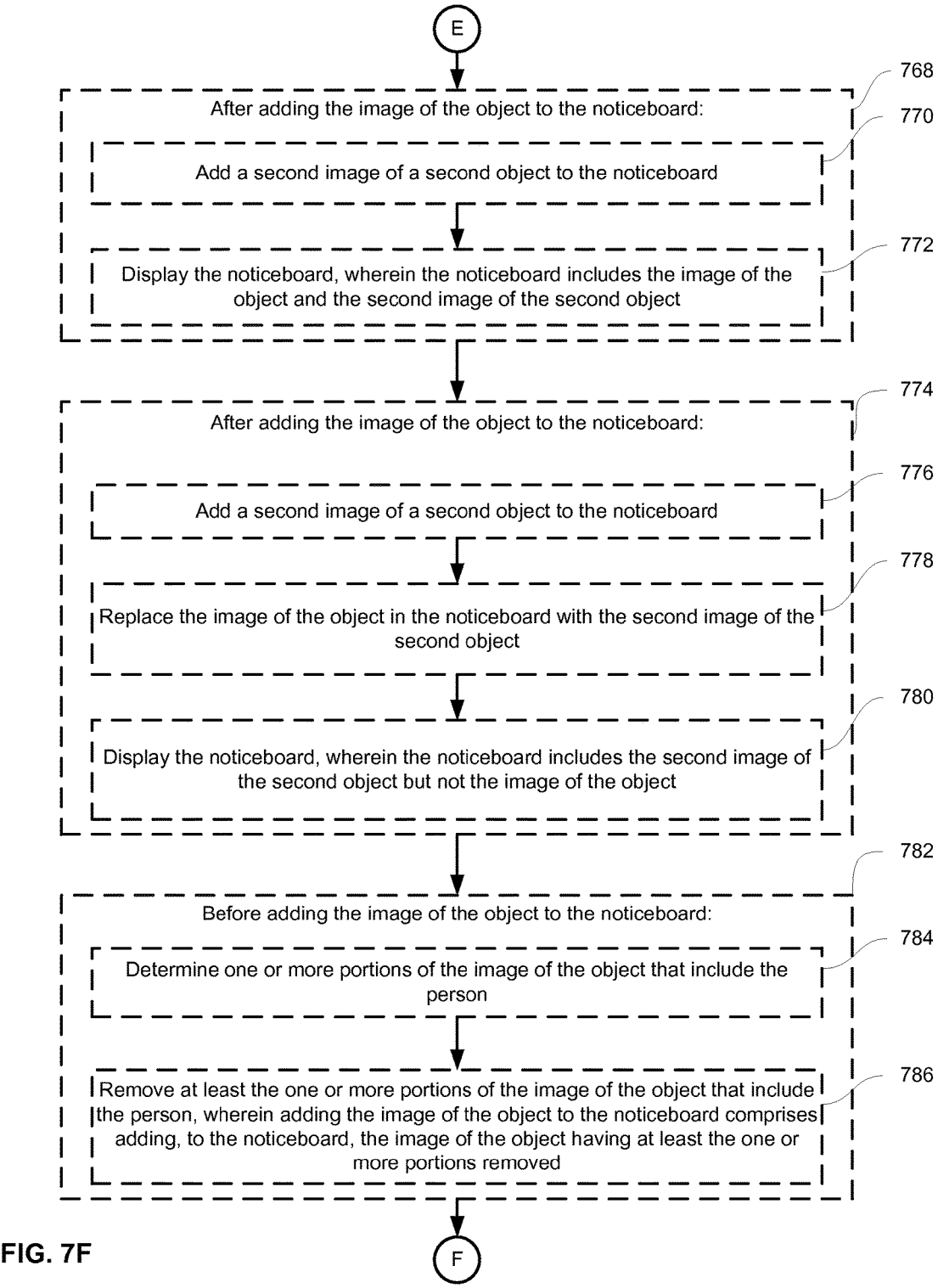
Figure 7G:
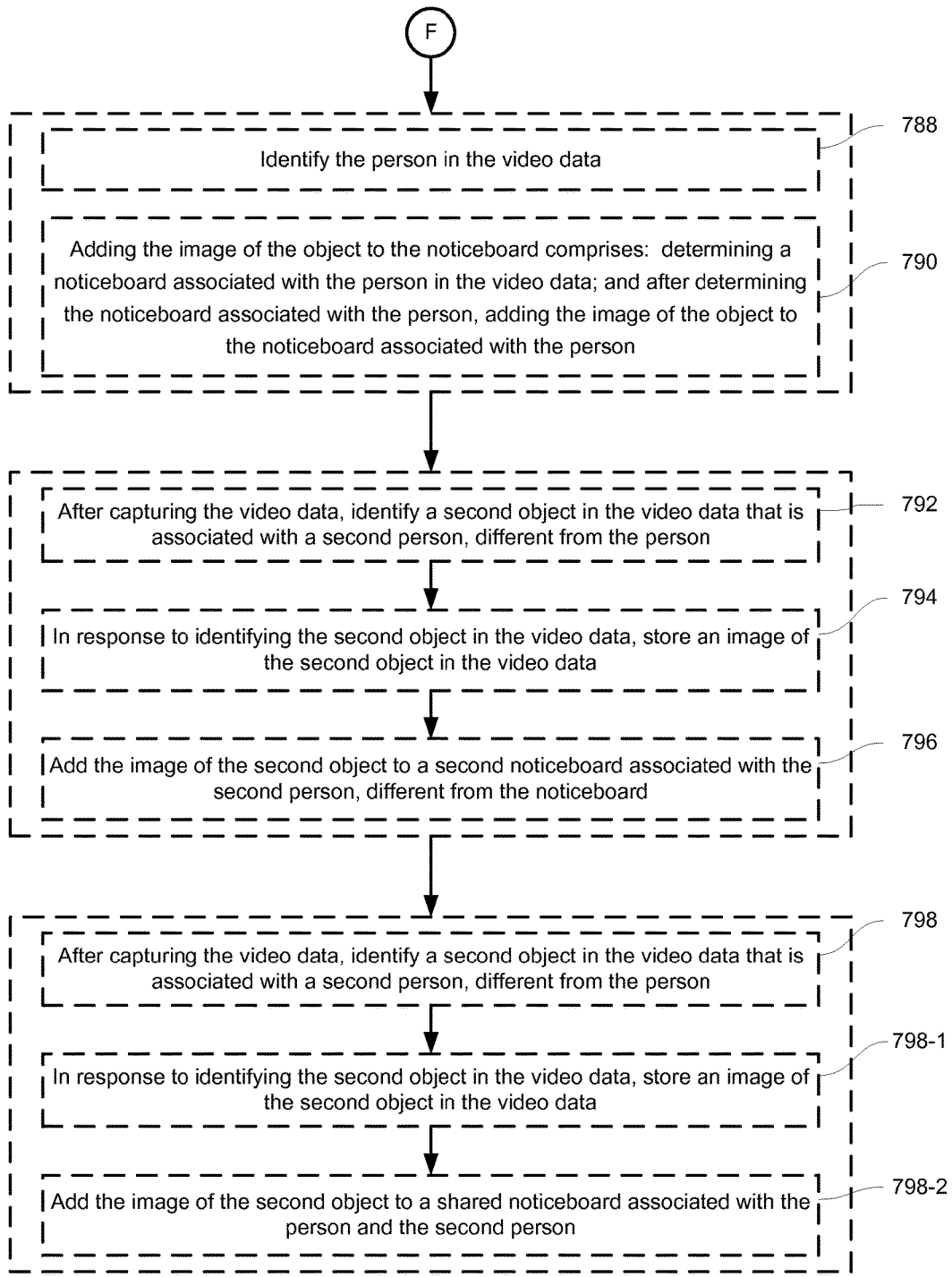

FIGS. 6A-6Z and 6AA-6GG illustrate exemplary ways in which electronic devices identify objects in video data, and add images of those objects to one or more noticeboards in accordance with some embodiments of the disclosure. The embodiments in these figures are used to illustrate the processes described below, including the processes described with reference to FIGS. 7A-7G.

It should be noted that the examples illustrated in FIGS. 6A-6Z and 6AA-6GG are directed to electronic devices that display information on non-touch-sensitive displays, though it is understood that the electronic devices may instead display information on displays having touch-sensitive capability (e.g., touch screens). For example, the electronic devices may include touch screens, or the electronic devices may be capable of outputting display information for display on separate touch screens, as previously described in this disclosure—in such circumstances, the displays described below optionally correspond to the touch screens mentioned above.

FIG. 6A illustrates exemplary display 514. Display 514 optionally displays one or more user interfaces that include various content. In the example illustrated in FIG. 6A, display 514 optionally displays a video application (e.g., a video chat application) running on an electronic device (e.g., electronic device 500 of FIGS. 5A-5B) of which display 514 is a part, or to which display 514 is connected. The video application optionally displays a noticeboard section 602 and a video section 604, which optionally includes video data 606. Noticeboard section 602 optionally stores and/or displays content items (e.g., images, video, audio, etc.) in the user interface, as will be described later. Video section 604 optionally displays video data 606 that is optionally captured by a camera that is coupled to the electronic device. For example, video data 606 optionally corresponds to video captured by camera 516 of person 518 who is in front of display 514. In some embodiments, video data 606 optionally corresponds to video captured by another electronic device at a remote location (e.g., an electronic device with which the local electronic device is communicating). In the example illustrated in FIG. 6A, video data 606 is of person 518 in front of display 514 captured by camera 516 (e.g., as illustrated in FIG. 5B).

In some embodiments, video data 606 includes an object. FIG. 6B illustrates an embodiment in which video data 606 includes object 608 as well as person 518. Object 608 is optionally any object, though in the embodiment illustrated in FIG. 6B, object 608 is a picture of a tree. Object 608 is optionally associated with person 518. For example, in the embodiment illustrated in FIG. 6B, person 518 is holding object 608. Other associations of object 608 and person 518 are contemplated and discussed in this disclosure. In some embodiments, the electronic device identifies one or more objects that are included in video data 606, as will be described below.

FIG. 6C illustrates the identification of object 608 in video data 606. In some embodiments, in accordance with a determination that one or more object-identification criteria are met, the electronic device identifies object 608 in video data 606 that is associated with person 518. The dashed lines around object 608 optionally reflect the identification of object 608 by the electronic device—in some embodiments, the dashed lines are visible on display 514, while in other embodiments, the dashed lines are not visible on display 514. Determining whether the object-identification criteria are met optionally includes determining whether video data 606 includes an object that looks like a picture, whether the video data includes an object that is being held by a user, whether an object has a predefined spatial relationship with respect to person 518, whether the object has a rectangular or square shape, whether the object has a thickness less than a predetermined thickness threshold (e.g., 1, 3 or 5 mm), or any other object-identification criteria that is desired. In the example illustrated in FIG. 6C, the electronic device optionally identifies object 608, because person 518 is holding object 608.

In response to identifying object 608 in video data 606, the electronic device optionally stores an image of object 608 in video data 606. For example, the electronic device optionally takes a screenshot of video data 606 with the object in the screenshot (for example, the portion of video data 606 bounded by the dashed lines surrounding object 608). In some embodiments, the screenshot is cropped or otherwise modified to remove portions of the screenshot that do not show object 608 (for example, the portions of the screenshot that include person's 518 fingers). The image of object 608 stored by the electronic device is optionally displayed in noticeboard 602, as will be described below.

FIG. 6D illustrates the electronic device adding image 610 of object 608 to noticeboard 602. In some embodiments, after storing image 610 of object 608 (as described above with reference to FIG. 6C), the electronic device determines whether object addition criteria have been met. In accordance with a determination that the object addition criteria have been met, the electronic device optionally adds image 610 of object 608 to noticeboard 602. The object addition criteria are optionally any criteria for adding image 610 of object 608 to noticeboard 602, such as an input provided by person 518 to do so. Additional object addition criteria will be discussed later. In some embodiments, and as illustrated in FIG. 6D, electronic device animates the addition of image 610 to noticeboard 602 along a trajectory from the location of object 608 in video data 606 to the final location of image 610 in noticeboard 602, though in some embodiments, it does not.

FIG. 6E illustrates image 610 of object 608 being animated by the electronic device further along the trajectory from video data 606 to its final location in noticeboard 602.

FIG. 6F illustrates image 610 of object 608 being displayed in noticeboard 602 after the electronic device adds the image 610 to the noticeboard 602. It is understood that while noticeboard 602 is illustrated as being displayed alongside video section 604 and video data 606, in some embodiments, noticeboard 602 is not generally displayed alongside video section 604 and video data 606. In some embodiments, one or more images (e.g., image 610) are added to noticeboard 602 while the noticeboard is not displayed on display 514, and noticeboard 602 (including the one or more images) is displayed only after a specified occurrence (e.g., after object 608 is identified in video data 606, after an input is received requesting display of noticeboard 602, after the electronic device adds the one or more images to noticeboard 602, after the electronic device detects the presence of person 518 in front of display 514, or any other desired occurrence).

FIG. 6G illustrates the identification, by the electronic device, of person 518 in video data 606. In some embodiments, the object-identification criteria discussed above with reference to FIG. 6C include a criterion that is met when a predefined spatial relationship exists between object 608 and person 518 in video data 606. In such embodiments, the electronic device optionally identifies person 518 in video data 606, as reflected by the dashed lines surrounding the head of person 518 in FIG. 6G. In some embodiments, the dashed lines are visible on display 514, and in other embodiments, they are not. Identifying person 518 in video data 606 optionally entails simply identifying that a person is in video data 606, while in some embodiments, identifying person 518 optionally entails determining the identity of person 518. The above identification is optionally performed using object recognition on video data 606, facial recognition on video data 606, detection of person's 518 device, such as a mobile phone, in proximity to the electronic device or display 514, and/or any other method of identifying the identity/existence of person 518 in video data 606.

As mentioned above, in some embodiments, the electronic device identifies object 608 only if a predefined spatial relationship exists between object 608 and person 518 in video data 606. After having identified person 518 as described above, the electronic device optionally determines whether the predefined relationship exists in video data 606 (for example, by comparing the location of person 518 and the location of object 608 in video data 606), and identifies object 608 if it does. In some embodiments, determining whether the predefined spatial relationship exists includes determining whether a distance between object 608 and person 518 in video data 606 is less than, substantially equal to, or greater than a predetermined distance threshold (e.g., 8 inches, 1 foot or 2 feet), as illustrated in FIG. 6G.

FIG. 6H illustrates an embodiment in which determining whether the predefined spatial relationship exists includes determining whether object 608 is being held by person 518 in video data 606. Similar to as described with reference to FIG. 6G, in FIG. 6H, the electronic device has identified person 518 in video data 606. However, in addition to identifying person 518, the electronic device in FIG. 6H has identified the hand 612 of person 518. Thus, by comparing the relationships between person 518, hand 612 and object 608, the electronic device optionally determines whether person 518 is holding object 608. If person 518 is holding object 608, then the electronic device optionally identifies and stores an image of object 608, as previously described.

In some embodiments, the electronic device identifies one or more objects in the video data based on dynamic characteristics of the object in the video data, as will be described with reference to FIGS. 6I-6L. FIG. 6I illustrates video data 606 in display 514, as previously described. FIG. 6J illustrates object 608 beginning to be brought into view in video data 606. For example, person 518 is optionally bringing object 608 into view in video data 606 by holding object 608 up to camera 516, or by pointing and/or zooming camera 516 on object 608.

FIG. 6K illustrates object 608 being brought further into view in video data 606. Finally, FIG. 6L illustrates object 608 having been brought completely into view in video data 606. In some embodiments, the bringing of object 608 into view in video data 606 as described above causes the electronic device to identify object 608 in video data 606. For example, the object-identification criteria that the electronic device uses in identifying objects in video data 606 optionally include a criterion that is met when object 608 is in a foreground of video data 606 after having not been in the foreground of video data 606 for a predetermined time period (e.g., 5, 10 or 20 seconds). As another example, the object-identification criteria that the electronic device uses in identifying objects in video data 606 optionally include a criterion that is met when, in video data 606, object 608 is substantially stationary for longer than a first predetermined time period (e.g., 0.5, 1 or 3 seconds) after having been moving. If one or both of these criteria are met, the electronic device optionally identifies object 608 in video data, as previously described. The bringing of object 608 into view in video data 606 optionally satisfies one or both of the above criteria. For example, when person 518 is bringing object 608 into view in video data 606, it is optionally the case that object 608 was not in the foreground of video data 606 for a predetermined time period (e.g., when object 608 was not in view in video data 606), but then was in the foreground of video data 606 when person 518 brought object 608 into view in video data 606. As another example, when person 518 is bringing object 608 into view in video data 606, it is optionally the case that object 608 was substantially stationary for longer than a predetermined time period (e.g., once person 518 brought object 608 completely into view in video data 606) after having been moving (e.g., while person 518 was bringing object 608 into view in video data 606). Other occurrences optionally similarly satisfy the criteria above.

In some embodiments, after identifying object 608 in video data 606, an image of object 608 is not added to noticeboard 602 until an input instructing such addition is received by the electronic device. FIG. 6M illustrates an embodiment in which the electronic device adds an image of object 608 to noticeboard 602 after receiving an input instructing the electronic device to do so. In FIG. 6M, the electronic device has identified object 608 in video data 606, as previously described. In some embodiments, after identifying object 608 and/or storing an image of object 608, the electronic device displays a request for input 614 asking whether an image of object 608 should be added to noticeboard 602. In some embodiments, request 614 is not displayed on display 514, but the electronic device still waits to receive an input before adding an image of object 608 to noticeboard 602. In some embodiments, a request different from request 614 in FIG. 6M is displayed on display 514.

FIG. 6N illustrates the electronic device receiving an input after identifying and/or storing an image of object 608 in video data 606. The input is optionally an input detected on a remote control (e.g., remote control 510 in FIG. 5A), a gesture input detected on a touch-sensitive surface (e.g., touch screen 112 in FIG. 2), an air gesture input detected by an optical camera coupled to the electronic device (e.g., camera 516 in FIG. 5B), or any other appropriate input that can be received by the electronic device. In the example illustrated in FIG. 6N, the input corresponds to a request to add an image of object 608 to noticeboard 602. In some embodiments, a visual indication of the input received is displayed on display 514 (e.g., as reflected by the underlining of "Yes" in request 614). In response to the input to add the image of object 608 to noticeboard 602, the electronic device optionally does so, as illustrated in FIG. 6O (displaying image 610 of object 608 in noticeboard 602). In some embodiments, if the input received in FIG. 6N corresponds to a request to not add an image of object 608 to noticeboard 602, the electronic device optionally forgoes doing so.

In some embodiments, before adding an image of an object to noticeboard 602, the electronic device automatically adjusts one or more attributes of the image, and adds the adjusted image to noticeboard 602. FIG. 6P illustrates user 518 holding object 608, which the electronic device has identified, in video data 606, as before. However, in the example illustrated in FIG. 6P, person 518 is holding object 608 at an angle (e.g., object 608 is skewed/tilted with respect to video data 606). It is optionally desirable for the electronic device to rotate the image of object 608 before adding the image to noticeboard 602 so that images in noticeboard 602 are aligned with respect to display 514. In some embodiments, the electronic device animates this rotation (or any other attribute adjustment) on display 514, such as in FIGS. 6Q-6T.

FIGS. 6Q-6T illustrate rotation of the image 610 of object 608 before adding the image 610 to noticeboard 602. In FIG. 6Q, after identifying object 608 in video data 606 in FIG. 6P, the electronic device optionally ceases displaying video data 606 on display 514, displays image 610 of object 608, and displays request 614 asking if image 610 of object 608 should be added to noticeboard 602. As illustrated in FIG. 6Q, image 610 of object 608 is optionally still angled with respect to display 514.

In FIG. 6R, the electronic device optionally begins rotating image 610 of object 608 to being to align it with display 514. Additionally, the electronic device optionally enlarges image 610 of object 608 to make the image more easily visible on display 514.

Finally, in FIG. 6S, the electronic device has optionally aligned image 610 of object 608 with display 514, and has also optionally further enlarged image 610 on display 514. Additionally, the electronic device has received an input corresponding to a request to add image 610 to noticeboard 602, similar to as previously described with respect to FIGS. 6M-6N.

In FIG. 6T, the electronic device has added image 610 of object 608 to noticeboard 602 in response to the input received in FIG. 6S. In some embodiments, image 610 of object 608 is the image as modified by the electronic device, as previously described (e.g., an angle of the image is modified, etc.). Further, in the example illustrated in FIG. 6T, after modifying image 610 of object 608 and adding the image to noticeboard 602, the electronic device has redisplayed video data 606 on display 514. Though FIGS. 6P-6U illustrate the electronic device's modification of an angle and size of image 610, it is understood that the electronic device optionally modifies only one of the angle or size of image 610 before adding it to noticeboard 602. In some embodiments, the electronic device modifies one or more attributes other than the angle and size of image 610 (e.g., sharpness, color, brightness, cropping, etc.).

In some embodiments, after identifying and/or storing an image of object 608 in video data 606, the electronic device displays one or more visual indications that indicate various actions that can be taken with respect to image 610 of object 608. FIG. 6U illustrates the electronic device displaying image 610 of object 608 on display 514. In some embodiments, while displaying image 610, the electronic device displays request 614 asking whether image 610 should be added to noticeboard 602. Additionally, in some embodiments, electronic device displays visual indications 616, 618 and 620 that indicate what actions can be taken with respect to image 610 of object 608. For example, indication 616 optionally indicates that image 610 of object 608 can be rejected, in which case the electronic device optionally forgoes adding image 610 to noticeboard 602. Indication 618 optionally indicates that image 610 of object 608 can be added to noticeboard 602, in which case the electronic device optionally adds image 610 to noticeboard 602, as previously discussed. Finally, indication 620 optionally indicates that image 610 of object 608 can be replaced, in which case the electronic device optionally does not add image 610 to noticeboard 602, but rather stores another image of object 608 in video data 606 (e.g., a replacement image) that can similarly be accepted or rejected by a user.

Visual indications 616, 618 and 620 optionally include information about respective inputs that correspond to each visual indication. The inputs referred to here are optionally any form of input that can be utilized with the electronic device of the disclosure (e.g., remote control input, touch-sensitive surface input, air gesture input, etc.). For example, visual indication 616 optionally includes left-pointing arrows that indicate that a leftward input provided to the electronic device will result in image 610 being rejected.

Similarly, visual indication 618 optionally includes up-pointing arrows that indicate that an upward input provided to the electronic device will result in image 610 being added to noticeboard 602. Finally, visual indication 620 optionally includes right-pointing arrows that indicate that a rightward input provided to the electronic device will result in image 610 being replaced with another image of object 608 in video data 606.

FIGS. 6V-6X illustrate exemplary air gesture inputs that are optionally received by the electronic device to reject, add or replace image 610. FIG. 6V illustrates an exemplary left swipe air gesture for rejecting image 610. As previously discussed, the electronic device is optionally in communication with a camera (e.g., camera 516). Person 518 optionally performs various gestures with his hands or other body parts in front of camera 516 (e.g., "air gestures"), which the electronic device optionally recognizes as inputs, and performs appropriate actions in response. In some embodiments, the air gestures optionally include person 518 raising his hand with his palm facing camera 516, and moving his hand up, down, left and/or right. In the example illustrated in FIG. 6V, person 518 has moved his hand 612 from right to left to perform a left swipe air gesture. The left swipe air gesture optionally corresponds to visual indication 616 for rejecting image 610. In response to receiving the left swipe air gesture, the electronic device optionally provides visual feedback to person 518 that image 610 will be rejected (e.g., by bolding and/or underlining visual indication 616). Additionally, the electronic device optionally rejects image 610, as previously described.

FIG. 6W illustrates an exemplary right swipe air gesture for replacing image 610. In the example illustrated in FIG. 6W, person 518 has moved his hand 612 from left to right to perform a right swipe air gesture. The right swipe air gesture optionally corresponds to visual indication 620 for replacing image 610. In response to receiving the right swipe air gesture, the electronic device optionally provides visual feedback to person 518 that image 610 will be replaced (e.g., by bolding and/or underlining visual indication 620). Additionally, the electronic device optionally replaces image 610, as previously described.

FIG. 6X illustrates an exemplary up swipe air gesture for adding image 610 to noticeboard 602. In the example illustrated in FIG. 6X, person 518 has moved his hand 612 from low to high to perform an up swipe air gesture. The up swipe air gesture optionally corresponds to visual indication 618 for adding image 610 to noticeboard 602. In response to receiving the up swipe air gesture, the electronic device optionally provides visual feedback to person 518 that image 610 will be added to noticeboard 602 (e.g., by bolding and/or underlining visual indication 618). Additionally, the electronic device optionally adds image 610 to noticeboard 602, as previously described.

In some embodiments, multiple images are added to noticeboard 602. FIG. 6Y illustrates an image of object 622 being added to noticeboard 602 while image 610 of object 608 is already in noticeboard 602. Similar to before, person 518 is holding object 622, which, in the example illustrated in FIG. 6Y, is optionally a picture of a dog. Additionally, the electronic device has optionally identified object 622 in video data 606, as previously described. After identifying object 622, the electronic device optionally adds an image of object 622 to noticeboard 602, as described below.

FIG. 6Z illustrates an embodiment in which the electronic device adds image 624 of object 622 to noticeboard 602 alongside image 610 of object 608. In the example illustrated in FIG. 6Z, both image 610 and image 624 are included and displayed in noticeboard 602. However, in some embodiments, adding image 624 to noticeboard 602 while image 610 is already in noticeboard 602 will result in image 624 replacing image 610 in noticeboard 602, as illustrated in FIG. 6AA. In such embodiments, noticeboard 602 optionally has a maximum image capacity (e.g., 1, 5 or 10 images) that would be exceeded if image 624 were added to noticeboard 602 alongside image 610. Thus, the electronic device optionally replaces image 610 (or any other image) in noticeboard 602 with image 624.

In some embodiments, the electronic device accounts for multiple users and/or multiple noticeboards when identifying and adding images of objects to noticeboards. FIG. 6BB illustrates an embodiment in which object identification and image addition occur during a video communication (e.g., video chat) between two people and two electronic devices. Electronic device A optionally displays, on display 514A, a video communication interface that includes noticeboard 602 and video section 604A. Video section 604A optionally includes video data 606A. Video data 606A optionally corresponds to video data captured at electronic device B (the device with which electronic device A is communicating). Thus, video data 606A optionally includes person B 518B, who is optionally located in front of display 514B of electronic device B while communicating with person A 518A, who is optionally located in front of display 514A. Similarly, electronic device B optionally displays, on display 514B, a video communication interface that includes noticeboard 602 and video section 604B. Video section 604B optionally includes video data 606B. Video data 606B optionally corresponds to video data captured at electronic device A (the device with which electronic device B is communicating). Thus, video data 606B optionally includes person A 518A, who is optionally located in front of display 514A of electronic device A while communicating with person B 518B, who is optionally located in front of display 514B. In some embodiments, electronic device A also displays a view 628A of the video data captured at electronic device A (e.g., the video data corresponding to video data 606B displayed on display 514B), and electronic device B also displays a view 628B of the video data captured at electronic device B (e.g., the video data corresponding to video data 606A displayed on display 514A).

Electronic device A and display 514A are optionally associated with person A 518A. For example, electronic device A and display 514A optionally comprise a television system (e.g., a set-top box and television) located at person A's 518A home. Similarly, electronic device B and display 514B are optionally associated with person B 518B. For example, electronic device B and display 514B optionally comprise a television system (e.g., a set-top box and television) located at person B's 518B home. In some embodiments, person A's 518A home and person B's 518B home are remote from each other.

In the embodiment illustrated in FIG. 6BB, person A 518A and person B 518B are optionally video chatting with each other. Additionally, person A 518A is holding object 608, as shown in view 628A and video data 606B (as seen by person B 518B in front of display 514B). In one or more of the manners previously described, electronic device A has optionally recognized object 608 held by person A 518A in video data 606B (a portion of the video data being exchanged between electronic device A and electronic device B as part of the video chat taking place between person A 518A and person B 518B), and has added image 610 of object 608 to noticeboard 602. As can be seen in FIG. 6BB, noticeboard 602 is optionally accessible from both electronic device A and electronic device B, such that both person A 518A and person B 518B see the same noticeboard 602 while video chatting, for example. Additionally, in some embodiments, notice is displayed proximate to image 610. Notice 626 optionally provides a visual indication of who added image 610 to noticeboard 602 (in the embodiment of FIG. 6BB, person A 518A).

FIG. 6CC illustrates an embodiment in which the electronic device chooses between multiple noticeboards A 602A and B 602B when adding an image of object 608 to the noticeboards. In some embodiments, the electronic device is associated with, or otherwise has access to, more than one noticeboard. For example, as illustrated in FIG. 6CC, the electronic device optionally has access to two noticeboards: noticeboard A 602A and noticeboard B 602B. In such circumstances, the electronic device optionally determines to which noticeboard to add the image of object 608 based on who object 608 is associated with in video data 606. In particular, in some embodiments, in addition to identifying object 608 in video data 606, the electronic device also identifies person A 518A in video 606, as illustrated in FIG. 6CC. Identification of person A 518A optionally occurs in any one or more of the manners previously described. Once person A 518A has been identified, the electronic device optionally determines which noticeboard is associated with person A 518A, and adds the image of object 608 to that noticeboard. For example, in the embodiment illustrated in FIG. 6CC, noticeboard A 602A is optionally associated with person A 518A. Thus, the electronic device optionally adds image 610 of object 608 to noticeboard A 602A, and not to noticeboard B 602B, as illustrated in FIG. 6DD.

In some embodiments, after identifying and adding an image of object 608 that is associated with person A 518A to noticeboard A 602A, the electronic device optionally identifies an image of a second object that is associated with a second person in video data 606. FIG. 6EE illustrates an embodiment in which person B 518B appears in video data 606 after image 610 associated with person A 518A was added to noticeboard A 602A, as previously described. In some embodiments, person B 518B and person A 518A appear in video data 606 concurrently (as illustrated in FIG. 6EE), though it is understood that in some embodiments, person A 518A may no longer appear in video data 606 after person B 518B appears in video data 606.

Person B 518B is optionally holding object 622, which in the example illustrated in FIG. 6EE is a picture of a dog. Similar to as described with reference to FIGS. 6CC-6DD, the electronic device optionally adds an image of object 622 to noticeboard B 602B, and not to noticeboard A 602A, because object 622 is optionally associated with person B 518B, and not person A 518A (e.g., because person B 518B is holding object 622). Specifically, the electronic device has optionally identified person B 518B and object 622, as illustrated in FIG. 6EE. Once person B 518B has been identified, the electronic device optionally determines which noticeboard is associated with person B 518B, and adds the image of object 622 to that noticeboard. For example, in the embodiment illustrated in FIG. 6EE, noticeboard B 602B is optionally associated with person B 518B. Thus, the electronic device optionally adds image 624 of object 622 to noticeboard B 602B, and not to noticeboard A 602A, as illustrated in FIG. 6FF.

It is understood that while FIGS. 6CC-6FF illustrate noticeboard A 602A and noticeboard B 602B being displayed concurrently on display 514, they need not be. For example, neither noticeboard A 602A nor noticeboard B 602B may generally be displayed on display 514. In some embodiments, noticeboard A 602A is optionally displayed only when an image is added to it, and noticeboard B 602B is optionally displayed only when an image is added to it. Other display behaviors of noticeboard A 602A and noticeboard B 602B, as described in the disclosure, are similarly contemplated.

FIG. 6GG illustrates an embodiment in which person A 518A and person B 518B are associated with shared noticeboard 630. Rather than being associated with separate noticeboards (as illustrated in FIGS. 6CC-6FF), person A 518A and person B 518B are optionally associated with shared noticeboard 630. In such circumstances, in the examples described with reference to FIGS. 6CC-6FF, image 610 of object 608 and image 624 of object 622 are optionally added to shared noticeboard 630 rather than to noticeboard A 602A and noticeboard B 602B, respectively. In some embodiments, the electronic device optionally has access to other noticeboards 632 as well, but adds images 610 and 624 to shared noticeboard 630 rather than to any of the other noticeboards 632, because person A 518A and person B 518B are optionally both associated with shared noticeboard 630, as mentioned above.

FIGS. 7A-7G are flow diagrams illustrating a method 700 of identifying objects in video data, and adding images of those objects to one or more noticeboards in accordance with some embodiments. The method 700 is optionally performed at an electronic device such as device 100, device 300 or device 500 as described above with reference to FIGS. 1A-1B, 2-3 and 5A-5B. Some operations in method 700 are, optionally, combined and/or the order of some operations is, optionally, changed.

As described below, the method 700 provides ways in which a device optionally identifies and adds an image of an object to a noticeboard. The method reduces the cognitive burden on a user when interacting with a user interface of the device (e.g., a video communication user interface) of the disclosure, thereby creating a more efficient human-machine interface. For battery-operated electronic devices, increasing the efficiency of the user's interaction with the user interface conserves power and increases the time between battery charges.

In some embodiments, an electronic device (e.g., device 100, 300 or 500) with one or more processors and memory captures (702) video data (e.g., video data 606 in FIG. 6A) of a person (e.g., person 518 in FIG. 6A) in front of a display (e.g., display 514 in FIG. 6A) while a user interface that is associated with a noticeboard (e.g., noticeboard 602 in FIG. 6A) is displayed on the display (e.g., a television). In some embodiments, the user interface is a video chat or video communication user interface, such as in FIG. 6BB. In some embodiments, the noticeboard is displayed in the user interface (e.g., as in FIG. 6A), and in some embodiments, the noticeboard is not displayed in the user interface. In some embodiments, the noticeboard comprises a home screen of the electronic device (704). In some embodiments, the noticeboard comprises a screensaver of the electronic device (706).

After capturing the video data, in accordance with a determination that one or more object-identification criteria are met (e.g., determining whether the video data includes an object that looks like a picture, whether the video data includes an object that is being held by a user, etc.), the electronic device optionally identifies (708) an object in the video data that is associated with (e.g., has a predefined spatial relationship with respect to) the person in front of the display, such as in FIG. 6C (e.g., identifying a picture that the person is holding up in the video data, or identifying another object that is otherwise associated with the person—such as an object that has been registered on the device as being associated with the person). The person is optionally a user that is registered on the electronic device. In some embodiments, the person is simply a person appearing in the video data, whether or not registered on the electronic device.

In response to identifying the object in the video data, the electronic device optionally stores (710) an image of the object in the video data (e.g., by taking a screenshot of the video data with the object in the screenshot. In some embodiments, the screenshot is cropped to exclude portions of the screenshot that do not show the object).

After storing the image of the object, in accordance with a determination that object addition criteria have been met, the electronic device optionally adds (712) the image of the object to the noticeboard, such as in FIGS. 6D-6F. For example, the noticeboard is optionally a container that can hold one or more images, and when viewed, can display the one or more images that it contains, such as noticeboard 602 in FIG. 6F. In some embodiments, the electronic device identifies the person in the video data, and adds the image to a noticeboard that is associated with that person, not a noticeboard associated with another person, such as in FIGS. 6CC-6FF. In some embodiments, after adding the image of the object to the noticeboard, the electronic device displays the noticeboard with the image of the object in the noticeboard.

In some embodiments, the object-identification criteria include a criterion that is met when the object is in a foreground of the video data after having not been in the foreground of the video data for a predetermined time period (714) (e.g., 5, 10 or 20 seconds), such as in FIGS. 6I-6L. For example, the person optionally points and zooms a camera on an object, and the electronic device identifies the object. As another example, the person optionally brings the object into the view of the camera when the object was originally out of the view of the camera, such as in FIGS. 6I-6L. In some embodiments, a depth camera is used in this determination.

In some embodiments, the object-identification criteria include a criterion that is met when the object has a rectangular or square shape (716), such as in FIG. 6C. In some embodiments, the object-identification criteria include a criterion that is met when the object has a thickness less than a predetermined thickness threshold (718) (e.g., 1, 3 or 5 mm). For example, the object is optionally a piece of paper with an image on it, such as a photograph, such as in FIG. 6C. In some embodiments, a depth camera is used in this determination. In some embodiments, the object-identification criteria include a criterion that is met when, in the video data, the object is substantially stationary for longer than a first predetermined time period (e.g., 0.5, 1 or 3 seconds) after having been moving (720), such as in FIGS. 6I-6L (e.g., the person optionally picks up the object and holds it up in front of the camera).

The electronic device optionally identifies (722) the person in the video data, such as in FIG. 6G (e.g., identifying that a person is in the video data, or in some embodiments, determining the identity of the person in the video data). In some embodiments, the above identification is performed by using object recognition on the video data, facial recognition on the video data, detection of the person's electronic device, such as a mobile phone, in proximity to the electronic device, or any other method of identifying that the person is in the video data. In some embodiments, the object-identification criteria include a criterion that is met when, in the video data, a predefined spatial relationship exists between the object and the person (722) (e.g., the object is near the person, etc.), such as in FIG. 6G. In some embodiments, the object-identification criteria include a criterion that is met when, in the video data, the person is holding the object (724), such as in FIG. 6H.

In some embodiments, after storing the image of the object, the electronic device receives (726) an input (e.g., an input on a remote control, a gesture input on a touch-sensitive surface, an air gesture input detected by an optical camera coupled to the electronic device, etc.), wherein the object addition criteria include a criterion that is met when the input corresponds to a request to add the image of the object to the noticeboard, such as in FIGS. 6M-6O (e.g., a specified gesture input, or selection of a particular user interface element, such as a button).

In some embodiments, after storing the image of the object (728): the electronic device automatically adjusts (730) one or more attributes (e.g., orientation, sharpness, color, brightness, size, cropping, etc.) of the stored image of the object to create an adjusted image of the object, and displays (732) the adjusted image of the object in the user interface, such as in FIGS. 6P-6S. Adding the image of the object to the noticeboard optionally comprises adding the adjusted image of the object to the noticeboard (734), such as in FIG. 6T.

In some embodiments, while displaying the adjusted image of the object in the user interface, the electronic device displays (736) a plurality of visual indications (e.g., icons, arrows, etc.) in the user interface, each respective visual indication indicating that the image of the object can be rejected, the image of the object can be added to the noticeboard, or that a replacement image of the object can be captured, such as in FIG. 6U (e.g., the electronic device displays options for proceeding with the image from which the user can choose). In some embodiments, each of the plurality of visual indications includes information about respective inputs that correspond to each visual indication (738). For example, the visual indication corresponding to the option to reject the image of the object optionally includes information about the input needed to reject the image (e.g., the left arrow in visual indication 616 in FIG. 6U). The visual indication optionally informs the user to perform a specified gesture, or select a specified user interface element or button, to reject the image of the object. The other visual indications optionally have similar, corresponding information.

In some embodiments, while displaying the plurality of visual indications in the user interface, the electronic device optionally receives (740) an input. In some embodiments, the input comprises an air gesture input (742) (e.g., an input a person performs in front of one or more cameras of the electronic device), such as in FIGS. 6V-6X; for example, holding up the person's hand, palm facing the electronic device, and moving the person's hand from left to right, from right to left, upwards or downwards. One or more of these air gestures optionally correspond to rejecting the image of the object, requesting a replacement image of the object, and adding the image of the object to the noticeboard, such as in FIGS. 6V-6X.

In some embodiments, in accordance with a determination that the object addition criteria have not been met because the input corresponds to a request to reject the image of the object, the electronic device forgoes (744) adding the image of the object to the noticeboard, such as in FIG. 6V. In some embodiments, in accordance with a determination that the object addition criteria have not been met because the input corresponds to a request to capture a replacement image of the object (746): the electronic device forgoes (748) adding the image of the object to the noticeboard, stores (750) a second image of the object in the video data as the replacement image of the object, and adds (752) the second image of the object to the noticeboard, such as in FIG. 6W.

The electronic device optionally displays (754) the noticeboard, including the image of the object, on the display. In some embodiments, the electronic device is located at a first location, and the noticeboard, including the image of the object, is concurrently accessible on another electronic device at a second location, different from the first location (756), such as in FIG. 6BB (e.g., the noticeboard is displayed on a television at a person's home, and is also concurrently displayed on another television or display device at another person's home). In some embodiments, the electronic device is associated with the person in front of the display (e.g., person A 518A in FIG. 6BB), and the other electronic device is associated with another person (758) (e.g., person B 518B in FIG. 6BB). In some embodiments, adding the image of the object to the noticeboard occurs while the electronic device is communicating with the other electronic device (760), such as in FIG. 6BB. The communication is optionally a video communication comprising the video data, and the image of the object is optionally stored from the video communication (762) (e.g., the image of the object is captured from a video stream of a video chat taking place between the electronic device and the other electronic device).

In some embodiments, the electronic device detects (764) presence of the person in front of the display (e.g., using motion detection, detection of a nearby mobile phone or other device, detecting a person in the video data, etc.), and in response to detecting the presence of the person in front of the display, displays (766) the noticeboard on the display (e.g., when a person is in proximity to the electronic device and/or display, the noticeboard is optionally displayed on the display device of the electronic device).

In some embodiments, after adding the image of the object to the noticeboard (768): the electronic device adds (770) a second image of a second object to the noticeboard (e.g., another image of an object—sometimes a different object, sometimes the same object—is added to the noticeboard). In some embodiments, the other image is stored and added in the ways described above. The electronic device optionally displays (772) the noticeboard, wherein the noticeboard includes the image of the object and the second image of the second object, such as in FIGS. 6Y-6Z (e.g., the noticeboard includes and displays more than one image added to it).

In some embodiments, after adding the image of the object to the noticeboard (774): the electronic device adds (776) a second image of a second object to the noticeboard (e.g., another image of an object—sometimes a different object, sometimes the same object—is added to the noticeboard). In some embodiments, the other image is stored and added in the ways described above. The electronic device optionally replaces (778) the image of the object in the noticeboard with the second image of the second object, and displays (780) the noticeboard, wherein the noticeboard includes the second image of the second object but not the image of the object, such as in FIGS. 6Y and 6AA (e.g., the noticeboard only includes and displays the latest image added to it, or has a maximum capacity, and when it reaches that maximum capacity, newly-added images replace previously-added images).

In some embodiments, before adding the image of the object to the noticeboard (782): the electronic device determines (784) one or more portions of the image of the object that include the person (e.g., determines portions of the stored image that include the person's hands, for example, when the person is holding the object in the image), and removes (786) at least the one or more portions of the image of the object that include the person, such as in FIGS. 6C-6F (e.g., cropping the captured image to remove the user's hands from the image). Adding the image of the object to the noticeboard optionally comprises adding, to the noticeboard, the image of the object having at least the one or more portions removed (786).

The electronic device optionally identifies (788) the person in the video data (e.g., identifying that a person is in the video data, or in some embodiments, determining the identity of the person in the video data). In some embodiments, the above identification is performed by using object recognition on the video data, facial recognition on the video data, detection of the person's electronic device, such as a mobile phone, in proximity to the electronic device, or any other method of identifying that the person is in the video data. Adding the image of the object to the noticeboard optionally comprises: determining a noticeboard associated with the person in the video data, and after determining the noticeboard associated with the person, adding the image of the object to the noticeboard associated with the person (790), such as in FIGS. 6CC-6DD.

In some embodiments, after capturing the video data, the electronic device identifies (792) a second object in the video data that is associated with (e.g., has a predefined spatial relationship with respect to) a second person, different from the person, in response to identifying the second object in the video data, stores (794) an image of the second object in the video data, and adds (796) the image of the second object to a second noticeboard associated with the second person, different from the noticeboard, such as in FIGS. 6EE-6FF. In some embodiments, after capturing the video data, the electronic device identifies (798) a second object in the video data that is associated with (e.g., has a predefined spatial relationship with respect to) a second person, different from the person, in response to identifying the second object in the video data, stores (798-1) an image of the second object in the video data, and adds (798-2) the image of the second object to a shared noticeboard associated with the person and the second person, such as in FIG. 6GG.

It should be understood that the particular order in which the operations in FIGS. 7A-7G have been described is merely exemplary and is not intended to indicate that the described order is the only order in which the operations could be performed. One of ordinary skill in the art would recognize various ways to reorder the operations described herein. Additionally, the operations in the information processing methods described above are, optionally, implemented by running one or more functional modules in an information processing apparatus such as general purpose processors (e.g., as described above with respect to FIGS. 1A and 3) or application specific chips.

Figure 8:
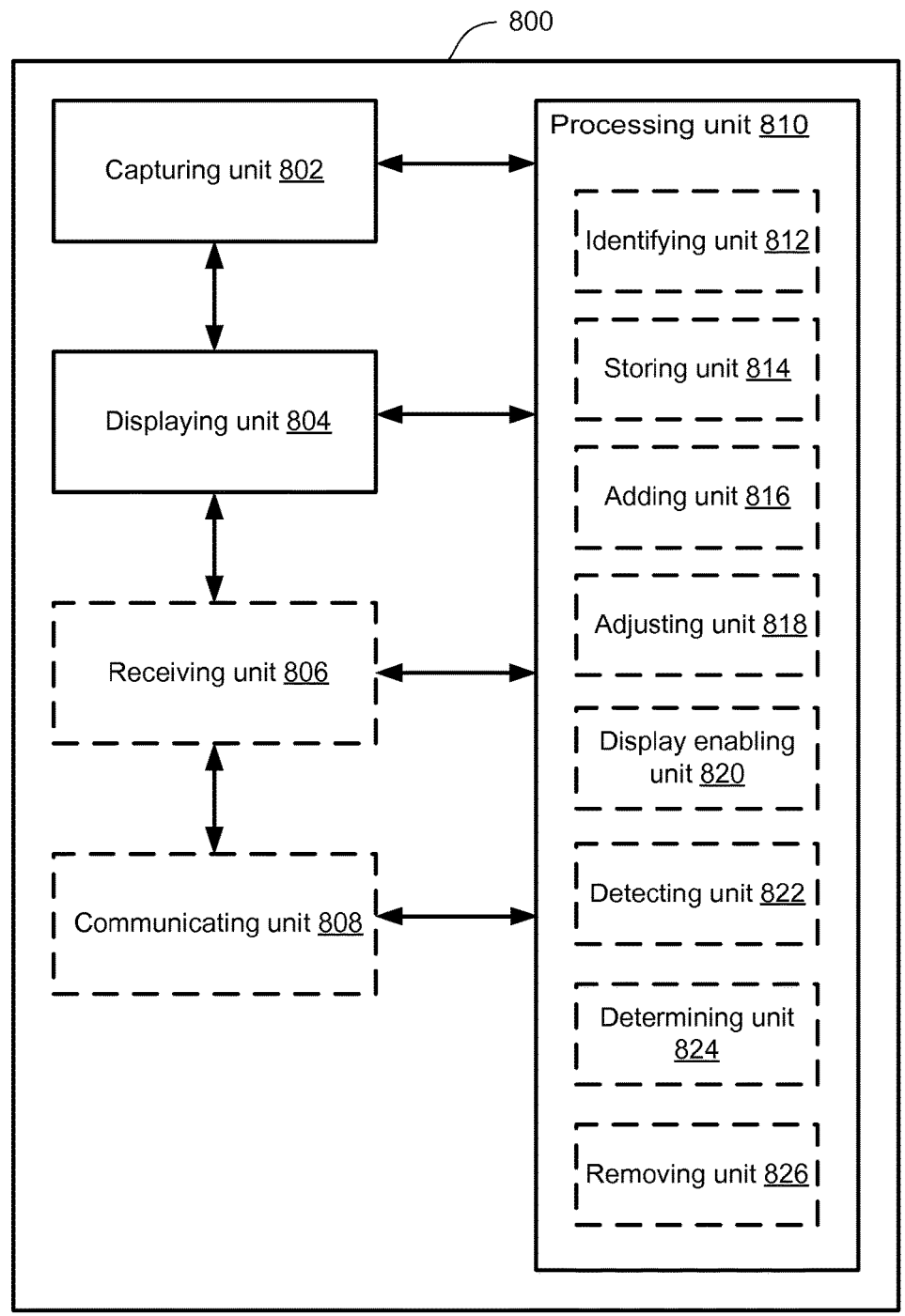
FIG. 8 is a functional block diagram of an electronic device in accordance with some embodiments of the disclosure.

In accordance with some embodiments, FIG. 8 shows a functional block diagram of an electronic device 800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 optionally includes a capturing unit 802 configured to capture video data, a displaying unit 804 coupled to the capturing unit 802 and configured to display content, a receiving unit 806 coupled to the displaying unit 804 and configured to receive inputs, a communicating unit 808 coupled to the receiving unit 806 and configured to communicate data, and a processing unit 810 coupled to each of the capturing unit 802, displaying unit 804, receiving unit 806 and communicating unit 808. In some embodiments, the processing unit 810 includes an identifying unit 812, a storing unit 814, an adding unit 816, an adjusting unit 818, a display enabling unit 820, a detecting unit 822, a determining unit 824 and a removing unit 826.

In some embodiments, the capturing unit 802 is configured to capture video data of a person in front of a display (e.g., displaying unit 804) while a user interface that is associated with a noticeboard is displayed on the display. In some embodiments, the processing unit 810 is configured to, after the capturing unit 802 captures the video data, in accordance with a determination (e.g., with the determining unit 824) that one or more object-identification criteria are met, identify (e.g., with the identifying unit 812) an object in the video data that is associated with the person in front of the display. In some embodiments, the processing unit 810 is configured to, in response to identifying the object in the video data, store (e.g., with the storing unit 814) an image of the object in the video data. In some embodiments, the processing unit 810 is configured to, after storing the image of the object, in accordance with a determination (e.g., with the determining unit 824) that object addition criteria have been met, add (e.g., with the adding unit 816) the image of the object to the noticeboard.

In some embodiments, the processing unit 810 is configured to identify (e.g., with the identifying unit 812) the person in the video data. In some embodiments, the object-identification criteria include a criterion that is met when, in the video data, a predefined spatial relationship exists between the object and the person. In some embodiments, the object-identification criteria include a criterion that is met when, in the video data, the person is holding the object. In some embodiments, the object-identification criteria include a criterion that is met when the object is in a foreground of the video data after having not been in the foreground of the video data for a predetermined time period. In some embodiments, the object-identification criteria include a criterion that is met when the object has a rectangular or square shape. In some embodiments, the object-identification criteria include a criterion that is met when the object has a thickness less than a predetermined thickness threshold. In some embodiments, the object-identification criteria include a criterion that is met when, in the video data, the object is substantially stationary for longer than a first predetermined time period after having been moving.

In some embodiments, the receiving unit 806 is configured to, after the processing unit 810 stores (e.g., with the storing unit 814) the image of the object, receive an input, wherein the object addition criteria include a criterion that is met when the input corresponds to a request to add the image of the object to the noticeboard. In some embodiments, the processing unit 810 is configured to, after storing (e.g., with the storing unit 814) the image of the object: automatically adjust (e.g., with the adjusting unit 818) one or more attributes of the stored image of the object to create an adjusted image of the object, and display (e.g., with the display enabling unit 820) the adjusted image of the object in the user interface. In some embodiments, adding (e.g., with the adding unit 816) the image of the object to the noticeboard comprises adding the adjusted image of the object to the noticeboard.

In some embodiments, the processing unit 810 is configured to, while displaying (e.g., with the display enabling unit 820) the adjusted image of the object in the user interface, display (e.g., with the display enabling unit 820) a plurality of visual indications in the user interface, each respective visual indication indicating that the image of the object can be rejected, the image of the object can be added to the noticeboard, or that a replacement image of the object can be captured. In some embodiments, the receiving unit 806 is configured to, while the processing unit 810 is displaying (e.g., with the display enabling unit 820) the plurality of visual indications in the user interface, receive an input. In some embodiments, each of the plurality of visual indications includes information about respective inputs that correspond to each visual indication.

In some embodiments, the processing unit 810 is configured to, in accordance with a determination (e.g., with the determining unit 824) that the object addition criteria have not been met because the input corresponds to a request to reject the image of the object, forgo adding (e.g., with the adding unit 816) the image of the object to the noticeboard. In some embodiments, the processing unit 810 is configured to, in accordance with a determination (e.g., with the determining unit 824) that the object addition criteria have not been met because the input corresponds to a request to capture a replacement image of the object: forgo adding (e.g., with the adding unit 816) the image of the object to the noticeboard, store (e.g., with the storing unit 814) a second image of the object in the video data as the replacement image of the object, and add (e.g., with the adding unit 816) the second image of the object to the noticeboard. In some embodiments, the input comprises an air gesture input.

In some embodiments, the processing unit 810 is configured to display (e.g., with the display enabling unit 820) the noticeboard, including the image of the object, on the display (e.g., the displaying unit 804). In some embodiments, the electronic device (e.g., electronic device 800) is located at a first location, and the noticeboard, including the image of the object, is concurrently accessible on another electronic device at a second location, different from the first location. In some embodiments, the electronic device (e.g., electronic device 800) is associated with the person in front of the display, and the other electronic device is associated with another person. In some embodiments, adding (e.g., with the adding unit 816) the image of the object to the noticeboard occurs while the electronic device (e.g., electronic device 800) is communicating (e.g., with the communicating unit 808) with the other electronic device. In some embodiments, the communication is a video communication comprising the video data, and the image of the object is stored from the video communication.

In some embodiments, the noticeboard comprises a home screen of the electronic device (e.g., electronic device 800). In some embodiments, the noticeboard comprises a screensaver of the electronic device (e.g., electronic device 800).

In some embodiments, the processing unit 810 is configured to detect (e.g., with the detecting unit 822) presence of the person in front of the display (e.g., displaying unit 804), and in response to detecting the presence of the person in front of the display, display (e.g., with the display enabling unit 820) the noticeboard on the display. In some embodiments, the processing unit 810 is configured to, after adding (e.g., with the adding unit 816) the image of the object to the noticeboard: add (e.g., with the adding unit 816) a second image of a second object to the noticeboard, and display (e.g., with the display enabling unit 820) the noticeboard, wherein the noticeboard includes the image of the object and the second image of the second object.

In some embodiments, the processing unit 810 is configured to, after adding (e.g., with the adding unit 816) the image of the object to the noticeboard: add (e.g., with the adding unit 816) a second image of a second object to the noticeboard, replace (e.g., with the adding unit 816) the image of the object in the noticeboard with the second image of the second object, and display (e.g., with the display enabling unit 820) the noticeboard, wherein the noticeboard includes the second image of the second object but not the image of the object. In some embodiments, the processing unit 810 is configured to, before adding (e.g., with the adding unit 816) the image of the object to the noticeboard: determine (e.g., with the determining unit 824) one or more portions of the image of the object that include the person, and remove (e.g., with the removing unit 826) at least the one or more portions of the image of the object that include the person. In some embodiments, adding the image of the object to the noticeboard comprises adding (e.g., with the adding unit 816), to the noticeboard, the image of the object having at least the one or more portions removed.

In some embodiments, the processing unit 810 is configured to identify (e.g., with the identifying unit 812) the person in the video data. In some embodiments, adding (e.g., with the adding unit 816) the image of the object to the noticeboard comprises: determining (e.g., with the determining unit 824) a noticeboard associated with the person in the video data, and after determining the noticeboard associated with the person, adding (e.g., with the adding unit 816) the image of the object to the noticeboard associated with the person.

In some embodiments, the processing unit 810 is configured to, after the capturing unit 802 captures the video data, identify (e.g., with the identifying unit 812) a second object in the video data that is associated with a second person, different from the person, in response to identifying the second object in the video data, store (e.g., with the storing unit 814) an image of the second object in the video data, and add (e.g., with the adding unit 816) the image of the second object to a second noticeboard associated with the second person, different from the noticeboard. In some embodiments, the processing unit 810 is configured to, after the capturing unit 802 captures the video data, identify (e.g., with the identifying unit 812) a second object in the video data that is associated with a second person, different from the person, in response to identifying the second object in the video data, store (e.g., with the storing unit 814) an image of the second object in the video data, and add (e.g., with the adding unit 816) the image of the second object to a shared noticeboard associated with the person and the second person.

The operations described above with reference to FIGS. 7A-7G are, optionally, implemented by components depicted in FIGS. 1A-1B and 8. For example, identifying operation 708, storing operation 710 and adding operation 712 are, optionally, implemented by event sorter 170, event recognizer 180, and event handler 190. Event monitor 171 in event sorter 170 detects a contact on touch-sensitive display 112 (or detects another input, such as an air gesture input or an input from a remote control if the electronic device does not have a touch-sensitive display, for example), and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 8.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A non-transitory computer readable storage medium storing one or more programs, the one or more programs comprising instructions, which when executed by one or more processors of an electronic device with a display and one or more input devices, cause the device to:
    capture video data of a person in front of the display while a user interface that is associated with a noticeboard is displayed on the display;
    after capturing the video data, in accordance with a determination that one or more object-identification criteria are met, identify an object in the video data that is associated with the person in front of the display;
    in response to identifying the object in the video data, store an image of the object in the video data; and
    after storing the image of the object:
        receive an input via the one more input devices; and
        in accordance with a determination that object addition criteria have been met, add the image of the object to the noticeboard, wherein the object addition criteria include a criterion that is met when the input corresponds to a request to add the image of the object to the noticeboard.

2. The non-transitory computer readable storage medium of claim 1, further comprising instructions, which when executed by the one or more processors of the electronic device, cause the device to:
    identify the person in the video data,
    wherein the object-identification criteria include a criterion that is met when, in the video data, a predefined spatial relationship exists between the object and the person.

3. The non-transitory computer readable storage medium of claim 2, wherein the object-identification criteria include a criterion that is met when, in the video data, the person is holding the object.

4. The non-transitory computer readable storage medium of claim 1, wherein the object-identification criteria include a criterion that is met when the object is in a foreground of the video data after having not been in the foreground of the video data for a predetermined time period.

5. The non-transitory computer readable storage medium of claim 1, wherein the object-identification criteria include a criterion that is met when the object has a rectangular or square shape.

6. The non-transitory computer readable storage medium of claim 1, wherein the object-identification criteria include a criterion that is met when the object has a thickness less than a predetermined thickness threshold.

7. The non-transitory computer readable storage medium of claim 1, wherein the object-identification criteria include a criterion that is met when, in the video data, the object is substantially stationary for longer than a first predetermined time period after having been moving.

8. The non-transitory computer readable storage medium of claim 1, further comprising instructions, which when executed by the one or more processors of the electronic device, cause the device to:
    after storing the image of the object:
        automatically adjust one or more attributes of the stored image of the object to create an adjusted image of the object; and
        display the adjusted image of the object in the user interface.

9. The non-transitory computer readable storage medium of claim 8, wherein adding the image of the object to the noticeboard comprises adding the adjusted image of the object to the noticeboard.

10. The non-transitory computer readable storage medium of claim 8, further comprising instructions, which when executed by the one or more processors of the electronic device, cause the device to:
    while displaying the adjusted image of the object in the user interface, display a plurality of visual indications in the user interface, each respective visual indication indicating that the image of the object can be rejected, the image of the object can be added to the noticeboard, or that a replacement image of the object can be captured; and
    while displaying the plurality of visual indications in the user interface, receive the input via the one or more input devices.

11. The non-transitory computer readable storage medium of claim 10, wherein each of the plurality of visual indications includes information about respective inputs that correspond to each visual indication.

12. The non-transitory computer readable storage medium of claim 10, further comprising instructions, which when executed by the one or more processors of the electronic device, cause the device to:
    in accordance with a determination that the object addition criteria have not been met because the input corresponds to a request to reject the image of the object, forgo adding the image of the object to the noticeboard.

13. The non-transitory computer readable storage medium of claim 10, further comprising instructions, which when executed by the one or more processors of the electronic device, cause the device to:
    in accordance with a determination that the object addition criteria have not been met because the input corresponds to a request to capture a replacement image of the object:
        forgo adding the image of the object to the noticeboard;
        store a second image of the object in the video data as the replacement image of the object; and
        add the second image of the object to the noticeboard.

14. The non-transitory computer readable storage medium of claim 10, wherein the input comprises an air gesture input.

15. The non-transitory computer readable storage medium of claim 1, further comprising instructions, which when executed by the one or more processors of the electronic device, cause the device to:
    display the noticeboard, including the image of the object, on the display,
    wherein:
        the electronic device is located at a first location, and
        the noticeboard, including the image of the object, is concurrently accessible on another electronic device at a second location, different from the first location.

16. The non-transitory computer readable storage medium of claim 15, wherein the electronic device is associated with the person in front of the display, and the other electronic device is associated with another person.

17. The non-transitory computer readable storage medium of claim 15, wherein adding the image of the object to the noticeboard occurs while the electronic device is communicating with the other electronic device.

18. The non-transitory computer readable storage medium of claim 17, wherein the communication is a video communication comprising the video data, and the image of the object is stored from the video communication.

19. The non-transitory computer readable storage medium of claim 1, wherein the noticeboard comprises a home screen of the electronic device.

20. The non-transitory computer readable storage medium of claim 1, wherein the noticeboard comprises a screensaver of the electronic device.

21. The non-transitory computer readable storage medium of claim 1, further comprising instructions, which when executed by the one or more processors of the electronic device, cause the device to:
    detect presence of the person in front of the display; and
    in response to detecting the presence of the person in front of the display, display the noticeboard on the display.

22. The non-transitory computer readable storage medium of claim 1, further comprising instructions, which when executed by the one or more processors of the electronic device, cause the device to:
    after adding the image of the object to the noticeboard:
        add a second image of a second object to the noticeboard; and
        display the noticeboard, wherein the noticeboard includes the image of the object and the second image of the second object.

23. The non-transitory computer readable storage medium of claim 1, further comprising instructions, which when executed by the one or more processors of the electronic device, cause the device to:
    after adding the image of the object to the noticeboard:
        add a second image of a second object to the noticeboard;
        replace the image of the object in the noticeboard with the second image of the second object; and display the noticeboard, wherein the noticeboard includes the second image of the second object but not the image of the object.

24. The non-transitory computer readable storage medium of claim 1, further comprising instructions, which when executed by the one or more processors of the electronic device, cause the device to:
before adding the image of the object to the noticeboard:
determine one or more portions of the image of the object that include the person; and
remove at least the one or more portions of the image of the object that include the person,
wherein adding the image of the object to the noticeboard comprises adding, to the noticeboard, the image of the object having at least the one or more portions removed.

25. The non-transitory computer readable storage medium of claim 1, further comprising instructions, which when executed by the one or more processors of the electronic device, cause the device to:
identify the person in the video data,
wherein adding the image of the object to the noticeboard comprises:
determining a noticeboard associated with the person in the video data; and
after determining the noticeboard associated with the person, adding the image of the object to the noticeboard associated with the person.

26. The non-transitory computer readable storage medium of claim 1, further comprising instructions, which when executed by the one or more processors of the electronic device, cause the device to:
after capturing the video data, identify a second object in the video data that is associated with a second person, different from the person;
in response to identifying the second object in the video data, store an image of the second object in the video data; and
add the image of the second object to a second noticeboard associated with the second person, different from the noticeboard.

27. The non-transitory computer readable storage medium of claim 1, further comprising instructions, which when executed by the one or more processors of the electronic device, cause the device to:
after capturing the video data, identify a second object in the video data that is associated with a second person, different from the person;
in response to identifying the second object in the video data, store an image of the second object in the video data; and
add the image of the second object to a shared noticeboard associated with the person and the second person.

28. A method comprising:
at an electronic device with a display and one or more input devices:
capturing video data of a person in front of the display while a user interface that is associated with a noticeboard is displayed on the display;
after capturing the video data, in accordance with a determination that one or more object-identification criteria are met, identifying an object in the video data that is associated with the person in front of the display;
in response to identifying the object in the video data, storing an image of the object in the video data; and
after storing the image of the object:
receiving an input via the one or more input devices; and
in accordance with a determination that object addition criteria have been met, adding the image of the object to the noticeboard, wherein the object addition criteria include a criterion that is met when the input corresponds to a request to add the image of the object to the noticeboard.

29. An electronic device, comprising:
one or more processors;
memory;
a display;
one or more input devices; and
one or more programs, wherein the one or more programs are stored in the memory and configured to be executed by the one or more processors, the one or more programs including instructions for:
capturing video data of a person in front of the display while a user interface that is associated with a noticeboard is displayed on the display;
after capturing the video data, in accordance with a determination that one or more object-identification criteria are met, identifying an object in the video data that is associated with the person in front of the display;
in response to identifying the object in the video data, storing an image of the object in the video data; and
after storing the image of the object:
receiving an input via the one or more input devices; and
in accordance with a determination that object addition criteria have been met, adding the image of the object to the noticeboard, wherein the object addition criteria include a criterion that is met when the input corresponds to a request to add the image of the object to the noticeboard.

30. The method of claim 28, further comprising:
identifying the person in the video data,
wherein the object-identification criteria include a criterion that is met when, in the video data, a predefined spatial relationship exists between the object and the person.

31. The method of claim 30, wherein the object-identification criteria include a criterion that is met when, in the video data, the person is holding the object.

32. The method of claim 28, wherein the object-identification criteria include a criterion that is met when the object is in a foreground of the video data after having not been in the foreground of the video data for a predetermined time period.

33. The method of claim 28, wherein the object-identification criteria include a criterion that is met when the object has a rectangular or square shape.

34. The method of claim 28, wherein the object-identification criteria include a criterion that is met when the object has a thickness less than a predetermined thickness threshold.

35. The method of claim 28, wherein the object-identification criteria include a criterion that is met when, in the video data, the object is substantially stationary for longer than a first predetermined time period after having been moving.

36. The method of claim 28, further comprising:
after storing the image of the object:
automatically adjusting one or more attributes of the stored image of the object to create an adjusted image of the object; and displaying the adjusted image of the object in the user interface.

37. The method of claim 36, wherein adding the image of the object to the noticeboard comprises adding the adjusted image of the object to the noticeboard.

38. The method of claim 36, further comprising:
while displaying the adjusted image of the object in the user interface, displaying a plurality of visual indications in the user interface, each respective visual indication indicating that the image of the object can be rejected, the image of the object can be added to the noticeboard, or that a replacement image of the object can be captured; and
while displaying the plurality of visual indications in the user interface, receiving the input via the one or more input devices.

39. The method of claim 38, wherein each of the plurality of visual indications includes information about respective inputs that correspond to each visual indication.

40. The method of claim 38, further comprising:
in accordance with a determination that the object addition criteria have not been met because the input corresponds to a request to reject the image of the object, forgoing adding the image of the object to the noticeboard.

41. The method of claim 38, further comprising:
in accordance with a determination that the object addition criteria have not been met because the input corresponds to a request to capture a replacement image of the object:
forgoing adding the image of the object to the noticeboard;
storing a second image of the object in the video data as the replacement image of the object; and
adding the second image of the object to the noticeboard.

42. The method of claim 38, wherein the input comprises an air gesture input.

43. The method of claim 28 further comprising:
displaying the noticeboard, including the image of the object, on the display,
wherein:
the electronic device is located at a first location, and the noticeboard, including the image of the object, is concurrently accessible on another electronic device at a second location, different from the first location.

44. The method of claim 43, wherein the electronic device is associated with the person in front of the display, and the other electronic device is associated with another person.

45. The method of claim 43, wherein adding the image of the object to the noticeboard occurs while the electronic device is communicating with the other electronic device.

46. The method of claim 45, wherein the communication is a video communication comprising the video data, and the image of the object is stored from the video communication.

47. The method of claim 28, wherein the noticeboard comprises a home screen of the electronic device.

48. The method of claim 28, wherein the noticeboard comprises a screensaver of the electronic device.

49. The method of claim 28, further comprising:
detecting presence of the person in front of the display; and
in response to detecting the presence of the person in front of the display, displaying the noticeboard on the display.

50. The method of claim 28, further comprising:
after adding the image of the object to the noticeboard:
adding a second image of a second object to the noticeboard; and
displaying the noticeboard, wherein the noticeboard includes the image of the object and the second image of the second object.

51. The method of claim 28, further comprising:
after adding the image of the object to the noticeboard:
adding a second image of a second object to the noticeboard;
replacing the image of the object in the noticeboard with the second image of the second object; and
displaying the noticeboard, wherein the noticeboard includes the second image of the second object but not the image of the object.

52. The method of claim 28, further comprising:
before adding the image of the object to the noticeboard:
determining one or more portions of the image of the object that include the person; and
removing at least the one or more portions of the image of the object that include the person,
wherein adding the image of the object to the noticeboard comprises adding, to the noticeboard, the image of the object having at least the one or more portions removed.

53. The method of claim 28, further comprising:
identifying the person in the video data,
wherein adding the image of the object to the noticeboard comprises:
determining a noticeboard associated with the person in the video data; and
after determining the noticeboard associated with the person, adding the image of the object to the noticeboard associated with the person.

54. The method of claim 28, further comprising:
after capturing the video data, identifying a second object in the video data that is associated with a second person, different from the person;
in response to identifying the second object in the video data, storing an image of the second object in the video data; and
adding the image of the second object to a second noticeboard associated with the second person, different from the noticeboard.

55. The method of claim 28, further comprising:
after capturing the video data, identifying a second object in the video data that is associated with a second person, different from the person;
in response to identifying the second object in the video data, storing an image of the second object in the video data; and
adding the image of the second object to a shared noticeboard associated with the person and the second person.

56. The electronic device of claim 29, the one or more programs including further instructions for:
identifying the person in the video data,
wherein the object-identification criteria include a criterion that is met when, in the video data, a predefined spatial relationship exists between the object and the person.

57. The electronic device of claim 56, wherein the object-identification criteria include a criterion that is met when, in the video data, the person is holding the object.

58. The electronic device of claim 29, wherein the object-identification criteria include a criterion that is met when the object is in a foreground of the video data after having not been in the foreground of the video data for a predetermined time period.

59. The electronic device of claim 29, wherein the object-identification criteria include a criterion that is met when the object has a rectangular or square shape.

60. The electronic device of claim 29, wherein the object-identification criteria include a criterion that is met when the object has a thickness less than a predetermined thickness threshold.

61. The electronic device of claim 29, wherein the object-identification criteria include a criterion that is met when, in the video data, the object is substantially stationary for longer than a first predetermined time period after having been moving.

62. The electronic device of claim 29, the one or more programs including further instructions for:
after storing the image of the object:
automatically adjusting one or more attributes of the stored image of the object to create an adjusted image of the object; and
displaying the adjusted image of the object in the user interface.

63. The electronic device of claim 62, wherein adding the image of the object to the noticeboard comprises adding the adjusted image of the object to the noticeboard.

64. The electronic device of claim 62, the one or more programs including further instructions for:
while displaying the adjusted image of the object in the user interface, displaying a plurality of visual indications in the user interface, each respective visual indication indicating that the image of the object can be rejected, the image of the object can be added to the noticeboard, or that a replacement image of the object can be captured; and
while displaying the plurality of visual indications in the user interface, receiving the input via the one or more input devices.

65. The electronic device of claim 64, wherein each of the plurality of visual indications includes information about respective inputs that correspond to each visual indication.

66. The electronic device of claim 64, the one or more programs including further instructions for:
in accordance with a determination that the object addition criteria have not been met because the input corresponds to a request to reject the image of the object, forgoing adding the image of the object to the noticeboard.

67. The electronic device of claim 64, the one or more programs including further instructions for:
in accordance with a determination that the object addition criteria have not been met because the input corresponds to a request to capture a replacement image of the object:
forgoing adding the image of the object to the noticeboard;
storing a second image of the object in the video data as the replacement image of the object; and
adding the second image of the object to the noticeboard.

68. The electronic device of claim 64, wherein the input comprises an air gesture input.

69. The electronic device of claim 29, the one or more programs including further instructions for:
displaying the noticeboard, including the image of the object, on the display,
wherein:
the electronic device is located at a first location, and
the noticeboard, including the image of the object, is concurrently accessible on another electronic device at a second location, different from the first location.

70. The electronic device of claim 69, wherein the electronic device is associated with the person in front of the display, and the other electronic device is associated with another person.

71. The electronic device of claim 69, wherein adding the image of the object to the noticeboard occurs while the electronic device is communicating with the other electronic device.

72. The electronic device of claim 71, wherein the communication is a video communication comprising the video data, and the image of the object is stored from the video communication.

73. The electronic device of claim 29, wherein the noticeboard comprises a home screen of the electronic device.

74. The electronic device of claim 29, wherein the noticeboard comprises a screensaver of the electronic device.

75. The electronic device of claim 29, the one or more programs including further instructions for:
detecting presence of the person in front of the display; and
in response to detecting the presence of the person in front of the display, displaying the noticeboard on the display.

76. The electronic device of claim 29, the one or more programs including further instructions for:
after adding the image of the object to the noticeboard:
adding a second image of a second object to the noticeboard; and
displaying the noticeboard, wherein the noticeboard includes the image of the object and the second image of the second object.

77. The electronic device of claim 29, the one or more programs including further instructions for:
after adding the image of the object to the noticeboard:
adding a second image of a second object to the noticeboard;
replacing the image of the object in the noticeboard with the second image of the second object; and
displaying the noticeboard, wherein the noticeboard includes the second image of the second object but not the image of the object.

78. The electronic device of claim 29, the one or more programs including further instructions for:
before adding the image of the object to the noticeboard:
determining one or more portions of the image of the object that include the person; and
removing at least the one or more portions of the image of the object that include the person,
wherein adding the image of the object to the noticeboard comprises adding, to the noticeboard, the image of the object having at least the one or more portions removed.

79. The electronic device of claim 29, the one or more programs including further instructions for:
identifying the person in the video data,
wherein adding the image of the object to the noticeboard comprises:
determining a noticeboard associated with the person in the video data; and
after determining the noticeboard associated with the person, adding the image of the object to the noticeboard associated with the person.

80. The electronic device of claim 29, the one or more programs including further instructions for:
- after capturing the video data, identifying a second object in the video data that is associated with a second person, different from the person;
- in response to identifying the second object in the video data, storing an image of the second object in the video data; and
- adding the image of the second object to a second noticeboard associated with the second person, different from the noticeboard.

81. The electronic device of claim 29, the one or more programs including further instructions for:
- after capturing the video data, identifying a second object in the video data that is associated with a second person, different from the person;
- in response to identifying the second object in the video data, storing an image of the second object in the video data; and
- adding the image of the second object to a shared noticeboard associated with the person and the second person.

\* \* \* \* \*